(12) United States Patent
Lee et al.

(10) Patent No.: US 12,526,500 B2
(45) Date of Patent: Jan. 13, 2026

(54) CAMERA DEVICE AND OPTICAL INSTRUMENT

(71) Applicant: LG INNOTEK CO., LTD., Seoul (KR)

(72) Inventors: Deok Yong Lee, Seoul (KR); Sang Ok Park, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 64 days.

(21) Appl. No.: 18/710,386

(22) PCT Filed: Oct. 26, 2022

(86) PCT No.: PCT/KR2022/016466
§ 371 (c)(1),
(2) Date: May 15, 2024

(87) PCT Pub. No.: WO2023/085651
PCT Pub. Date: May 19, 2023

(65) Prior Publication Data
US 2025/0039523 A1    Jan. 30, 2025

(30) Foreign Application Priority Data

Nov. 15, 2021  (KR) .................. 10-2021-0156830
Nov. 18, 2021  (KR) .................. 10-2021-0159570

(51) Int. Cl.
*H04N 23/54* (2023.01)
*H05K 1/02* (2006.01)

(52) U.S. Cl.
CPC .......... *H04N 23/54* (2023.01); *H05K 1/0203* (2013.01); *H05K 2201/10151* (2013.01)

(58) Field of Classification Search
CPC ................. H04N 23/54; H05K 1/0203; H05K 2201/10151
USPC ....................................... 348/208.99
See application file for complete search history.

(56) References Cited

FOREIGN PATENT DOCUMENTS

| KR | 10-2012-0079420 A | 7/2012 |
| KR | 10-2014-0134003 A | 11/2014 |
| KR | 10-2016-0091579 A | 8/2016 |
| KR | 20160091579 * | 8/2016 |

(Continued)

OTHER PUBLICATIONS

International Search Report dated Feb. 2, 2023 in International Application No. PCT/KR2022/016466.

*Primary Examiner* — Joel W Fosselman
(74) *Attorney, Agent, or Firm* — Saliwanchik, Lloyd & Eisenschenk

(57) ABSTRACT

A camera device of the disclosure includes a fixed unit and a moving unit, which includes a first circuit board, a second circuit board disposed under the first circuit board, and an image sensor and which is movable relative to the fixed unit in a direction perpendicular to an optical-axis direction. The second circuit board includes a plurality of conductive layers including a first conductive layer and a plurality of insulating layers including a first insulating layer. The first insulating layer is the lowermost layer of the second circuit board, and the first conductive layer is disposed on the first insulating layer. The second circuit board includes a first region coupled to the first circuit board using a solder, and the lower surface of the first region is located higher than the first conductive layer.

20 Claims, 45 Drawing Sheets

(56) References Cited

FOREIGN PATENT DOCUMENTS

| | | |
|---|---|---|
| KR | 10-2020-0019512 A | 2/2020 |
| KR | 10-2020-0131159 A | 11/2020 |

* cited by examiner

341b 28B
271
28A

CAMERA DEVICE AND OPTICAL INSTRUMENT

CROSS-REFERENCE TO RELATED APPLICATIONS

This application is the U.S. national stage application of International Patent Application No. PCT/KR2022/016466, filed Oct. 26, 2022, which claims the benefit under 35 U.S.C. § 119 of Korean Application Nos. 10-2021-0156830, filed Nov. 15, 2021; and 10-2021-0159570, filed Nov. 18, 2021; the disclosures of each of which are incorporated herein by reference in their entirety.

TECHNICAL FIELD

Embodiments relate to a camera device and an optical instrument including the same.

BACKGROUND ART

Voice coil motor (VCM) technology, which is used in conventional general camera devices, is difficult to apply to a micro-scale camera device, which is intended to exhibit low power consumption, and study related thereto has been actively conducted.

There is increasing demand for, and production of, electronic products such as smart phones and cellular phones equipped with cameras. Cameras for cellular phones have been increasing in resolution and decreasing in size, and accordingly, actuators therefor are also becoming smaller, larger in diameter, and more multifunctional. In order to realize a high-resolution cellular phone camera, improvement in the performance of the cellular phone camera and additional functions, such as auto-focusing, shutter shaking prevention, and zooming in and out, are required.

DISCLOSURE

Technical Problem

Embodiments provide a camera device capable of inhibiting deterioration in performance of insulation and protection of a terminal of a terminal unit, improving solderability, and ensuring reliable electrical connection and an optical instrument including the same.

In addition, embodiments provide a camera device capable of suppressing or inhibiting a support member from being disconnected due to a heavy lens module when external impact is applied thereto or when OIS operation is performed and an optical instrument including the same.

Technical Solution

A camera device according to an embodiment includes a fixed unit and a moving unit, which includes a first circuit board, a second circuit board disposed under the first circuit board, and an image sensor and which is movable relative to the fixed unit in a direction perpendicular to an optical-axis direction. The second circuit board includes a plurality of conductive layers including a first conductive layer and a plurality of insulating layers including a first insulating layer. The first insulating layer is the lowermost layer of the second circuit board, and the first conductive layer is disposed on the first insulating layer. The second circuit board includes a first region coupled to the first circuit board using a solder, and the lower surface of the first region is located higher than the first conductive layer. The camera device may further include a heat dissipation layer disposed on the lower surface of the second circuit board. The lowermost surface of the solder may be disposed higher than the lowermost surface of the first insulating layer.

A camera device according to another embodiment includes a fixed unit and a moving unit, which includes a first circuit board, a second circuit board including a first region coupled to the first circuit board using a solder, and an image sensor. The moving unit moves in a direction perpendicular to an optical-axis direction. The second circuit board includes a first conductive layer, and the lower surface of the first region is disposed higher than the first conductive layer. The lowermost surface of the solder is disposed higher than the lowermost surface of the second circuit board.

The first region may be a region in which the first conductive layer is not disposed. An end of the first conductive layer may be spaced apart from the solder. An end of a portion of the first conductive layer may be disposed at a position further inward than an end of another conductive layer. The first conductive layer may be spaced apart from the first region. The first region of the second circuit board may include an edge of the second circuit board. The second circuit board may include a terminal, and the first region may be the terminal of the second circuit board.

A camera device according to still another embodiment includes a fixed unit and a moving unit, which includes a first circuit board, a second circuit board disposed under the first circuit board, and an image sensor and which is movable relative to the fixed unit in a direction perpendicular to an optical-axis direction. The first circuit board includes a first terminal, and the second circuit board includes a second terminal coupled to the first terminal using a solder. The second circuit board includes a plurality of conductive layers disposed so as to be spaced apart from each other in the optical-axis direction. At least one of the plurality of conductive layers is disposed lower than the second terminal and is spaced apart from the solder.

The second terminal may include a first pad extending perpendicular to the optical-axis direction. The second terminal may include a second pad connected to the first pad and formed on a side surface of the second circuit board. The first pad may be connected to the lower portion of the second pad.

The second pad may be disposed on the lowermost conductive layer among the plurality of conductive layers. Only the lowermost conductive layer among the plurality of conductive layers may be disposed lower than the second terminal. The second pad may include a portion depressed in a side surface of the second circuit board. The solder may be disposed on at least one of the first pad or the second pad.

The second circuit board may include an insulating layer disposed between the plurality of conductive layers, a first cover layer disposed under the plurality of conductive layers, and a second cover layer disposed on the plurality of conductive layers.

The second terminal may include a third pad connected to the second pad and formed on the uppermost conductive layer among the plurality of conductive layers.

The distance from the upper surface of the second circuit board to the first pad in the optical-axis direction may be longer than the distance from the lower surface of the second circuit board to the first pad in the optical-axis direction.

A value obtained by dividing the length of the second circuit board in the optical-axis direction by the spacing distance from the lower surface of the second circuit board to the first pad may be 2.1 to 5.7.

The solder may be disposed on the first pad and the second pad, and the height of the solder projecting from the lower surface of the first pad may be 60 percent to 85 percent of the spacing distance from the lower surface of the second circuit board to the lower surface of the first pad in the optical-axis direction.

The second pad may overlap the first terminal in the optical-axis direction, and the first pad may include a portion not overlapping the second terminal in the optical-axis direction.

The solder may be disposed on the first pad and the second pad, and the height of the solder projecting from the first pad may be less than the spacing distance from the lower surface of the second circuit board to the second pad in the optical-axis direction.

The second terminal may include a third pad connected to the upper portion of the second pad and extending parallel to the first pad. The camera device may further include a solder disposed on the third pad.

A camera device according to still another embodiment includes a moving unit including a first board and an image sensor disposed on the first board, a fixed unit including a second board and a housing disposed on the image sensor, a support board conductively connecting the first board to the second board, and a support member coupled to the moving unit and the fixed unit. The support board and the support member support the moving unit so that the moving unit moves relative to the fixed unit in a direction perpendicular to an optical-axis direction. The support member is formed of a non-conductive material.

The support member may include at least one of resin, rubber, urethane, plastic, or elastomer.

One end of the support member may be coupled to the housing.

The camera device may further include a lens barrel disposed in the housing. The fixed unit may include an elastic member for supporting the lens barrel with respect to the housing, and the end of the support member may be coupled to the elastic member.

The housing may have formed therein a hole in which at least a portion of the support member is disposed. The elastic member may include a first coupling portion coupled to the housing, a second coupling portion coupled to the end of the support member, and a connection portion connecting the first coupling portion to the second coupling portion.

The moving unit may include a holder coupled to the first board, and the other end of the support member may be coupled to the holder. The holder may have formed therein a hole through which at least a portion of the support member passes.

Alternatively, the moving unit may include a holder coupled to the first board and a reinforcing member coupled to the holder. The other end of the support member may be coupled to the reinforcing member.

The other end of the support member may be coupled to the first board. The first board may have formed therein a hole in which at least a portion of the support member is disposed.

The camera device may further include a first damper attached to the support member and to the housing. The camera device may further include a second damper attached to the support member and to the holder.

The moving unit may include a holder coupled to the first board, and the fixed unit may include a base coupled to the second board. A portion of the support board may be coupled to the holder, and another portion of the support board may be coupled to the base. The support board may include a terminal unit and a first terminal formed at the terminal unit, and the second board may include a second terminal coupled to the first terminal using a solder.

Advantageous Effects

As is apparent from the above description, according to the embodiments, solder resist is formed on a part or the entirety of the terminal unit of the support board, thereby inhibiting eccentricity due to mismatch between the terminal and the bore, and thus inhibiting deterioration in insulation and protection performance due to eccentricity.

In addition, according to the embodiments, it may be possible to inhibit misalignment between the terminal of the support board and the terminal of the second board unit during soldering, thereby improving solderability and ensuring reliable electrical connection.

In addition, according to the embodiments, since the bore is formed in the third insulating layer so as to match the terminal of the terminal unit through exposure, development, and etching, it may be possible to inhibit reduction in the area of the terminal for soldering due to flow of resin of the coverlay, thereby improving solderability and ensuring reliable electrical connection.

In addition, according to the embodiments, the support member embodied as an injection-molded product is used instead of a wire, thereby ensuring higher resistance to external impact. The injection-molded product may include a non-conductive material. Because the support member, which is an injection-molded product, has greater rigidity than the wire, the support member may be less likely to be disconnected and may have a longer lifespan than the wire. Therefore, although the OIS moving unit includes a heavy lens module, it may be possible to suppress or inhibit disconnection of the support member when external impact is applied thereto or during OIS operation, thereby inhibiting oscillation of the OIS driving unit, which may be caused by disconnection of the support member, and ensuring normal OIS operation.

BEST MODE

Figure 1:
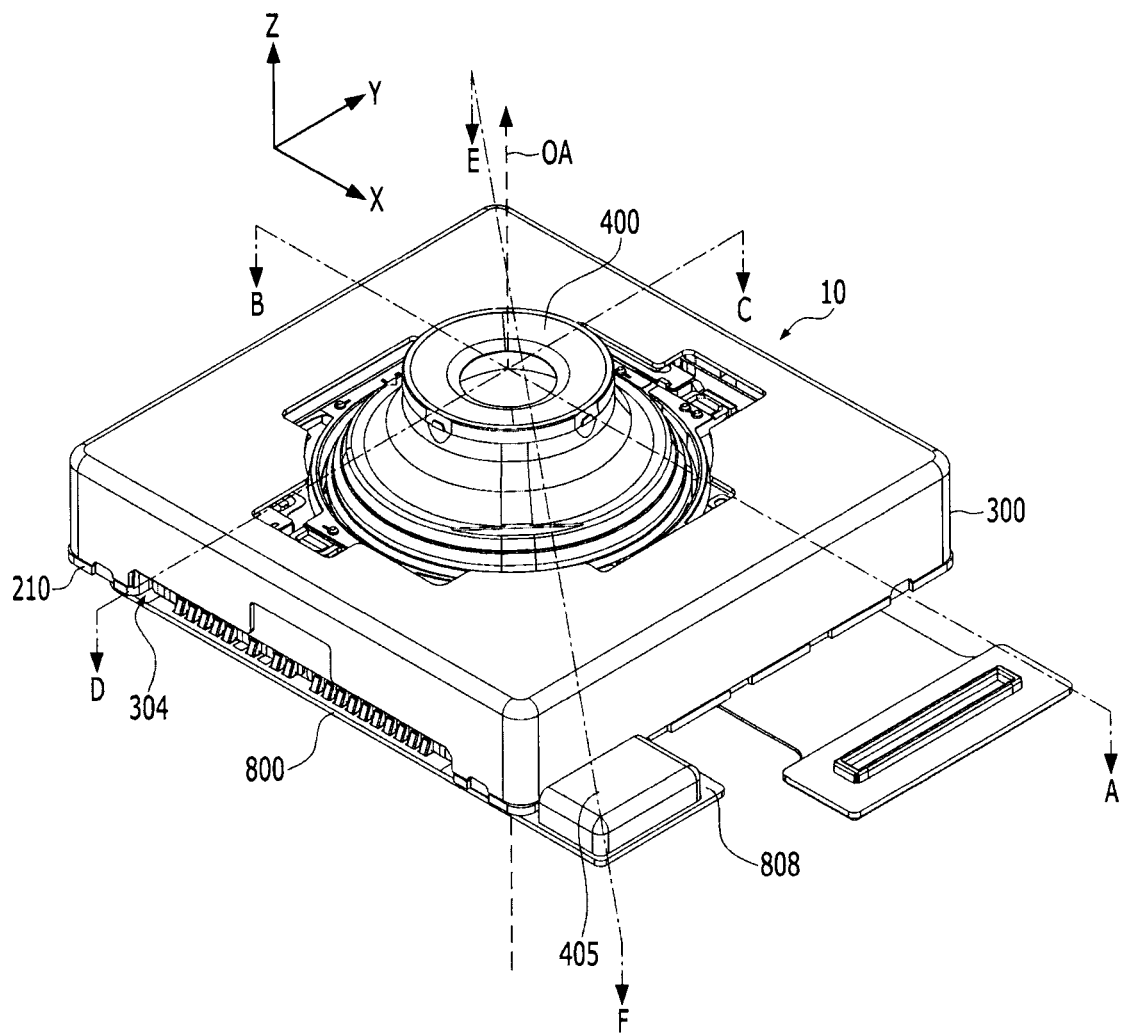
FIG. 1 is a perspective view of a camera device according to an embodiment.

Hereinafter, exemplary embodiments of the present disclosure will be described in detail with reference to the accompanying drawings.

The technical spirit of the disclosure is not limited to the embodiments to be described, and may be implemented in various other forms, and one or more of the components may be selectively combined and substituted for use without exceeding the scope of the technical spirit of the disclosure.

In addition, terms (including technical and scientific terms) used in the embodiments of the disclosure, unless specifically defined and described explicitly, are to be interpreted as having meanings that may be generally understood by those having ordinary skill in the art to which the disclosure pertains, and meanings of terms that are commonly used, such as terms defined in a dictionary, should be interpreted in consideration of the context of the relevant technology.

Further, the terms used in the embodiments of the disclosure are for explaining the embodiments and are not intended to limit the disclosure. In this specification, the singular forms may also include plural forms unless otherwise specifically stated in a phrase, and in the case in which "at least one (or one or more) of A, B, or C" is stated, it may include one or more of all possible combinations of A, B, and C.

In addition, in describing the components of the embodiments of the disclosure, terms such as "first," "second," "A," "B," "(a)," and "(b)" can be used. Such terms are only for distinguishing one component from another component, and do not determine the nature, sequence, or procedure of the corresponding constituent elements.

In addition, when it is described that a component is "connected," "coupled" or "joined" to another component, the description may include not only being directly "connected," "coupled" or "joined" to the other component but also being "connected," "coupled" or "joined" by another component between the component and the other component. In addition, in the case of being described as being formed or disposed "above (on)" or "below (under)" another component, the description includes not only the case where the two components are in direct contact with each other, but also the case where one or more other components are formed or disposed between the two components. In addition, when expressed as "above (on)" or "below (under)," it may refer to a downward direction as well as an upward direction with respect to one element.

Hereinafter, an AF driving unit may alternatively be referred to as a "lens moving apparatus," a "lens moving unit," a "voice coil motor (VCM)," an "actuator," or a "lens moving device." Hereinafter, a coil may alternatively be referred to as a "coil unit," and an elastic member may alternatively be referred to as an "elastic unit" or a "spring."

In addition, in the following description, a terminal may alternatively be referred to as a "pad," an "electrode," a "pad unit," a "conductive layer," or a "bonding unit."

In the following description, the terms "board unit," "printed circuit board," "circuit board," and "board" may be used interchangeably.

For convenience of description, a camera device according to an embodiment will be described using the Cartesian coordinate system (x, y, z), but the embodiments are not limited thereto, and may be described using other coordinate systems. In the respective drawings, the x-axis and the y-axis may be directions perpendicular to the z-axis, which is an optical-axis direction, the z-axis direction, which is the direction of the optical axis OA, may be referred to as a "first direction," the x-axis direction may be referred to as a "second direction," and the y-axis direction may be referred to as a "third direction." In addition, for example, the x-axis direction may be referred to as "any one of the first horizontal direction and the second horizontal direction," and the y-axis direction may be referred to as "the other of the first horizontal direction and the second horizontal direction."

In addition, for example, the optical axis may be the optical axis of a lens mounted to a lens barrel. The first direction may be a direction perpendicular to a capture area of an image sensor. In addition, for example, the optical-axis direction may be a direction parallel to the optical axis.

The camera device according to the embodiment may perform an "auto-focusing function." Here, the auto-focusing function is a function of automatically focusing an image of a subject on the surface of an image sensor.

Hereinafter, the camera device may alternatively be referred to as a "camera module," a "camera assembly," a "camera unit," a "camera," a "photographing device," or a "lens moving device."

In addition, the camera device according to the embodiment may perform a "hand-tremor compensation function."

Here, the hand-tremor compensation function is a function of inhibiting the contour of a captured still image from being blurred due to vibration caused by shaking of a hand of a user when capturing the still image.

Figure 2:
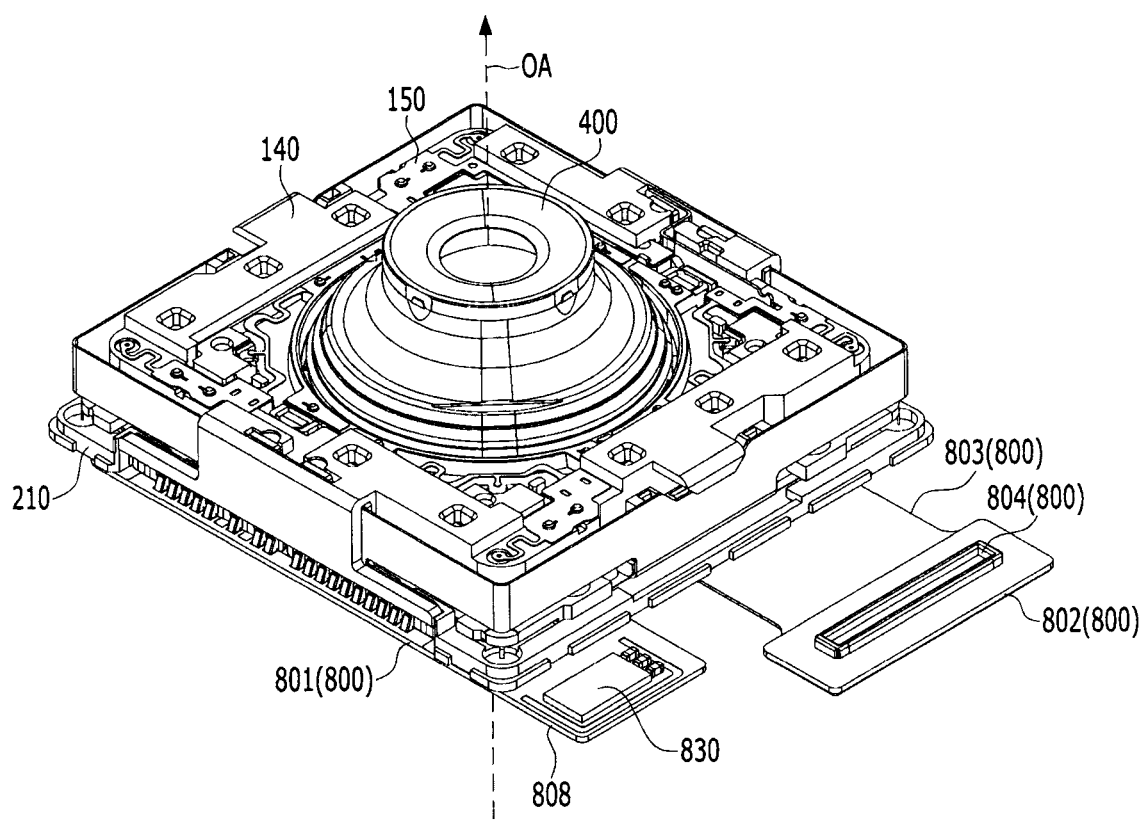
FIG. 2 is a perspective view of the camera device, with a cover member removed therefrom.
Figure 3:
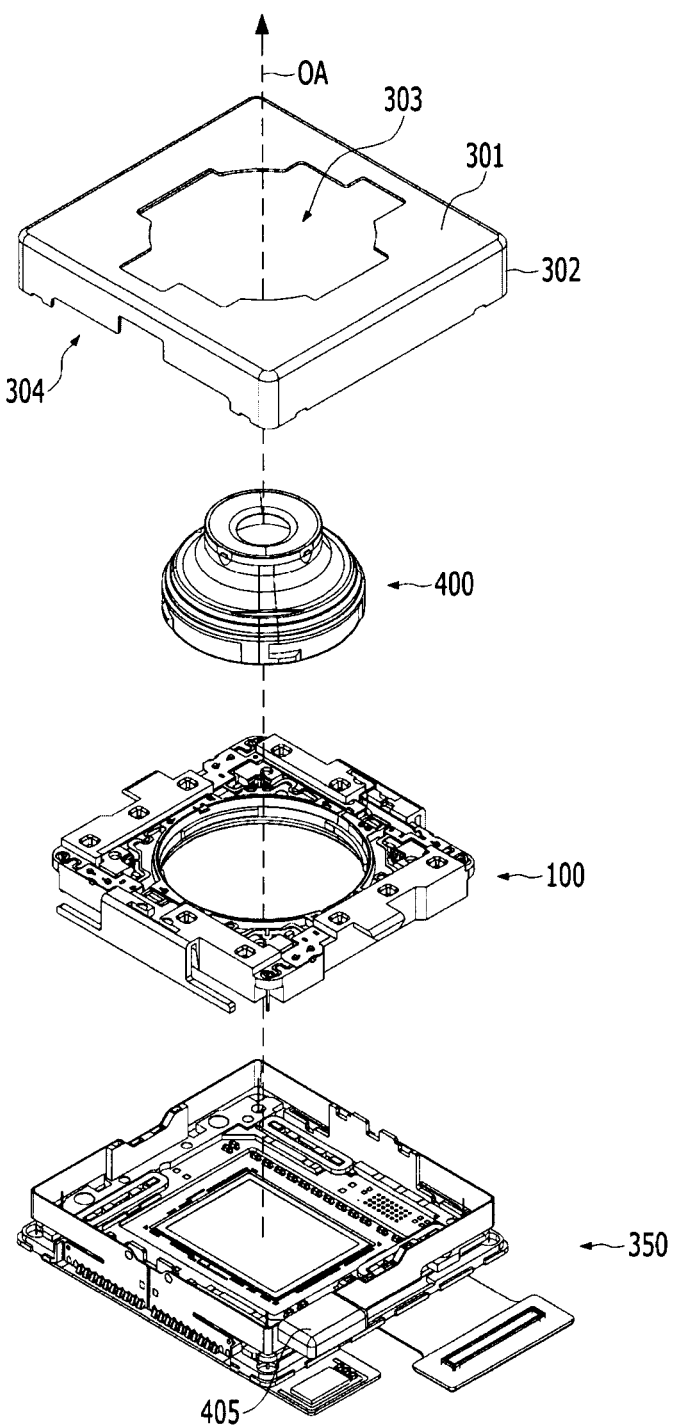
FIG. 3 is an exploded perspective view of the camera device in FIG. 1.
Figure 4A:
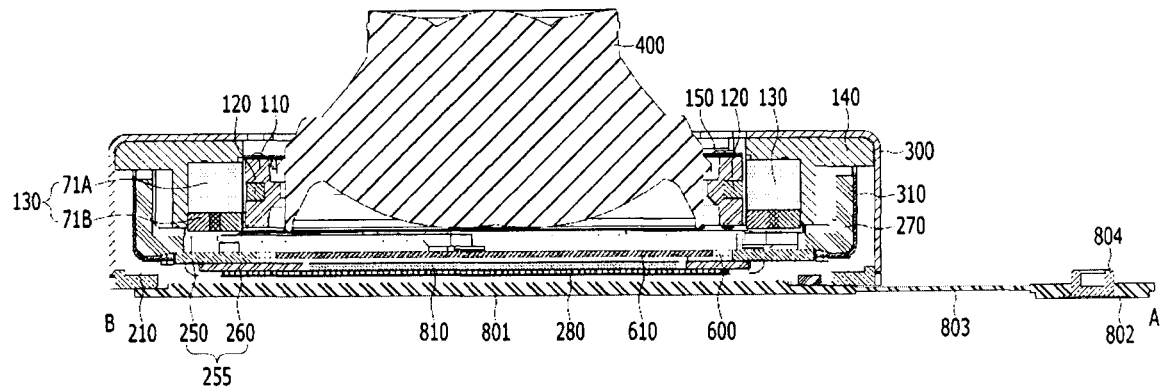
FIG. 4A is a cross-sectional view taken along line AB in the camera device in FIG. 1.
Figure 4B:
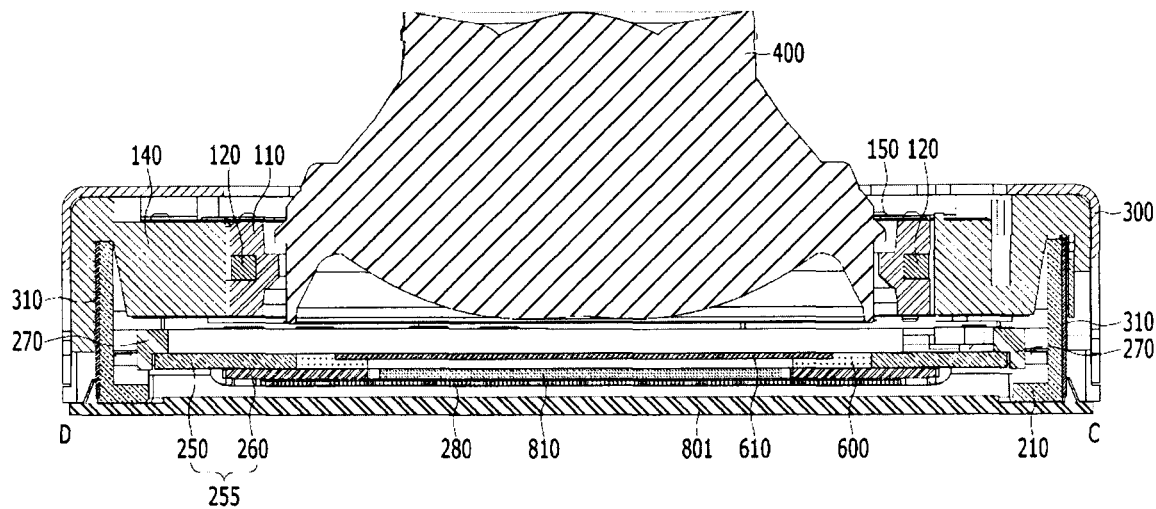
FIG. 4B is a cross-sectional view taken along line CD in the camera device in FIG. 1.
Figure 4C:
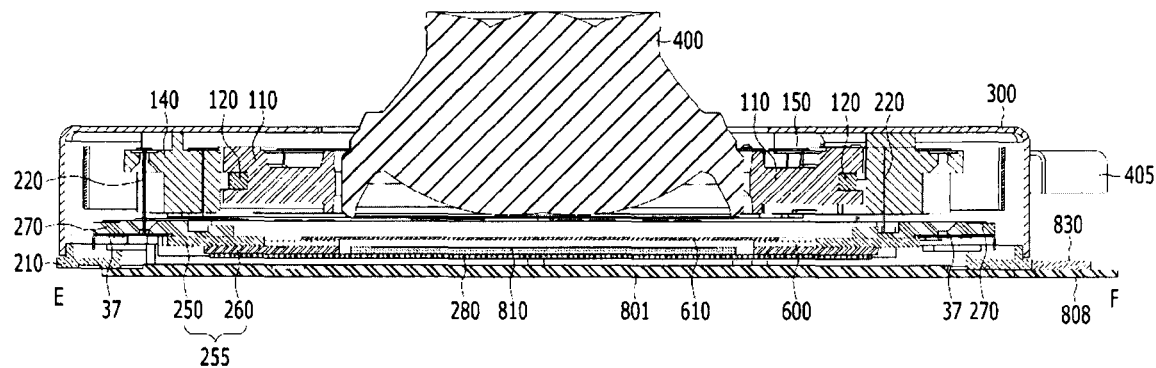
FIG. 4C is a cross-sectional view taken along line EF in the camera device in FIG. 1.
Figure 5:
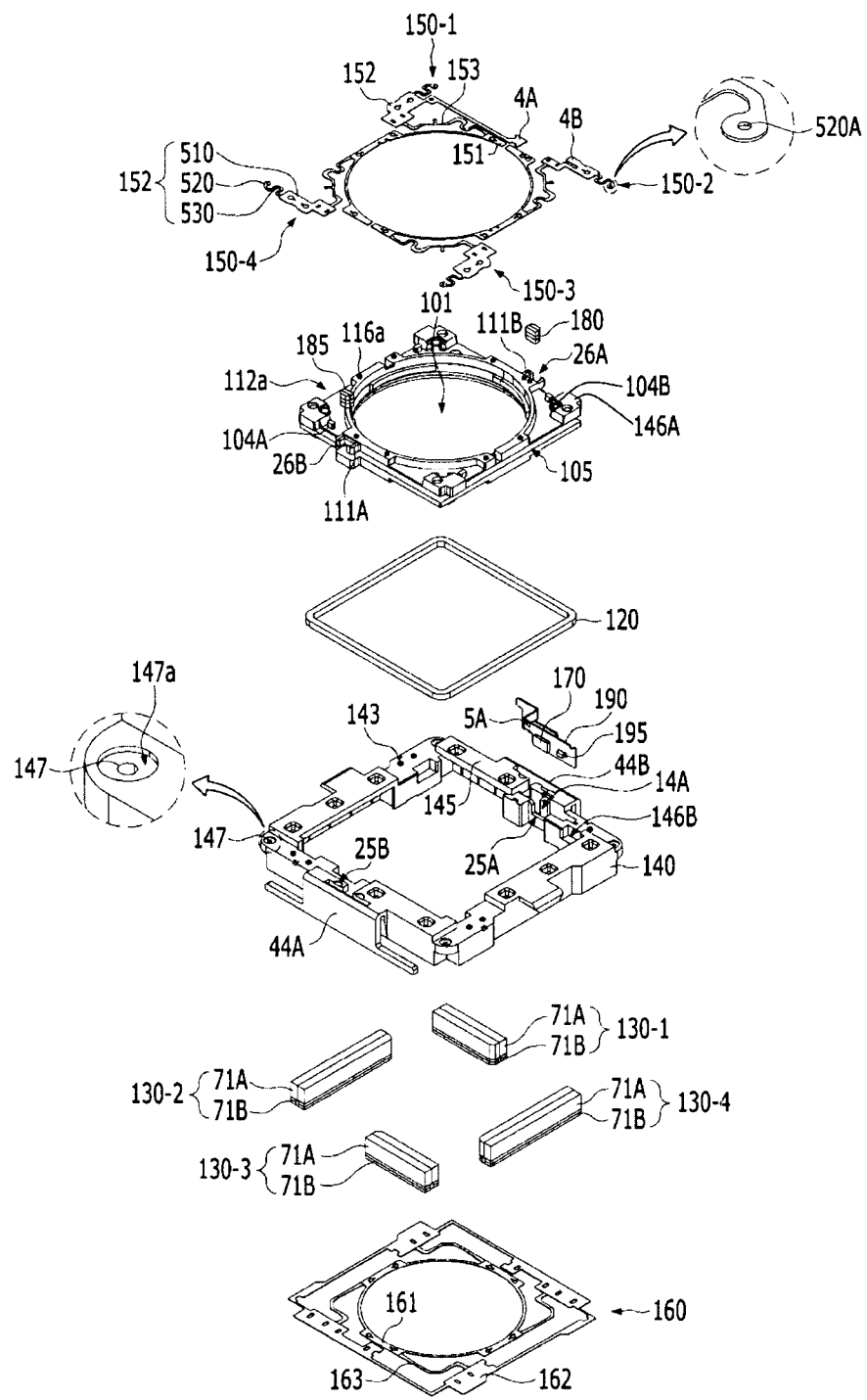
FIG. 5 is an exploded perspective view of the AF driving unit in FIG. 3.
Figure 6:
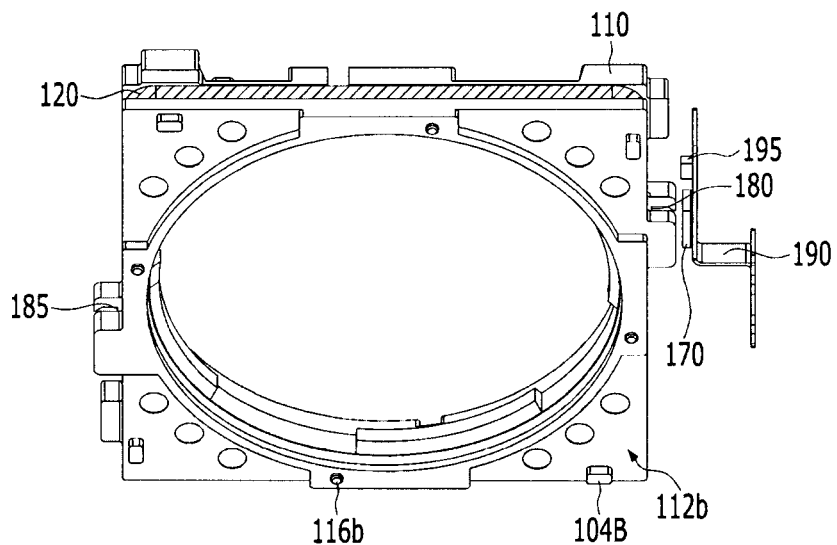
FIG. 6 is a perspective view of a bobbin, a sensing magnet, a balancing magnet, a first coil, a circuit board, a first position sensor, and a capacitor.
Figure 7A:
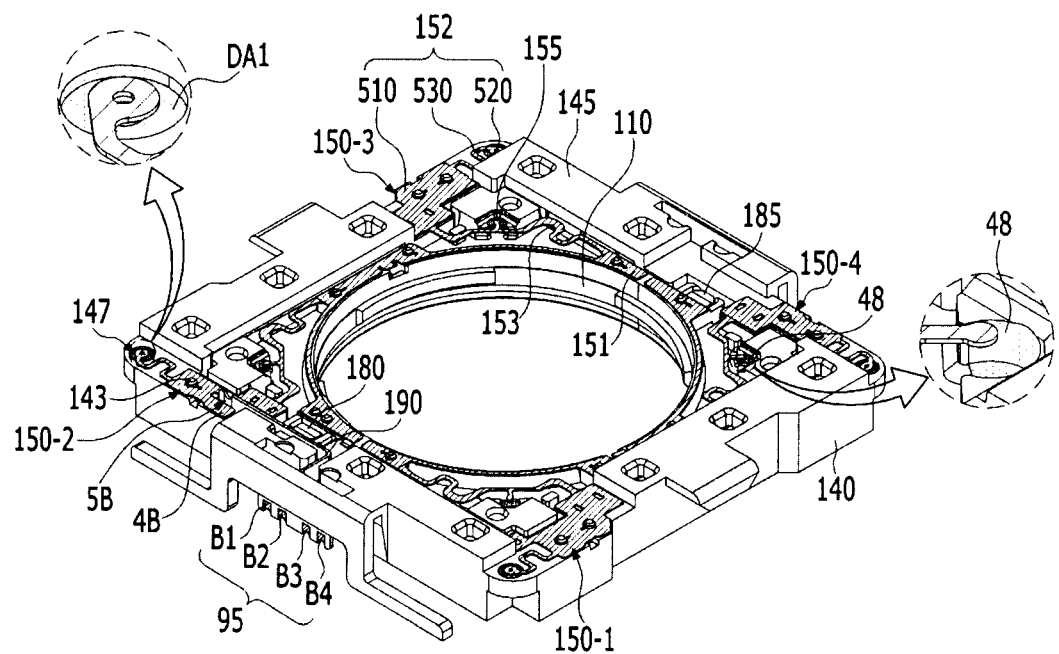
FIG. 7A is a perspective view of the bobbin, a housing, the circuit board, an upper elastic member, the sensing magnet, and the balancing magnet.
Figure 7B:
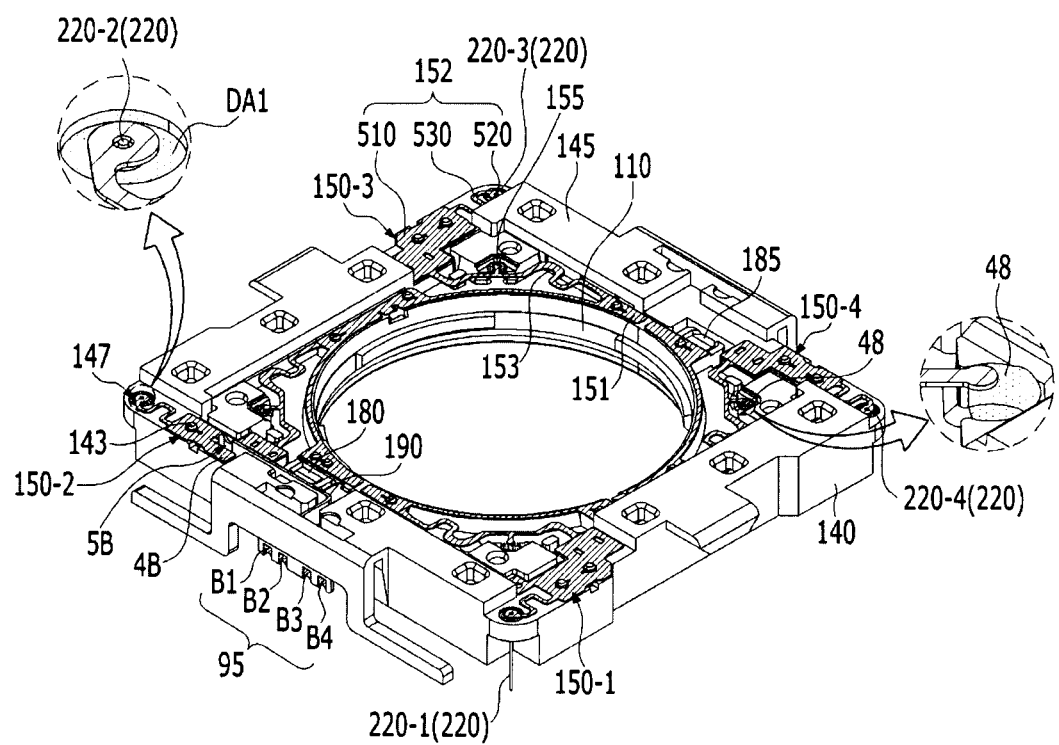
FIG. 7B is a perspective view of the configuration shown in FIG. 7A, with a wire added thereto.
Figure 8:
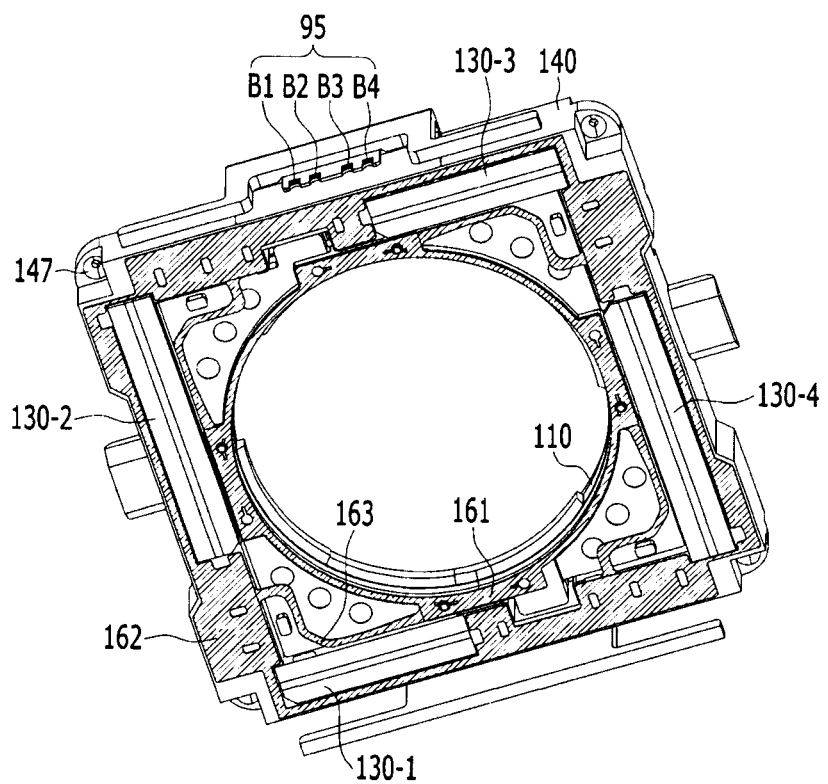
FIG. 8 is a bottom perspective view of the housing, the bobbin, a lower elastic member, a magnet, and the circuit board.

FIG. 1 is a perspective view of a camera device 10 according to an embodiment, FIG. 2 is a perspective view of the camera device 10, with a cover member 300 removed therefrom, FIG. 3 is an exploded perspective view of the camera device 10 in FIG. 1, FIG. 4A is a cross-sectional view taken along line AB in the camera device 10 in FIG. 1, FIG. 4B is a cross-sectional view taken along line CD in the camera device 10 in FIG. 1, FIG. 4C is a cross-sectional view taken along line EF in the camera device 10 in FIG. 1, FIG. 5 is an exploded perspective view of an AF driving unit 100 in FIG. 3, FIG. 6 is a perspective view of a bobbin 110, a sensing magnet 180, a balancing magnet 185, a first coil 120, a circuit board 190, a first position sensor 170, and a capacitor 195, FIG. 7A is a perspective view of the bobbin 110, a housing 140, the circuit board 190, an upper elastic member 150, the sensing magnet 180, and the balancing magnet 185, FIG. 7B is a perspective view of the configuration shown in FIG. 7A, with a wire added thereto, and FIG. 8 is a bottom perspective view of the housing 140, the bobbin 110, a lower elastic member 160, a magnet 130, and the circuit board 190.

Referring to FIGS. 1 to 8, the camera device 10 may include an AF driving unit 100 and an image sensor unit 350. The AF driving unit 100 may include an AF moving unit. The image sensor unit 350 may include an OIS driving unit. The OIS driving unit may include an OIS moving unit. Any one of the AF moving unit and the OIS moving unit may be a first moving unit, and the other of the AF moving unit and the OIS moving unit may be a second moving unit.

The camera device 10 may further include at least one of a cover member 300 or a lens module 400. The cover member 300 and a base 210 to be described later may constitute a case.

The AF driving unit 100 may be coupled to a lens module 400, and may move the lens module in the direction of the optical axis OA or a direction parallel to the optical axis, thereby performing the auto-focusing function of the camera device 10. The AF moving unit may include a bobbin 110 and components coupled to the bobbin 110. In addition, the AF moving unit may include the lens module 400.

The image sensor unit 350 may include an image sensor 810. For example, the image sensor unit 350 (or the OIS driving unit) may include an OIS moving unit including the image sensor 810. For example, the image sensor unit 350 may move the OIS moving unit (e.g. the image sensor 810) in a direction perpendicular to the optical axis. In addition, the image sensor unit 350 may tilt the OIS moving unit (e.g. the image sensor 810) relative to the optical axis, or may rotate (or roll) the same about the optical axis. The hand-tremor compensation function of the camera device 10 may be performed by the image sensor unit 350.

In an example, the image sensor 810 may include a capture area for sensing the light that has passed through the lens module 400. Here, the capture area may alternatively be referred to as an "effective area," a "light-receiving area," an "active area," or a "pixel area." For example, the capture area of the image sensor 810 may be a portion into which the light that has passed through a filter 610 is introduced so as to form an image contained in the light, and may include at least one unit pixel. For example, the capture area may include a plurality of unit pixels.

The AF driving unit 100 may alternatively be referred to as a "lens moving unit" or a "lens moving apparatus."

Alternatively, the AF driving unit 100 may be referred to as a "first moving unit (or second moving unit)," a "first actuator (or second actuator)," or an "driving unit."

In addition, the image sensor unit 350 may alternatively be referred to as an "image sensor moving unit," an "image sensor shift unit," a "sensor moving unit," or a "sensor shift unit." Alternatively, the image sensor unit 350 may be referred to as a "second moving unit (or first moving unit)" or a "second actuator (or first actuator)."

Referring to FIGS. 5 and 6, the AF driving unit 100 may move the lens module 400 in the optical-axis direction. In an example, the AF driving unit 100 may move a bobbin 110 in the optical-axis direction. In an example, the AF driving unit 100 may include the bobbin 110, a first coil 120, a magnet 130, and a housing 140. The AF driving unit 100 may further include an upper elastic member 150 and a lower elastic member 160.

In addition, the AF driving unit 100 may further include a first position sensor 170, a circuit board 190, and a sensing magnet 180 in order to implement AF feedback. In addition, the AF driving unit 100 may further include at least one of a balancing magnet 185 or a capacitor 195.

The bobbin 110 may be disposed in the housing 140, and may be moved in the direction of the optical axis OA or the first direction (e.g. the z-axis direction) by the electromagnetic interaction between the first coil 120 and the magnet 130.

The bobbin 110 may have a bore formed therein in order to be coupled to the lens module 400 or to mount the lens module 400 therein. In an example, the bore in the bobbin 110 may be a through-hole formed through the bobbin 110 in the optical-axis direction, and may have a circular shape, an elliptical shape, or a polygonal shape, without being limited thereto.

The lens module 400 may include at least one lens and/or a lens barrel. In an example, the lens module 400 may include one or more lenses and a lens barrel accommodating the one or more lenses. However, the disclosure is not limited thereto. Any of various holding structures may be used in place of the lens barrel, so long as the same is capable of supporting one or more lenses.

In an example, the lens module 400 may be screwed to the bobbin 110. Alternatively, in another example, the lens module 400 may be coupled to the bobbin 110 by means of an adhesive (not shown). Meanwhile, the light that has passed through the lens module 400 may pass through the filter 610, and may be introduced into the image sensor 810.

The bobbin 110 may be provided on the outer side surface thereof with at least one protruding portion 111A and 111B. In an example, the at least one protruding portion 111A and 111B may protrude in a direction parallel to a line perpendicular to the optical axis OA. However, the disclosure is not limited thereto. In an example, the bobbin 110 may include two protruding portions 111A and 111B, which are located opposite each other.

The protruding portions 111A and 111B of the bobbin 110 may correspond to recessed portions 25A and 25B in the housing 140, and may be inserted into or disposed in the recessed portions 25A and 25B in the housing 140. The protruding portions 111A and 111B may suppress or inhibit the bobbin 110 from rotating beyond a predetermined range about the optical axis. In addition, the protruding portions 111A and 111B may serve as a stopper for allowing the bobbin 110 to move only within a prescribed range in the optical-axis direction (e.g. the direction from the upper elastic member 150 toward the lower elastic member 160) when external impact is applied thereto.

The bobbin 110 may include a protruding portion 146A protruding in a direction perpendicular to the optical axis direction. For example, the protruding portion 146A may be disposed at a corner of the bobbin 110. The housing 140 may include a recess 146B corresponding to, opposite to, or overlapped with the protruding portion 146A. At least a portion of the protruding portion 146A is disposed in the recess 146B of the housing 140. The protruding portion 146A may serve as a stopper for allowing the bobbin 110 to move within a prescribed range in the optical-axis direction (e.g. the direction from the upper elastic member 150 toward the lower elastic member 160).

The bobbin 110 may have a first escape recess 112a formed in the upper surface thereof in order to avoid spatial interference with a first frame connection portion 153 of the upper elastic member 150. In addition, the bobbin 110 may have a second escape recess 112b formed in the lower surface thereof in order to avoid spatial interference with a second frame connection portion 163 of the lower elastic member 160.

The bobbin 110 may include a first coupling portion 116a in order to be coupled or secured to the upper elastic member 150. In an example, the first coupling portion 116a of the bobbin 110 may take the form of a protrusion, but the disclosure is not limited thereto. In another embodiment, the first coupling portion 116a of the bobbin 110 may take the form of a flat surface or a recess. In addition, the bobbin 110 may include a second coupling portion 116b in order to be coupled or secured to the lower elastic member 160. In an example, the second coupling portion 116b may take the form of a protrusion, but the disclosure is not limited thereto. In another embodiment, the second coupling portion 116b may take the form of a flat surface or a recess.

Referring to FIG. 5, the bobbin 110 may have a groove 105 formed in the outer side surface thereof to allow the first coil 120 to be seated therein, inserted thereinto, or disposed therein. In an example, the groove 105 in the bobbin 110 may have a closed curve shape (e.g. a ring shape), which coincides with the shape of the first coil 120.

In addition, the bobbin 110 may have a first seating recess 26a formed therein to allow the sensing magnet 180 to be seated therein, inserted thereinto, secured thereto, or disposed therein. In addition, the bobbin 110 may have a second seating recess 26b formed in the outer side surface thereof to allow the balancing magnet 185 to be seated therein, inserted thereinto, secured thereto, or disposed therein.

In an example, the first and second seating recesses 26a and 26b in the bobbin 110 may be formed in the outer side surfaces of the bobbin 110 that are opposite each other. In an example, the first seating recess 26a may be formed in the first protruding portion 111A of the bobbin 110, and the second seating recess 26b may be formed in the second protruding portion 111B of the bobbin 110.

The bobbin 110 may include a guide protrusion 104A to guide a portion of the first frame connection portion 153 of the upper elastic member 150. For example, the guide protrusion 104A is protruded from a bottom surface of the first escape recess 112a.

Referring to FIGS. 5, 7A, and 7B, a damper may be disposed between the bobbin 110 and the upper elastic member 150. In addition, a damper 48 may be disposed between the upper elastic member 150 and the housing 140. In an example, the damper 48 may be disposed between the housing 140 and the first frame connection portion 153 of the upper elastic member 150 so as to be in contact therewith, coupled thereto, or attached thereto.

In an example, the upper elastic member 150 may include an extension portion (or a protruding portion) 155 extending from the first frame connection portion 153. The extension portion 155 may be spaced apart from each of an outer frame 152 and an inner frame 151. In addition, the extension portion 155 may be spaced apart from one end of the first frame connection portion 153, which is connected to the inner frame 151, and the other end of the first frame connection portion 153, which is connected to the outer frame 152. The extension portion 155 may extend toward the upper surface of the bobbin 110. In an example, the extension portion 155 may extend toward the recess 104B in the bobbin 110.

For example, one end or a part of the extension portion 155 is disposed on the damper 48 disposed on the upper surface of the bobbin 110 and overlapped with the damper 48. For example, the bobbin 110 may include the recess 104B for receiving or disposing the damper 48. For example, the extension portion 155 may extend toward the recess 104B of the bobbin 110, be disposed above the recess 104B of the bobbin 110, and overlap the recess 104B of the bobbin 110. The recess 104B is recessed from the bottom surface of the first escape portion 112a.

The damper 48 may be disposed between the bobbin 110 (e.g. the upper surface thereof) and the extension portion 155 of the upper elastic member 150 so as to be in contact therewith, coupled thereto, or attached thereto. Since the damper 48 is in contact with or attached to the extension portion 155 and the bobbin 110, the damper 48 may serve to alleviate or absorb vibration of the bobbin 110. For example, the damper 48 may be embodied as a damping member (e.g. silicon). The recess 146 in the bobbin 110 may serve to accommodate or store the damper 48 so that the damper 48 does not escape downwards.

The first coil 120 may be disposed on or coupled to the bobbin 110. In an example, the first coil 120 may be disposed on or coupled to the outer side surface of the bobbin 110. In an example, the first coil 120 may surround the outer side surface of the bobbin 110 in the direction of rotation about the optical axis OA, but the disclosure is not limited thereto.

The first coil 120 may be directly wound around the outer side surface of the bobbin 110, but the disclosure is not limited thereto. In another embodiment, the first coil 120 may be wound around the bobbin 110 using a coil ring, or may be embodied as a coil block having an angled ring shape.

Power or a driving signal may be supplied to the first coil 120. The power or the driving signal supplied to the first coil 120 may be a DC signal, an AC signal, or a signal containing both DC and AC components, and may be of a voltage type or a current type.

When a driving signal (e.g. driving current) is supplied to the first coil 120, electromagnetic force may be generated by electromagnetic interaction with the magnet 130, and the bobbin 110 may be moved in the direction of the optical axis OA by the generated electromagnetic force.

When an AF operation unit is located at the initial position thereof, the bobbin 110 may be movable upwards or downwards, which is referred to as bidirectional driving of the AF operation unit. Alternatively, when the AF operation unit is located at the initial position thereof, the bobbin 110 may be movable upwards, which is referred to as unidirectional driving of the AF operation unit.

When the AF operation unit is located at the initial position thereof, the first coil 120 may be disposed so as to correspond to or overlap the magnet 130, which is disposed in the housing 140, in a direction parallel to a line that is perpendicular to the optical axis OA and extends through the optical axis.

In an example, the AF operation unit may include the bobbin 110 and components coupled to the bobbin 110 (e.g. the first coil 120, the sensing magnet 180, and the balancing magnet 185). In addition, the AF operation unit may further include the lens module 400.

The initial position of the AF operation unit may be the original position of the AF operation unit in the state in which no electric power is supplied to the first coil 120 or the position at which the AF operation unit is located as the result of the upper and lower elastic members 150 and 160 being elastically deformed due only to the weight of the AF operation unit. In addition, the initial position of the bobbin 110 may be the position at which the AF operation unit is located when gravity acts in a direction from the bobbin 110 toward the base 210 or when gravity acts in a direction from the base 210 toward the bobbin 110.

The sensing magnet 180 may provide a magnetic field, which is detected by the first position sensor 170, and the balancing magnet 185 may cancel out the influence of the magnetic field of the sensing magnet 180 and may establish weight equilibrium with the sensing magnet 180.

The sensing magnet 180 may alternatively be referred to as a "sensor magnet" or a "second magnet." The sensing magnet 180 may be disposed on the bobbin 110, or may be coupled to the bobbin 110. The sensing magnet 180 may be disposed so as to face the first position sensor 170. The balancing magnet 185 may be disposed on the bobbin 110, or may be coupled to the bobbin 110. In an example, the balancing magnet 185 may be disposed opposite the sensing magnet 180.

In an example, each of the sensing magnet 180 and the balancing magnet 185 may be a monopolar-magnetized magnet, which has one N pole and one S pole, but the disclosure is not limited thereto. In another embodiment, each of the sensing magnet 180 and the balancing magnet 185 may be a bipolar-magnetized magnet or a 4-pole magnet, which includes two N poles and two S poles.

The sensing magnet 180 may be moved together with the bobbin 110 in the optical-axis direction, and the first position sensor 170 may detect the intensity of the magnetic field or the magnetic force of the sensing magnet 180, which is moved in the optical-axis direction, and may output an output signal corresponding to the result of the detection.

In an example, the intensity of the magnetic field or the magnetic force detected by the first position sensor 170 may vary depending on displacement of the bobbin 110 in the optical-axis direction. The first position sensor 170 may output an output signal proportional to the detected intensity of the magnetic field, and the displacement of the bobbin 110 in the optical-axis direction may be detected using the output signal from the first position sensor 170.

The housing 140 is disposed in the cover member 300. In an example, the housing 140 may be disposed on the image sensor unit 350.

The housing 140 may accommodate therein the bobbin 110, and may support the magnet 130, the first position sensor 170, and the circuit board 190.

Referring to FIGS. 5 and 7A-8, the housing 140 may be formed so as to take the overall shape of a hollow column. In an example, the housing 140 may have a polygonal (e.g. quadrangular or octagonal) or circular bore formed therein, and the bore in the housing 140 may take the form of a through-hole formed through the housing 140 in the optical-axis direction.

The housing 140 may include side portions, which correspond to or face side plates 302 of the cover member 300, and corners, which correspond to or face the corners of the cover member 300.

When the OIS moving unit is located at the initial position thereof, a gap may be present between the outer side surface of the housing 140 and the inner side surface of the side plate 302 of the cover member 300. For example, the gap between the outer side surface of the housing 140 and the inner side surface of the side plate 302 of the cover member 300 may be 0.05 mm to 1 mm. Alternatively, for example, the gap may be 0.1 mm to 0.5 mm.

The housing 140 may be provided on the upper portion, the upper surface, or the upper end thereof with a stopper 145 in order to be inhibited from directly colliding with the inner surface of the upper plate 301 of the cover member 300.

Referring to FIG. 5, the housing 140 may have a mounting groove (or a groove) 14A formed therein to accommodate the circuit board 190. The mounting groove 14A may have a shape coinciding with the shape of the circuit board 190.

Referring to FIGS. 7A and 7B, the housing 140 may have an opening formed therein to expose terminals B1 to B4 of a terminal unit 95 of the circuit board 190 therethrough. The opening may be formed in the side portion of the housing 140.

The housing 140 may be provided on the upper portion, the upper end, or the upper surface thereof with at least one first coupling portion 143 for coupling to a first outer frame 152 of the upper elastic member 150. The housing 140 may be provided on the lower portion, the lower end, or the lower surface thereof with a second coupling portion for coupling and securing to a second outer frame 162 of the lower elastic member 160. For example, each of the first and second coupling portions of the housing 140 may be formed in the shape of a flat surface, a protrusion, or a recess.

The housing 140 may have a hole 147 formed in the corner thereof. The hole 147 is a path through which a support member, e.g. a support member 220, passes. The hole 147 may be a through-hole formed through the housing 140 in the optical-axis direction. In an example, the hole 147 may include a portion that increases in diameter in a direction from the upper surface of the housing 140 toward the lower surface of the housing 140. For example, the hole may have a funnel shape or a cone shape when viewed from below. In addition, the hole 147 may include a slanted surface or a tapered slanted surface.

In another embodiment, the hole may be formed so as to be depressed in the outer side surface of the corner portion of the housing 140, and at least a portion of the hole may be open to the outer side surface of the corner portion. The number of holes 147 in the housing 140 may be equal to the number of support members 220.

The magnet 130 may be disposed on, coupled to, or secured to the housing 140, which is a fixed part. In an example, the magnet 130 may be disposed on, coupled to, or secured to the side portion of the housing 140. The magnet 130 may include an AF driving magnet 71A for implementing AF operation. In addition, the magnet 130 may include an OIS driving magnet 71B for implementing OIS operation. Hereinafter, the AF driving magnet 71A may be referred to as "any one of the first magnet or the second magnet," and the OIS driving magnet 71B may be referred to as "the other of the first magnet and the second magnet."

In another embodiment, the magnet 130 may be disposed on, coupled to, or secured to the corner portion of the housing.

For example, the magnet 130 may include a plurality of magnet units. In an example, the magnet 130 may include first to fourth magnet units 130-1 to 130-4 disposed on the housing 140. In another embodiment, the magnet 130 may include two or more magnet units.

The magnet 130 may be disposed on at least one of the side portion of the housing 140 or the corner of the housing 140. In an example, at least a portion of the magnet 130 may be disposed on the side portion or the corner of the housing 140. Alternatively, in another example, at least a portion of the magnet 130 may be disposed on the side portion of the housing 140, and the remaining portion of the magnet 130 may be disposed on the corner of the housing 140.

In an example, each of the magnet units 130-1 to 130-4 may include a first portion disposed on a corresponding corner among the four corners of the housing 140. In addition, each of the magnet units 130-1 to 130-4 may include a second portion disposed on the side portion of the housing 140 that is adjacent to the corresponding corner of the housing 140.

In an example, the first magnet unit 130-1 and the third magnet unit 130-3 may be respectively located on two opposite sides of the housing 140 in the first horizontal direction (e.g. the y-axis direction). In an example, the second magnet unit 130-2 and the fourth magnet unit 130-4 may be respectively located on two opposite sides of the housing 140 in the second horizontal direction (e.g. the x-axis direction).

In an example, the first magnet unit 130-1 and the third magnet unit 130-3 may be disposed parallel to each other in the second horizontal direction (e.g. the x-axis direction), and the second magnet unit 130-2 and the fourth magnet unit 130-4 may be disposed parallel to each other in the first horizontal direction (e.g. the y-axis direction).

When the AF operation unit is located at the initial position thereof, the magnet 130 may be disposed on the housing 140 such that at least a portion thereof overlaps the first coil 120 in a direction parallel to a line that is perpendicular to the optical axis OA and extends through the optical axis OA.

The magnet 130 may include a monopolar-magnetized magnet or a 2-pole magnet, which includes one N-pole region and one S-pole region. In another embodiment, the magnet 130 may include a bipolar-magnetized magnet or a 4-pole magnet, which includes two N-pole regions and two S-pole regions. In still another embodiment, the magnet 130 may include a monopolar-magnetized magnet and a bipolar-magnetized magnet.

In an example, the magnet 130 may include a magnet for AF (or an AF driving magnet) for implementing AF operation and a magnet for OIS (or an OIS driving magnet) for implementing OIS operation. In another embodiment, the magnet 130 may be a common magnet for implementing AF operation and OIS operation.

Figure 19A:
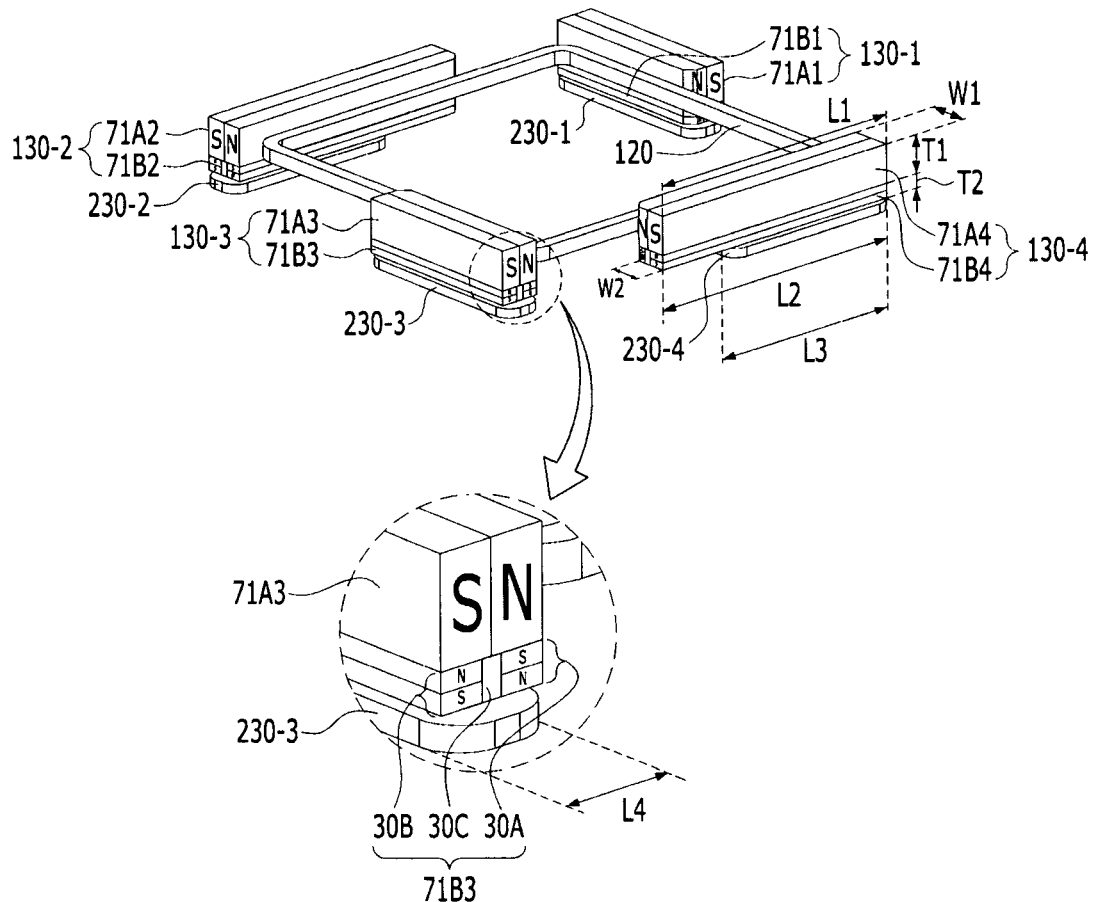
FIG. 19A shows an embodiment of the magnet in FIG. 5.

FIG. 19A shows an embodiment of the magnet 130 in FIG. 5.

Referring to FIG. 19A, the magnet 130 may include a first magnet 71A, which is a magnet for AF, and a second magnet 71B, which is a magnet for OIS and is disposed under the first magnet 71A.

The first magnet 71A may be a 2-pole magnet that includes one N-pole region and one S-pole region. In an example, the N-pole region and the S-pole region of the first magnet 71A may be disposed so as to face each other or disposed opposite each other in a direction perpendicular to the optical axis. In another embodiment, the first magnet 71A may be a 4-pole magnet that includes two N-pole regions and two S-pole regions.

The first magnet 71A may include a plurality of magnet units 71A1 to 71A4. As described above, each of the plurality of magnet units 71A1 to 71A4 may be a 2-pole magnet or a 4-pole magnet. In an example, the magnet units 71A1 to 71A4 may have the same size and shape as each other. In an example, two magnet units 71A1 and 71A3, which are opposite each other in a first diagonal direction, may have the same size and shape as each other, and the remaining two magnet units 71A2 and 71A4, which are opposite each other in a second diagonal direction, may have the same size and shape as each other.

In another embodiment, the sizes and shapes of two magnet units 71A1 and 71A3 may be different from those of the remaining two magnet units 71A2 and 71A4. In an example, the length of the long side of each of two magnet units 71A1 and 71A3 may be longer than the length of the long side of each of the remaining two magnet units 71A2 and 71A4. In an example, the length of the short side of each of two magnet units 71A1 and 71A3 may be equal to the length of the short side of each of the remaining two magnet units 71A2 and 71A4.

The second magnet 71B may be a 4-pole magnet that includes two N-pole regions and two S-pole regions. In an example, the second magnet 71B may include a first magnet portion 30A, a second magnet portion 30B, and a partition wall 30C disposed between the first magnet portion 30A and the second magnet portion 30B. In this case, the partition wall 30C may be a non-magnetic material or air. The partition wall may be referred to as a "neutral zone" or a "neutral region." In another embodiment, the second magnet 71B may be a 2-pole magnet that includes one N-pole region and one S-pole region.

In an example, the first magnet portion 30A and the second magnet portion 30B may be spaced apart from each other in a direction perpendicular to the first direction (or the optical-axis direction). In an example, the first magnet portion 30A may include a first N-pole region and a first S-pole region, which are opposite each other or face each other in the optical-axis direction. The second magnet portion 30B may include a second N-pole region and a second S-pole region, which are opposite each other or face each other in the optical-axis direction. In addition, the first N-pole region (or the first S-pole region) of the first magnet portion 30A and the second S-pole region (or the second N-pole region) of the second magnet portion 30B may be opposite each other or face each other in a direction perpendicular to the optical axis.

The second magnet 71B may include a plurality of magnet units 71B1 to 71B4. As described above, each of the plurality of magnet units 71B1 to 71B4 may be a 4-pole magnet. In another embodiment, each of the magnet units 71B1 to 71B4 may be a 2-pole magnet. Each of the magnet units 71B1 to 71B4 may face or overlap a corresponding one of the second coil units 230-1 to 230-4 in the optical-axis direction.

In an example, the magnet units 71B1 to 71B4 may have the same size and shape as each other. In an example, two magnet units 71B1 and 71B3, which are opposite each other in the first diagonal direction, may have the same size and shape as each other, and the remaining two magnet units 71B2 and 71B4, which are opposite each other in the second diagonal direction, may have the same size and shape as each other.

In another embodiment, the sizes and shapes of two magnet units 71B1 and 71B3 may be different from those of the remaining two magnet units 71B2 and 71B4. In an example, the length of the long side of each of two magnet units 71B1 and 71B3 may be longer than the length of the long side of each of the remaining two magnet units 71B2 and 71B4. In an example, the length of the short side of each of two magnet units 71B1 and 71B3 may be equal to the length of the short side of each of the remaining two magnet units 71B2 and 71B4.

The second magnet 71B may be disposed under the first magnet 71A. The second magnet 71B may be disposed on the lower surface of the first magnet 71A. In an example, the upper surface of the second magnet 71B may be in contact with the lower surface of the first magnet 71A, or may be secured or coupled to the lower surface of the first magnet 71A by means of an adhesive. In an example, at least a portion of the first magnet 71A may overlap at least a portion of the second magnet 71B in the first direction (or the optical-axis direction).

In another embodiment, the second magnet may be spaced apart from the first magnet. In this case, a portion of the housing 140 may be disposed between the first magnet and the second magnet. Alternatively, in another embodiment, a partition wall or a yoke may be disposed between the first magnet and the second magnet, which are spaced apart from each other. In this case, the description of the partition wall 30C may also be applied to this partition wall.

In an example, the length T2 of the second magnet 71B in the optical-axis direction may be shorter than the length T1 of the first magnet 71A in the optical-axis direction (T2<T1). In another embodiment, "T2" may be longer than or equal to "T1."

In addition, the length L2 of the long side of the second magnet 71B may be shorter than or equal to the length L1 of the long side of the first magnet 71A (L2≤L1). In another embodiment, "L2" may be longer than "L1."

In addition, the width W2 (or the length of the short side) of the second magnet 71B may be less than or equal to the width W1 (or the length of the short side) of the first magnet 71A (W2≤W1). In another embodiment, "W2" may be greater than "W1."

When the AF moving unit is located at the initial position thereof, the first coil 120 may face or overlap the first magnet 71A in a direction perpendicular to the first direction (or the optical-axis direction). Referring to FIG. 19A, the N-pole region of the first magnet 71A may be disposed so as to face the first coil 120, or may be located closer to the first coil 120 than the S-pole region thereof. However, in another embodiment, the positions of the N-pole region and the S-pole region of the first magnet 71A may be interchanged.

In an example, when the OIS moving unit is located at the initial position thereof, at least a portion of the first magnet 130 may overlap at least a portion of the second coil 230 in the first direction (or the optical-axis direction). In an example, when the OIS moving unit is located at the initial position thereof, at least a portion of the second magnet 71B may overlap at least a portion of the second coil 230 in the first direction (or the optical-axis direction).

The length L2 of the long side of the second magnet 71B may be longer than the length L3 of the long side of the second coil 230 (L2>L3). In another embodiment, the length of the long side of the second magnet 71B may be shorter than or equal to the length of the long side of the second coil 230.

The width W2 (or the length of the short side) of the second magnet 71B may be greater than the length L4 of the short side of the second coil 230 (W2>L4). In another embodiment, the length of the long side of the second magnet 71B may be shorter than or equal to the length of the long side of the second coil 230.

In an example, the length of the long side of each of two magnet units 71B1 and 71B3 of the second magnet 71B may be shorter than the length of the long side of a respective one of the coil units 230-1 and 230-3 of the second coil 230. In another embodiment, the length of the long side of each of two magnet units 71B1 and 71B3 may be equal to or longer than the length of the long side of a respective one of the coil units 230-1 and 230-3.

In addition, the length of the long side of each of the remaining two magnet units 71B2 and 71B4 of the second magnet 71B may be longer than the length of the long side of a respective one of the coil units 230-2 and 230-4 of the second coil 230. In another embodiment, the length of the long side of each of the magnet units 71B2 and 71B4 may be equal to or shorter than the length of the long side of a respective one of the coil units 230-2 and 230-4 of the second coil 230.

In an example, the length of the short side of each of the first to fourth magnet units 71B1 to 71B4 of the second magnet 71B may be shorter than the length of the short side of a respective one of the first to fourth coil units 230-1 to 230-4 of the second coil 230. In another embodiment, the length of the short side of each of the first to fourth magnet units 71B1 to 71B4 may be longer than the length of the short side of a respective one of the first to fourth coil units 230-1 to 230-4.

Figure 19B:
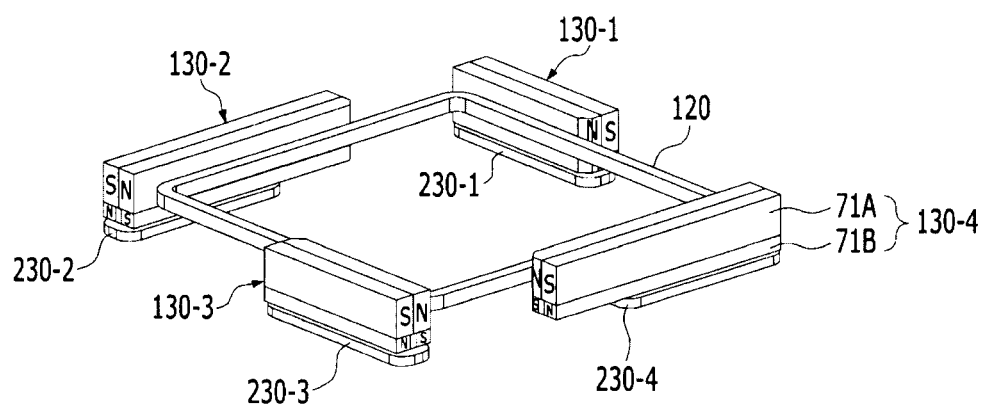
FIG. 19B shows another embodiment of the magnet in FIG. 5.

FIG. 19B shows another embodiment of the magnet 130 in FIG. 5.

Referring to FIG. 19B, the second magnet 71BB shown in FIG. 19B may be a 2-pole magnet that includes one N-pole region and one S-pole region. The description of the lengths T2, L2, and W2 of the second magnet 71B shown in FIG. 19A may also be applied to the second magnet 71BB shown in FIG. 19B.

The circuit board 190 may be disposed in the housing 140, and the first position sensor 170 may be disposed or mounted on the circuit board 190, and may be conductively connected to the circuit board 190. In an example, the circuit board 190 may be disposed in the mounting groove 14A in the housing 140, and the terminal unit 95 of the circuit board 190 may be exposed outside the housing 140.

The circuit board 190 may be provided with the terminal unit 95 including a plurality of terminals B1 to B4 for conductive connection to an external terminal or an external device. The plurality of terminals B1 to B4 of the circuit board 190 may be conductively connected to the first position sensor 170.

The first position sensor 170 may be disposed on the housing 140 and/or the circuit board 190. In an example, the first position sensor 170 may be disposed on a first surface of the circuit board 190, and the plurality of terminals B1 to B4 may be disposed on a second surface of the circuit board 190. Here, the second surface of the circuit board 190 may be a surface opposite the first surface of the circuit board 190. In an example, the first surface of the circuit board 190 may be the surface of the circuit board 190 that faces the bobbin 110 or the sensing magnet 180. For example, the circuit board 190 may be a printed circuit board or a flexible printed circuit board (FPCB).

The first position sensor 170 may be conductively connected to the circuit board 190. In an example, the first position sensor 170 may be conductively connected to the first to fourth terminals B1 to B4 of the circuit board 190. In an example, the circuit board 190 may include a circuit pattern or wiring (not shown) for conductively connecting the first to fourth terminals B1 to B4 to the first position sensor 170.

In an example, when the AF operation unit is located at the initial position thereof, at least a portion of the first position sensor 170 may face or overlap the sensing magnet 180 in a direction parallel to a line that is perpendicular to the optical axis OA and extends through the optical axis OA. In another embodiment, when the AF operation unit is located at the initial position thereof, the first position sensor may not face or overlap the sensing magnet.

The first position sensor 170 serves to detect the movement, displacement, or position of the bobbin 110 in the optical-axis direction. That is, when the bobbin 110 is moved, the first position sensor 170 may detect the magnetic field or the intensity of the magnetic field of the sensing magnet 180 mounted to the bobbin 110, and may output an output signal corresponding to the result of the detection. The movement, displacement, or position of the bobbin 110 in the optical-axis direction may be detected using the output from the first position sensor 170.

The first position sensor 170 may be a driver IC including a Hall sensor and a driver. The first position sensor 170 may include first to fourth terminals for transmitting and receiving data to and from the outside through data communication using a protocol, such as I2C communication, and fifth and sixth terminals for directly supplying a driving signal to the first coil 120.

In an example, each of the first to fourth terminals of the first position sensor 170 may be conductively connected to a corresponding one of the first to fourth terminals B1 to B4 of the circuit board 190 by means of a solder or a conductive adhesive.

In addition, in an example, the fifth and sixth terminals of the first position sensor 170 may be conductively connected to the first coil 120. In an example, the first position sensor 170 may be conductively connected to the first coil 120 via at least one of the upper elastic member 150 or the lower elastic member 160, and may supply a driving signal to the first coil 120.

In an example, a portion of a first upper elastic unit 150-1 may be connected to one end of the first coil 120, and the other portion of the first upper elastic unit 150-1 may be conductively connected to the circuit board 190. A portion of a second upper elastic unit 150-2 may be connected to the other end of the first coil 120, and the other portion of the second upper elastic unit 150-2 may be conductively connected to the circuit board 190. The circuit board 190 may include a first pad 5A, which is conductively connected to the other portion of the first upper elastic unit 150-1, and a second pad 5B, which is conductively connected to the other portion of the second upper elastic unit 150-2. Each of the fifth and sixth terminals of the first position sensor 170 may be conductively connected to a corresponding one of the first and second pads 5A and 5B of the circuit board 190.

In another embodiment, the first coil 120 may be conductively connected to the circuit board 190 and the fifth and sixth terminals of the first position sensor 170 via the two lower elastic members.

For example, in an embodiment in which the first position sensor 170 is a driver IC, the first and second terminals B1 and B2 of the circuit board 190 may be power terminals for supplying power, the third terminal B3 may be a terminal for transmitting and receiving a clock signal, and the fourth terminal B4 may be a terminal for transmitting and receiving a data signal.

In another embodiment, the first position sensor 170 may be a Hall sensor. In this case, the first position sensor 170 may include two input terminals for receiving a driving signal or power supplied thereto and two output terminals for outputting a sensing voltage (or output voltage). In an example, a driving signal may be supplied to the first position sensor 170 through the first and second terminals B1 and B2 of the circuit board 190, and the output from the first position sensor 170 may be output to the outside through the third and fourth terminals B3 and B4. In addition, the first coil 120 may be conductively connected to the circuit board 190. The circuit board 190 may further include two separate terminals in addition to the first to fourth terminals B1 to B4, and a driving signal may be supplied to the first coil 120 from the outside through the two separate terminals.

In an example, among the power terminals of the first position sensor 170, a ground terminal may be conductively connected to the cover member 300.

The capacitor 195 may be disposed or mounted on the first surface of the circuit board 190. The capacitor 195 may be of a chip type. In this case, the chip may include a first terminal, which corresponds to one end of the capacitor 195, and a second terminal, which corresponds to the other end of the capacitor 195. The capacitor 195 may alternatively be referred to as a "capacitive element" or a "condenser."

The capacitor 195 may be conductively connected in parallel to the first and second terminals B1 and B2 of the circuit board 190, through which power (or a driving signal) is supplied to the first position sensor 170 from the outside. Alternatively, the capacitor 195 may be conductively connected in parallel to the terminals of the first position sensor 170, which are conductively connected to the first and second terminals B1 and B2 of the circuit board 190.

Since the capacitor 195 is conductively connected in parallel to the first and second terminals B1 and B2 of the circuit board 190, the capacitor 195 may serve as a smoothing circuit for removing ripple components included in power signals GND and VDD, which are supplied to the first position sensor 170 from the outside, and thus may supply stable and consistent power signals to the first position sensor 170.

In another embodiment, the sensing magnet 180 may be disposed on the housing 140, and the first position sensor 170 may be disposed on the bobbin 110. In another embodiment, the balancing magnet 185 may be omitted.

The upper elastic member 150 and the lower elastic member 160 may be coupled to the bobbin 110 and the housing 140. In an example, the upper elastic member 150 may be coupled to the upper portion, the upper end, or the upper surface of the bobbin 110 and to the upper portion, the upper end, or the upper surface of the housing 140, and the lower elastic member 160 may be coupled to the lower portion, the lower end, or the lower surface of the bobbin 110 and to the lower portion, the lower end, or the lower surface of the housing 140. The upper elastic member 150 and the lower elastic member 160 may elastically support the bobbin 110 with respect to the housing 140.

The upper elastic member 150 and the lower elastic member 160 may support the AF operation unit, e.g. the bobbin or the lens module (e.g. the lens barrel), with respect to the housing 140, which is the fixed part. In an example, the upper elastic member 150 and the lower elastic member 160 may elastically support the bobbin 110 or the lens module 400 (e.g. the lens barrel) with respect to the housing 140. In an example, the camera device 10 according to the embodiment may include at least one of the upper elastic member 150 or the lower elastic member 160.

The upper elastic member 150 may include a plurality of upper elastic units 150-1 to 150-4, which are conductively separated or isolated from each other. The lower elastic member 160 may be embodied as a single elastic unit. In another embodiment, the lower elastic member 160 may include a plurality of lower elastic units, which are conductively separated or isolated from each other. In another embodiment, at least one of the upper elastic member or the lower elastic member may be embodied as a single unit or a single construction.

The upper elastic member 150 may further include a first inner frame 151 coupled or secured to the upper portion, the upper surface, or the upper end of the bobbin 110, a first outer frame 152 coupled or secured to the upper portion, the upper surface, or the upper end of the housing 140, and a first frame connection portion 153 interconnecting the first inner frame 151 and the first outer frame 152. In addition, the upper elastic member 150 may include the above-described extension portion 155.

The lower elastic member 160 may further include a second inner frame 161 coupled or secured to the lower portion, the lower surface, or the lower end of the bobbin 110, a second outer frame 162 coupled or secured to the lower portion, the lower surface, or the lower end of the housing 140, and a second frame connection portion 163 interconnecting the second inner frame 161 and the second outer frame 162. The inner frame may alternatively be referred to as an "inner portion," the outer frame may alternatively be referred to as an "outer portion," and the frame connection portion may alternatively be referred to as a "connection portion."

Each of the first and second frame connection portions 153 and 163 may be formed so as to be bent or curved at least once to form a predetermined pattern.

Each of the upper elastic member 150 and the lower elastic member 160 may be made of a conductive material, such as a metal material. In addition, each of the upper elastic member 150 and the lower elastic member 160 may be embodied as an elastic member, such as a leaf spring.

In an example, referring to FIGS. 5, 7A, and 7B, the first outer frame 152 of the first upper elastic unit 150-1 may include a first bonding portion 4A, which is coupled or conductively connected to the first pad 5A of the circuit board 190, and the first outer frame 152 of the second upper elastic unit 150-2 may include a second bonding portion 4B, which is conductively connected to the second pad 5B of the circuit board 190.

In another embodiment, at least one of the upper elastic member 150 or the lower elastic member 160 may include two elastic members. In an example, each of the two elastic members of any one of the upper elastic member 150 and the lower elastic member 160 may be coupled or conductively connected to a corresponding one of the first and second pads of the circuit board 190, and the first coil 120 may be conductively connected to the two elastic members.

The first outer frame 152 of the upper elastic member 150 may include a first coupling portion 510 coupled to the housing 140, a second coupling portion 520 coupled to the support member 220, and a connection portion 530 interconnecting the first coupling portion 510 and the second coupling portion 520. The first coupling portion 510 may have a through-hole or a hole formed therein so as to be coupled to the first coupling portion 143 of the housing 140. The second coupling portion 520 may have a through-hole or a hole formed therein so as to be coupled to the support member 220. In an example, the second coupling portion 520 may be coupled to the support member 220 by means of a conductive adhesive or a solder. In an example, the connection portion 530 may include a bent portion, which is bent at least once, or a curved portion, which is curved at least once. In another embodiment, the connection portion 530 may have a straight shape.

Figure 9:
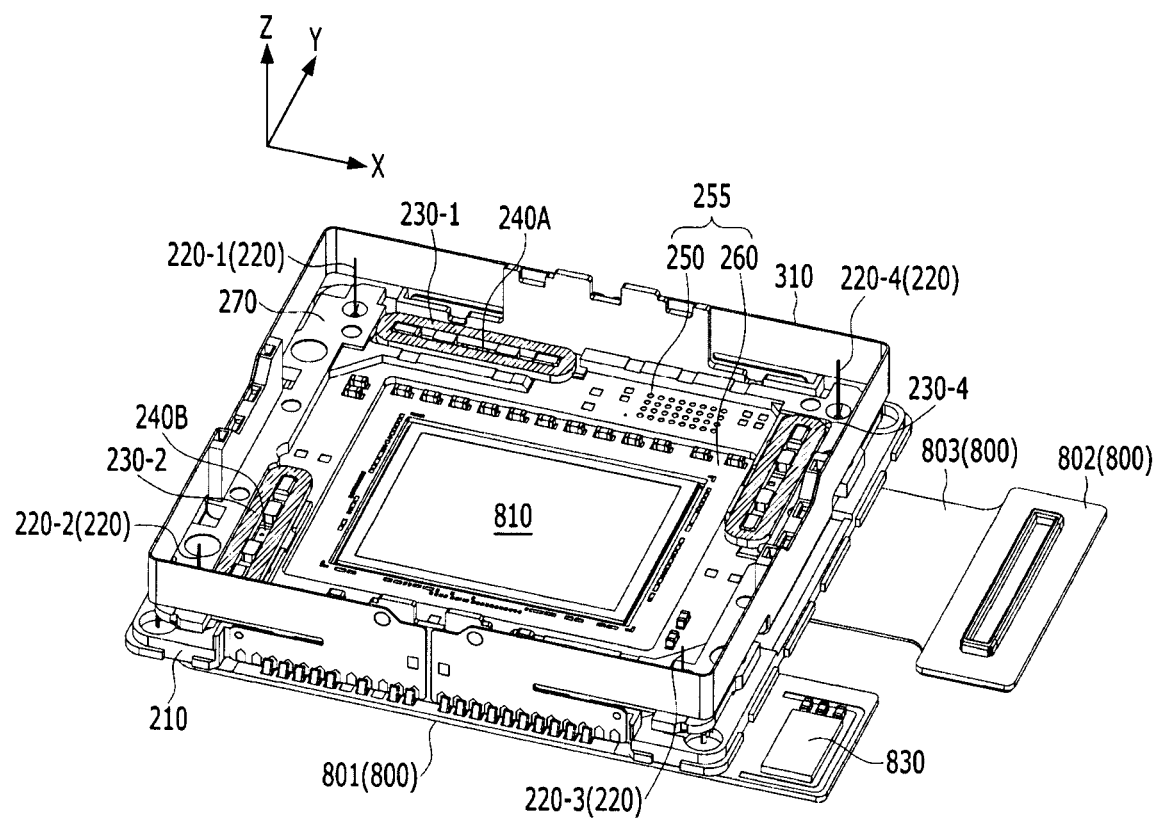
FIG. 9 is a perspective view of an image sensor unit.
Figure 10A:
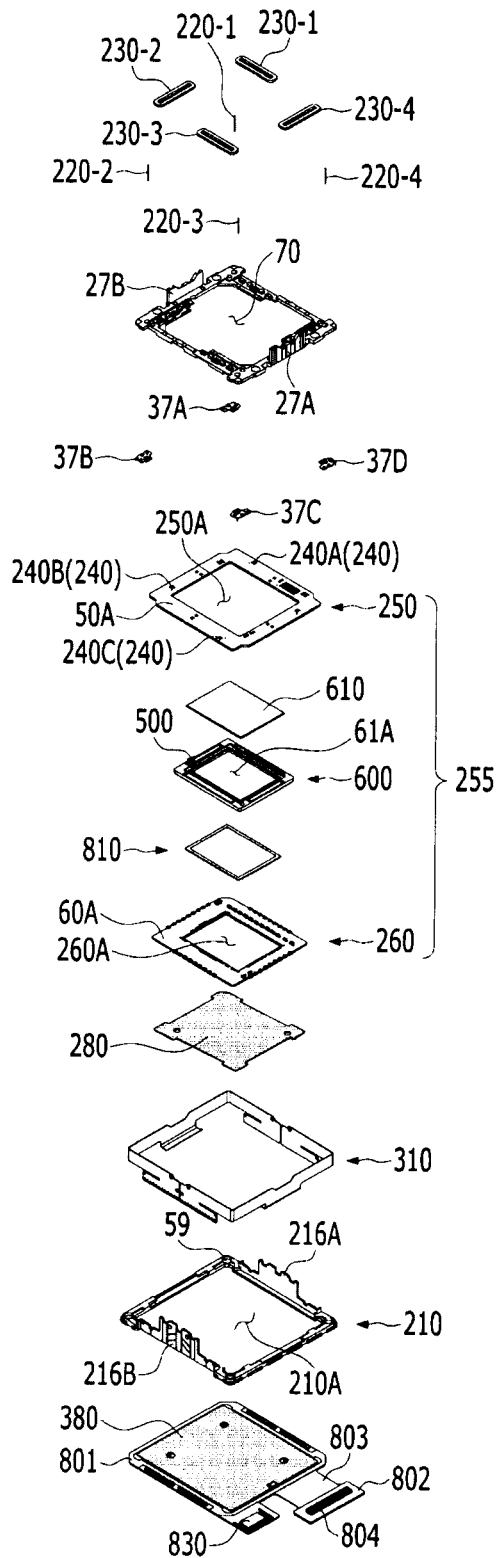
FIG. 10A is a first exploded perspective view of the image sensor unit in FIG. 9.
Figure 10B:
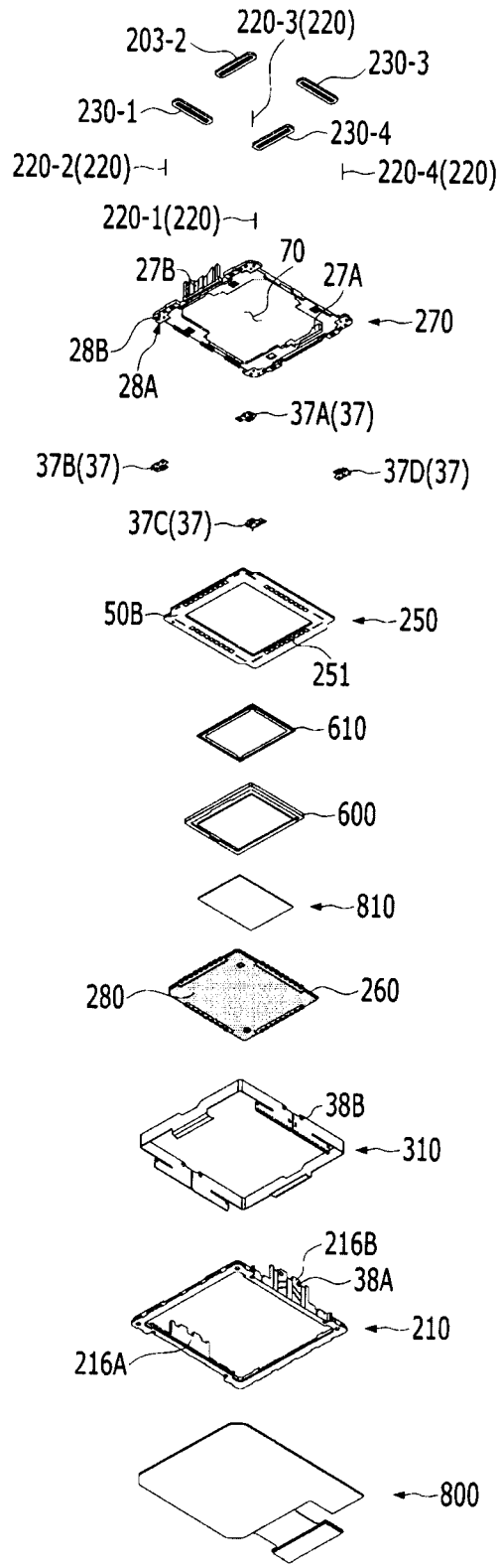
FIG. 10B is a second exploded perspective view of the image sensor unit in FIG. 9.
Figure 10C:
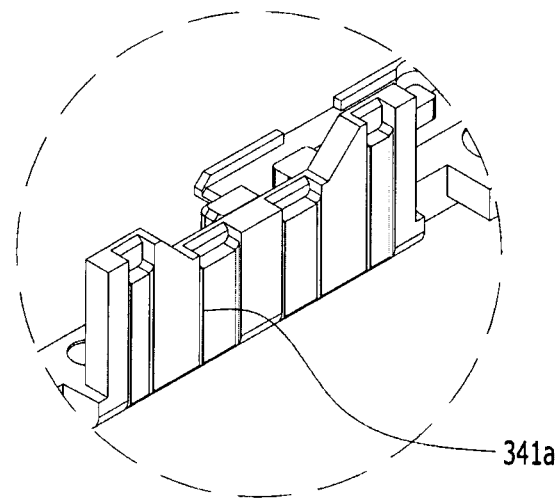
FIG. 10C is an enlarged view of a groove in the holder in FIG. 10A.
Figure 10D:
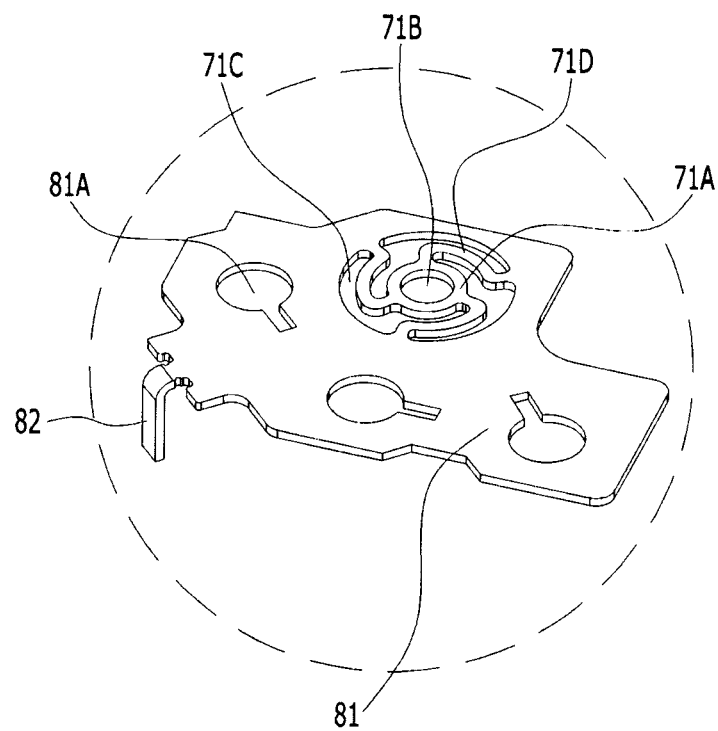
FIG. 10D is an enlarged view of the terminal unit in FIG. 10A.
Figure 10E:
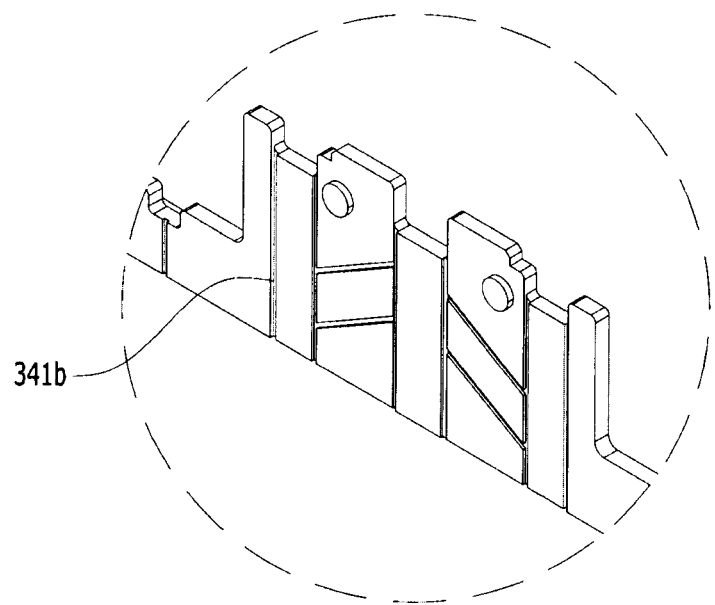
FIG. 10E is an enlarged view of a recess in the base in FIG. 10A.
Figure 10F:
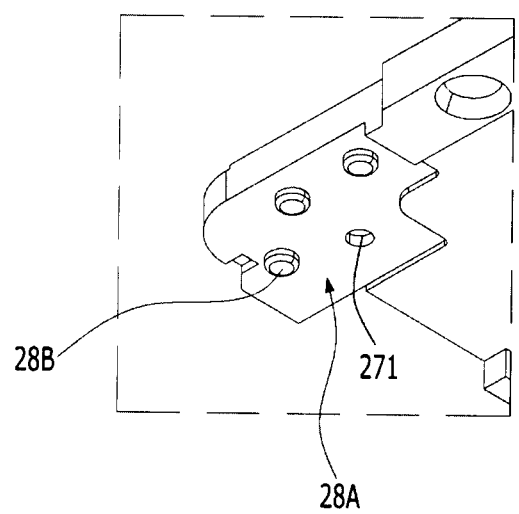
FIG. 10F is an enlarged view of a recess in the holder, in which the terminal unit in FIG. 10B is disposed.
Figure 11:
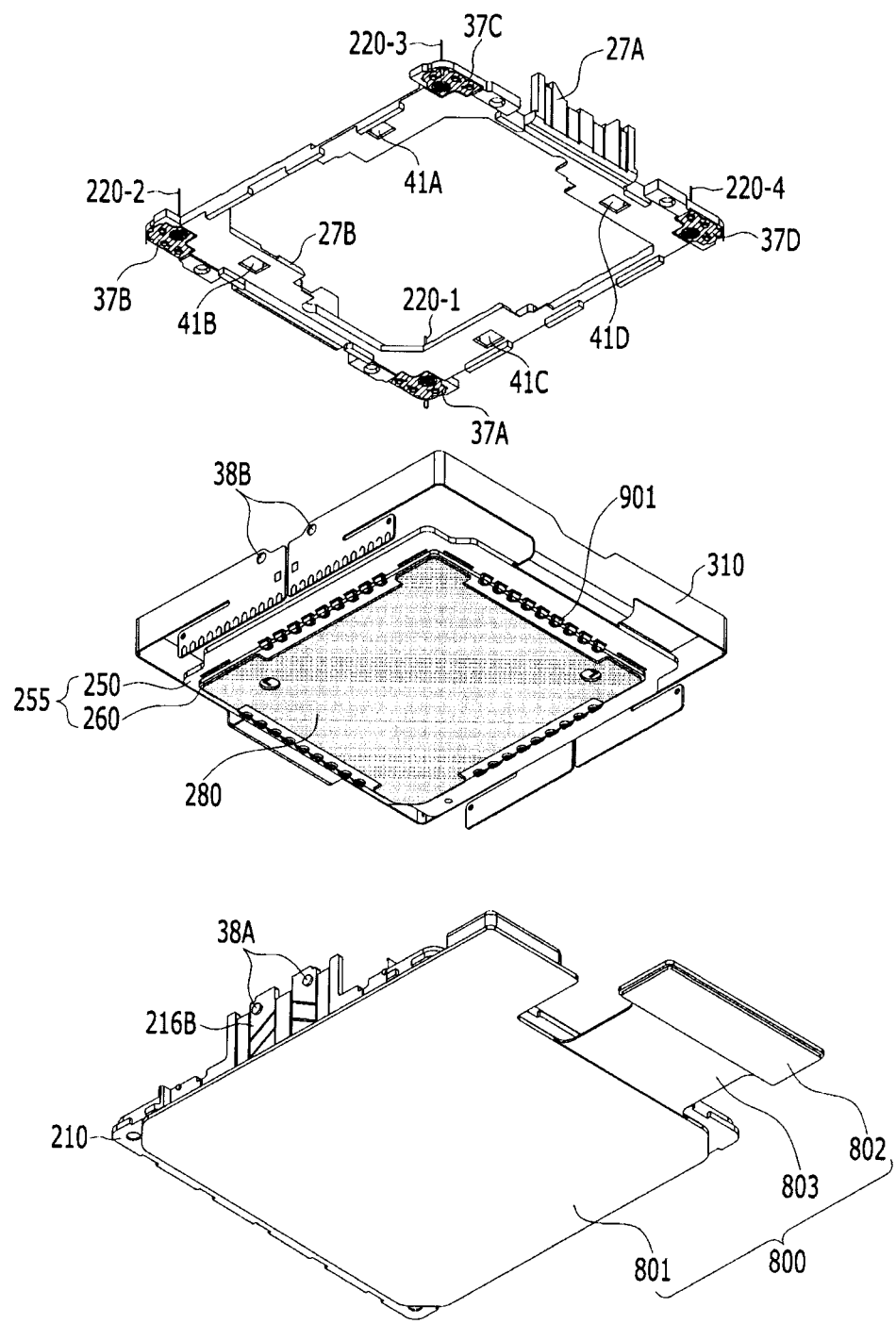
FIG. 11 is a bottom perspective view of the holder, the terminal unit, the first board unit, the support board, the base, and the second board unit in FIG. 10A.
Figure 12:
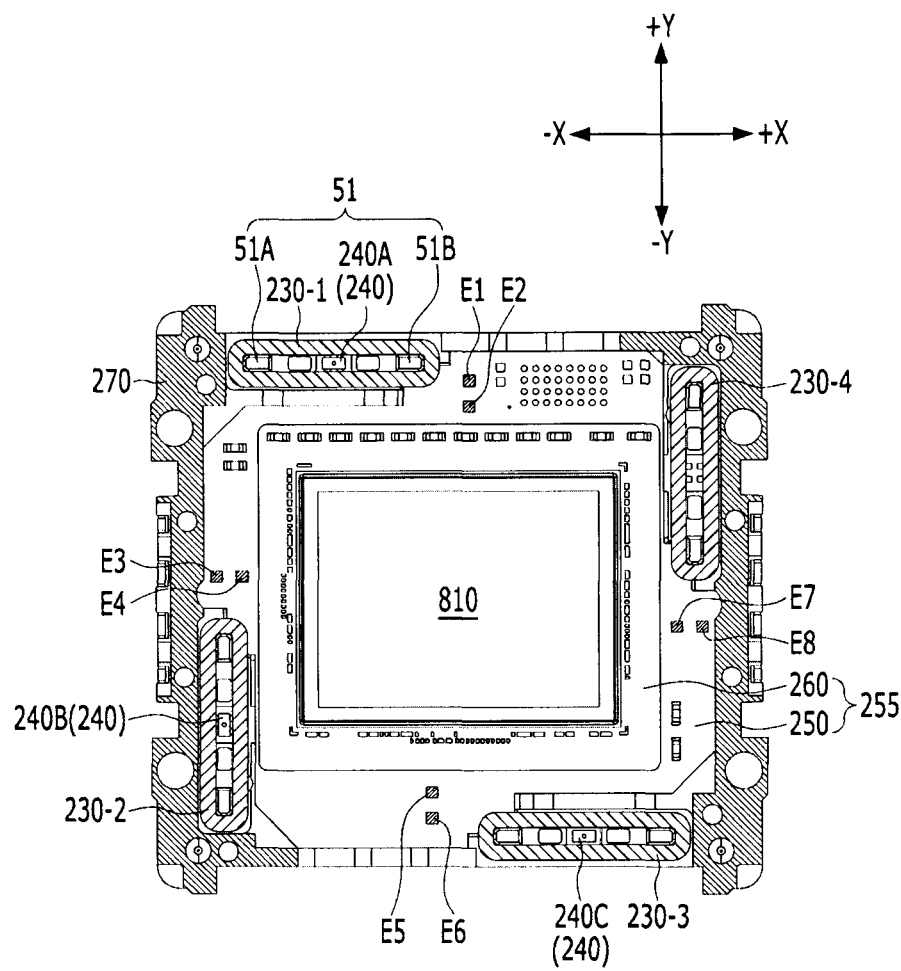
FIG. 12 is a plan view of the holder, the first board unit, the image sensor, a second coil, and an OIS position sensor.
Figure 13:
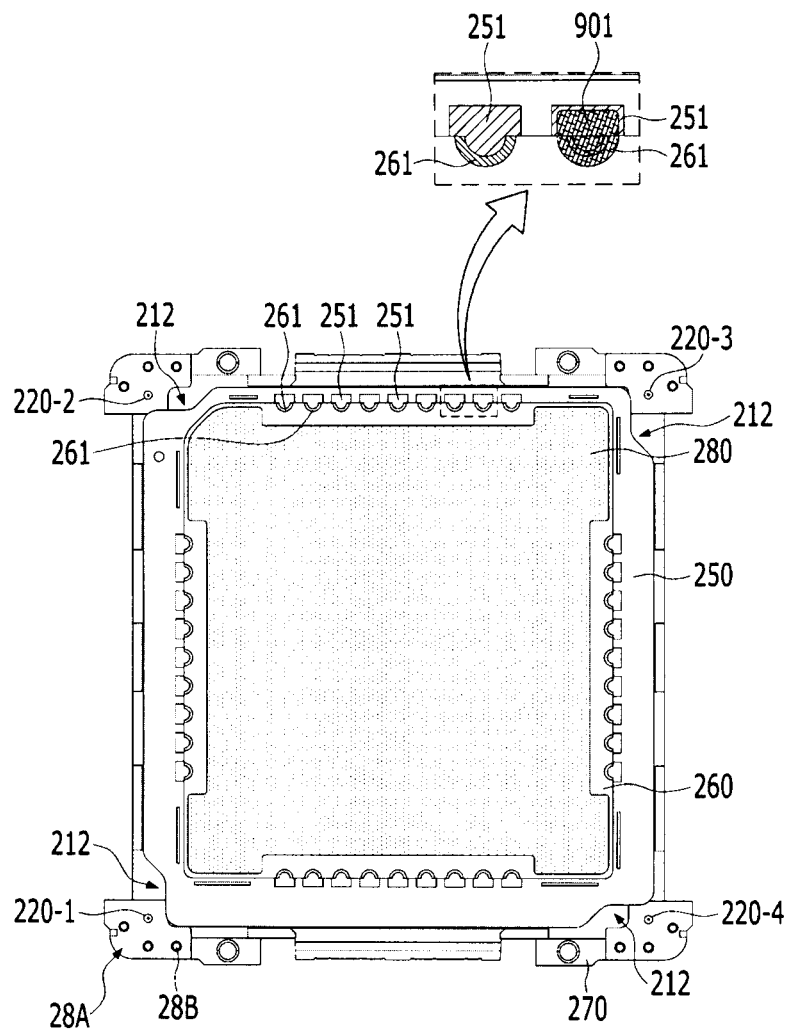
FIG. 13 is a rear perspective view of the holder and the first board unit.
Figure 14:
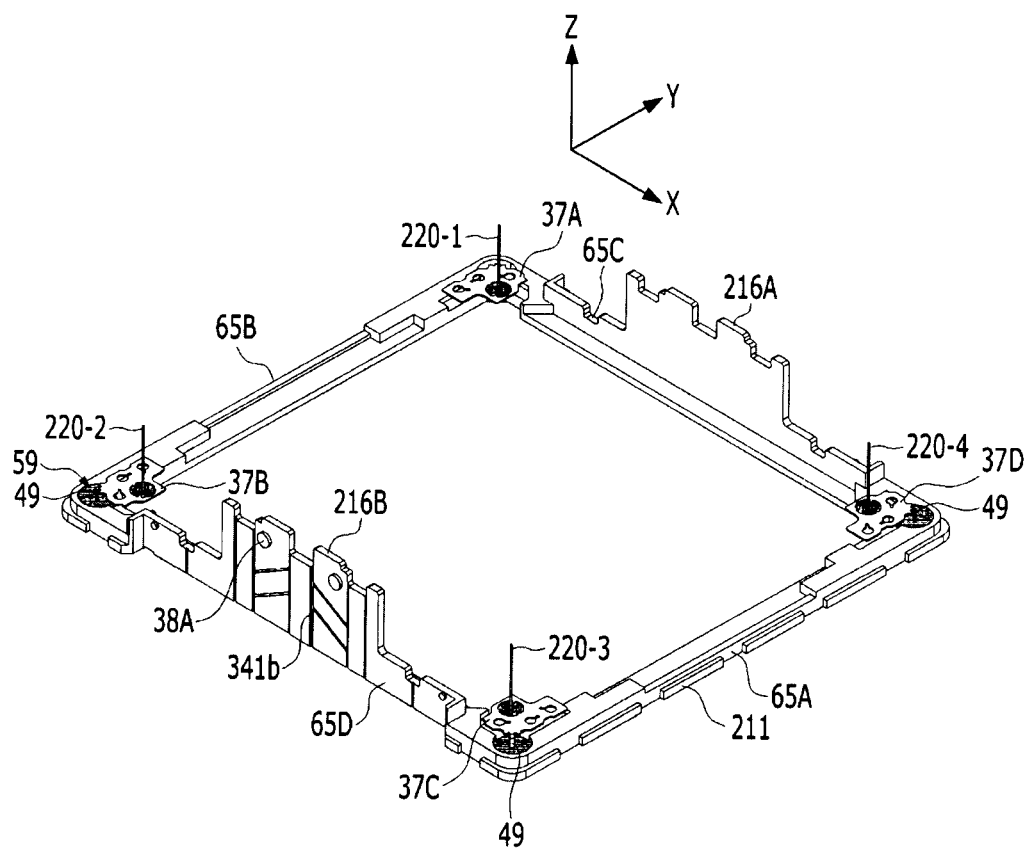
FIG. 14 is a perspective view of the base, a terminal unit, and the wire.
Figure 15:
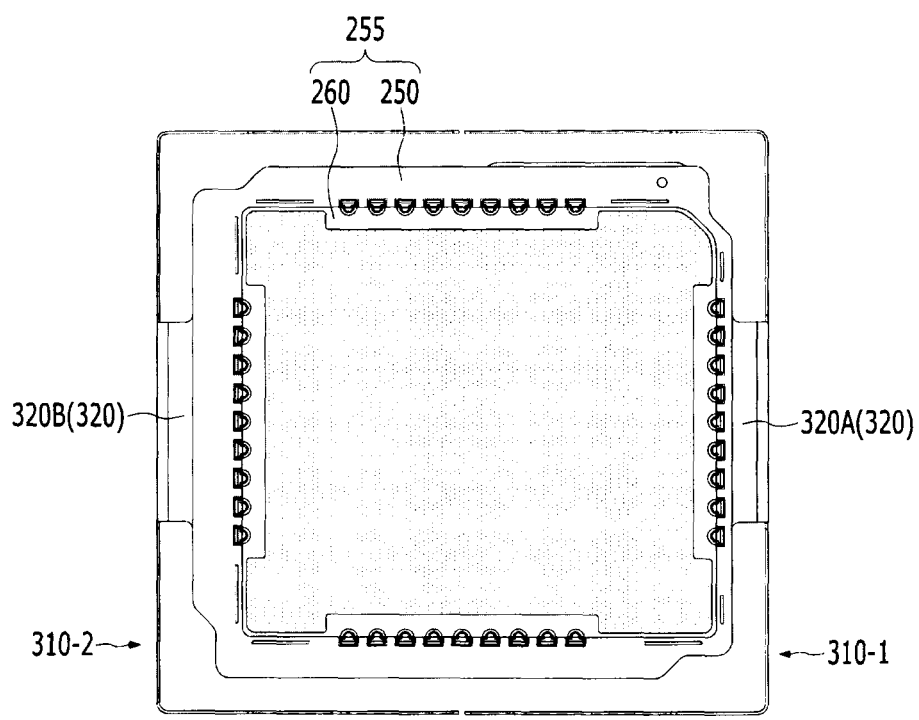
FIG. 15 is a bottom view of the first board unit, the support board, and a first heat dissipation member.
Figure 16:
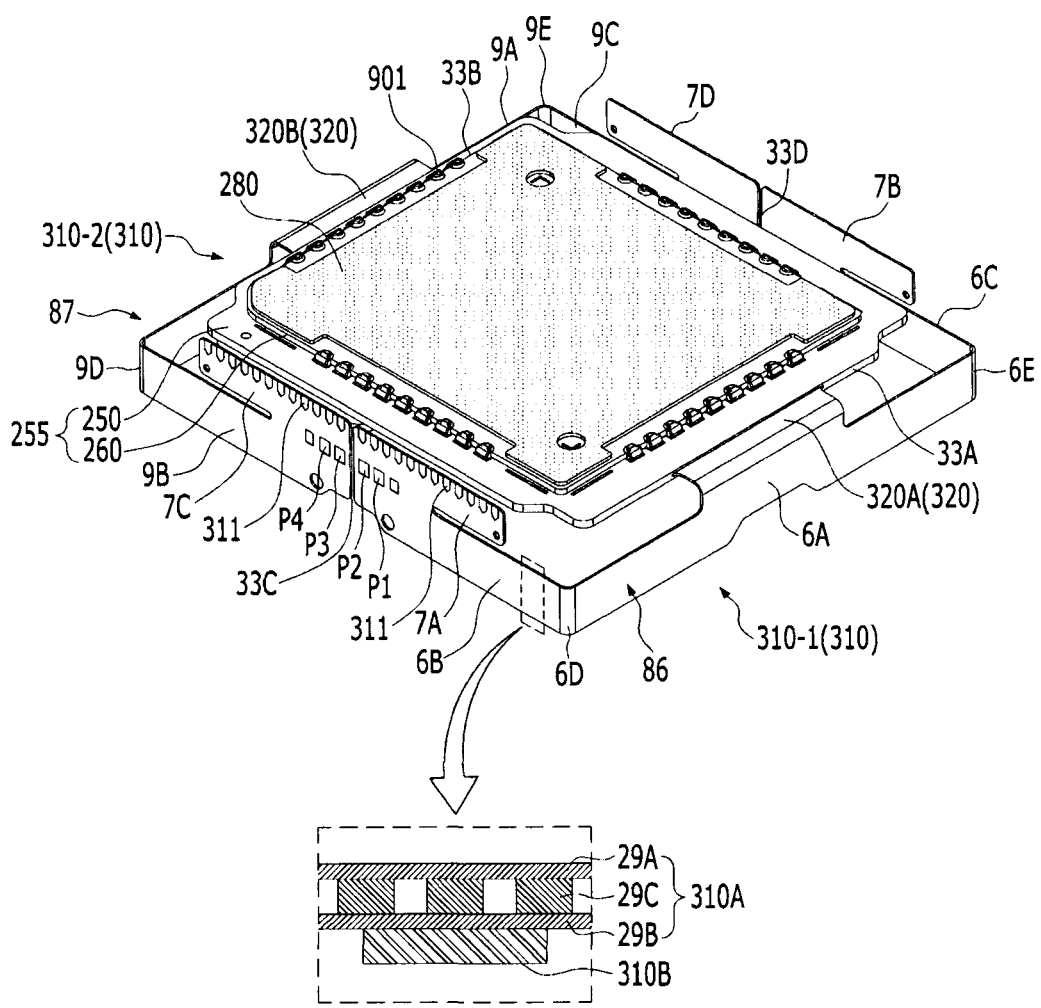
FIG. 16 is a perspective view of the first board unit, the support board, and the first heat dissipation member.
Figure 17A:
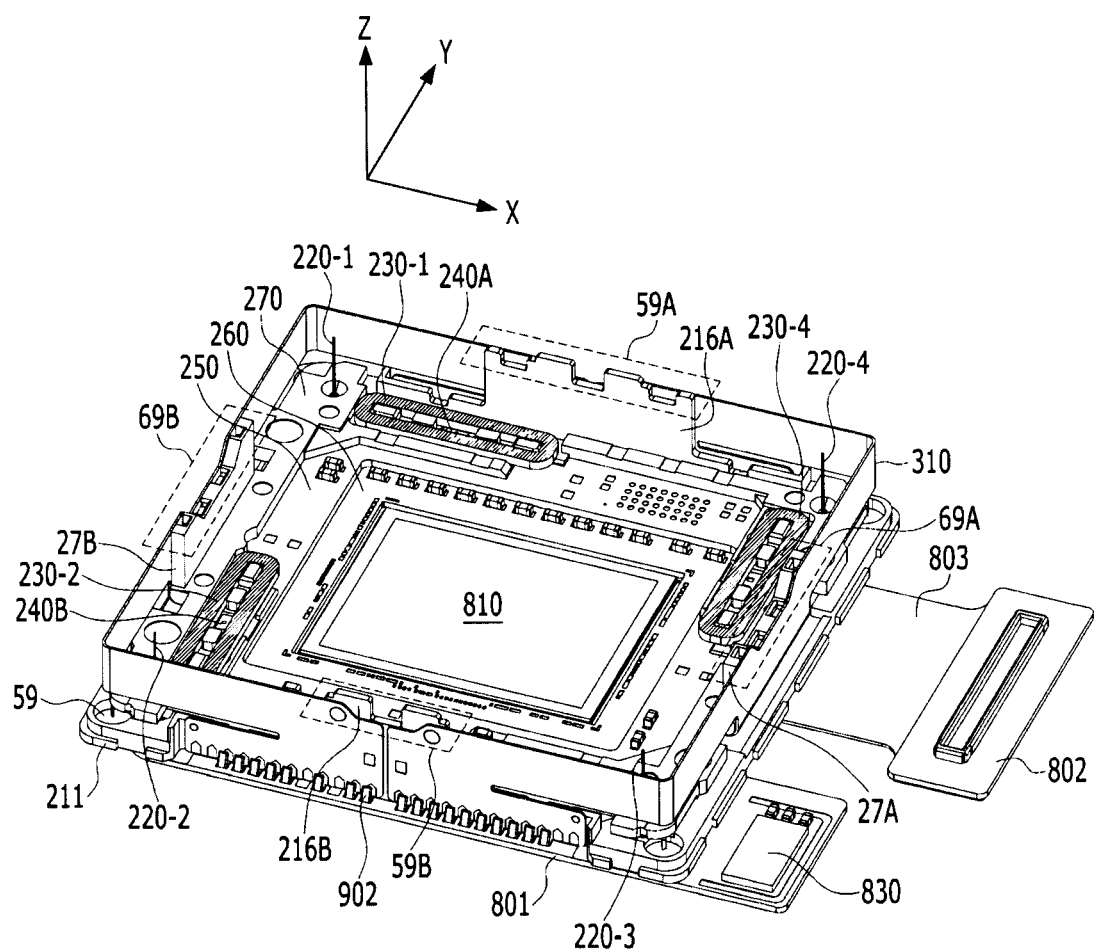
FIG. 17A is a first perspective view of the support board coupled to the holder and to the base.
Figure 17B:
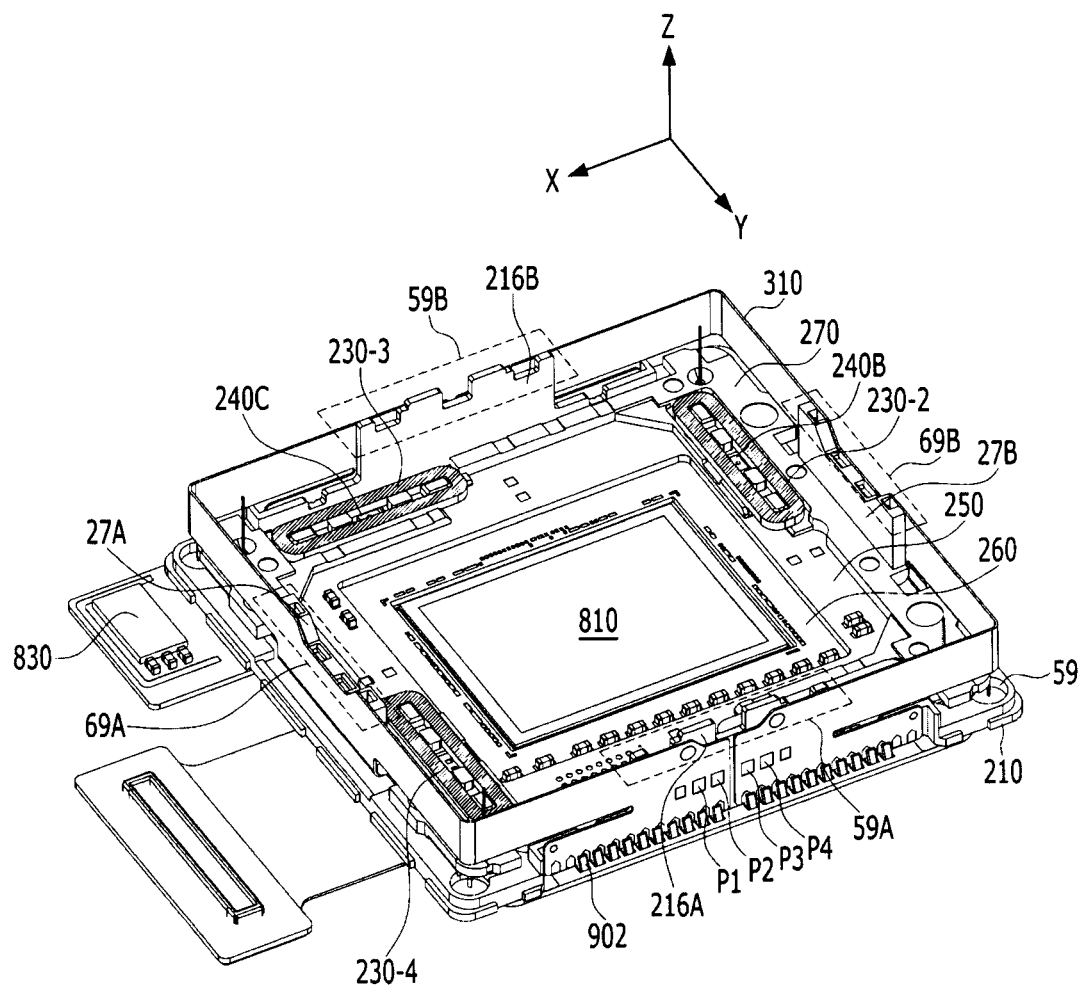
FIG. 17B is a second perspective view of the support board coupled to the holder and to the base.

FIG. 9 is a perspective view of the image sensor unit 350, FIG. 10A is a first exploded perspective view of the image sensor unit 350 in FIG. 9, FIG. 10B is a second exploded perspective view of the image sensor unit 350 in FIG. 9, FIG. 11 is a bottom perspective view of the holder 270, the reinforcing member 37, the first board unit 255, the support board 310, the base 210, and the second board unit 800 in FIG. 10A, FIG. 12 is a plan view of the holder 270, the first board unit 255, the image sensor 810, the second coil 230, and an OIS position sensor 240, FIG. 13 is a rear perspective view of the holder 270 and the first board unit 255, FIG. 14 is a perspective view of the base 210, the reinforcing member 37, and the support member 220, FIG. 15 is a bottom view of the first board unit 255, the support board 310, and a first heat dissipation member 280, FIG. 16 is a perspective view of the first board unit 255, the support board 310, and the first heat dissipation member 280, FIG. 17A is a first perspective view of the support board 310 coupled to the holder 270 and to the base 210, and FIG. 17B is a second perspective view of the support board 310 coupled to the holder 270 and to the base 210.

Referring to FIGS. 9 to 17B, the image sensor unit 350 may include a fixed unit and an OIS moving unit spaced apart from the fixed unit. The image sensor unit 350 may include a support board 310 interconnecting the fixed unit and the OIS moving unit.

The fixed unit may be a fixed part of the camera device 10 that does not move during OIS operation. In an example, the fixed unit may include a second board unit 800. In an example, the fixed unit may include a base 210 coupled to the second board unit 800. In an example, the fixed unit may include the housing 140 of the AF driving unit and components disposed in the housing 140, such as the magnet 130, the first position sensor 170, and the circuit board 180. In addition, the fixed unit may include a cover member 300 coupled to the base 210. The OIS moving unit may be disposed inside the cover member 300. Further, since the AF moving unit is coupled to the housing 140, which is the fixed unit, by means of the elastic members 150 and 160, the AF moving unit may also be included in the fixed unit from the viewpoint of OIS.

The OIS moving unit may include an image sensor 810. The OIS moving unit may further include a first board unit 255, which is spaced apart from the second board unit 800 and is conductively connected to the second board unit 800. In addition, in an example, the OIS moving unit may include at least one of the components disposed on the first board unit 255, such as the first heat dissipation member 280, the holder 270, the second coil 230, and the second position sensor 240. The holder 270 may alternatively be referred to as a "spacing member." In another embodiment, the holder 270 may be omitted, and the second coil 230 may be disposed on the first board unit 255, e.g. the first circuit board 250.

The camera device 10 may include the support member 220 or an elastic member to elastically support the OIS moving unit with respect to the fixed unit. In an example, the support member 220 may be of a wire type or a spring type.

The support member 220 may elastically support the OIS moving unit together with the support board 310 with respect to the fixed unit.

In an example, one end of the support member 220 may be coupled to the upper elastic member 150 (or the housing 140), and the other end of the support member 220 may be coupled to the holder 270. In an example, one end of the support member 220 may be coupled to the first outer frame 152 of the upper elastic member 150 (e.g. the second coupling portion 520) by means of a solder or a conductive adhesive. In an example, the other end of the support member 220 may be disposed on the holder 270 or may be coupled to the reinforcing member 37 coupled to the holder 270 by means of a solder or a conductive adhesive.

Referring to FIGS. 7A and 7B, a damper DA may be disposed between the hole 147 in the housing 140 and the end of the support member 220 that passes through the hole 147 in the housing 140. In an example, at least a portion of the damper DA may be disposed in the hole 147 in the housing 140, and may be coupled or attached to at least a portion of the support member 220 and to the housing 140.

In an example, the support member 220 may be disposed parallel to the optical-axis direction. In an example, the support member 220 may be disposed at a corner of the housing 140 and/or a corner of the holder 270. In an example, the support member 220 may include four wires 220-1 to 220-4. Each of the four wires 220-1 to 220-4 may be disposed at a corresponding one of the four corners of the housing 140 and/or a corresponding one of the four corners of the holder 270.

Referring to FIGS. 10A and 10B, the holder 270 may have a hole 271 formed therein to allow at least a portion of the support member 220 to pass therethrough. In an example, the hole 271 may be formed in the corner of the holder 270 to allow the other end of the support member 220 to pass therethrough. In an example, the hole 271 may be formed in each of the four corners of the holder 270. In an example, the hole 271 may be a through-hole formed through the holder 270 in the optical-axis direction. In another embodiment, the hole 271 may be of an escape recess type.

In an example, the hole 271 may include a portion that increases in diameter in a direction from the upper surface of the holder 270 toward the lower surface of the holder 270. For example, the hole 271 may have a funnel shape or a cone shape. For example, the inner surface of the hole 271 may include a slanted surface or a tapered slanted surface.

In an example, the reinforcing member 37 may be disposed on or coupled to the upper surface or the lower surface of the holder 270. In an example, the reinforcing member 37 may be disposed on or coupled to the lower surface of a corner of the holder 270. The holder 270 may have a recess 28A formed therein to allow the reinforcing member 37 to be disposed therein. In an example, the recess 28A may be formed in the lower surface of the corner of the holder 270.

The holder 270 may include at least one protrusion 28B, and the reinforcing member 37 may have at least one hole 81A formed therein to be coupled to the at least one protrusion 28B of the holder 270. The reinforcing member 37 and the holder 270 may be coupled to each other by means of an adhesive or thermal fusion. In addition, the reinforcing member 37 may have a hole 71B formed therein to allow the other end of the support member 220 to be inserted thereinto or coupled thereto. For example, each of the holes 81A and 71B may be a through-hole.

The reinforcing member 37 may alternatively be referred to as a "terminal unit," a "plate member," a "support unit," a "coupling member," a "metal plate," a "bent member," a "metal member," an "elastic member," a "spring," a "holder spring," a "spring member," or a "reinforcing plate."

The reinforcing member 37 may increase the coupling force of the support member 220. For example, the reinforcing member 37 may increase coupling force between the support member 220 and the holder 270, and accordingly, the OIS moving unit may be stably supported by the fixed unit.

In an example, the reinforcing member 37 may include a body 81, which is coupled to the holder 270. The body 81 may include a coupling portion 71, which is coupled to the support member 220. The coupling portion 71 may include a coupling region 71A, which is coupled to the support member 220, and a hole 71B formed in the coupling region 71A. The coupling region 71A may be the region of the body 81 that is to be coupled to the support member 220 by means of a solder or a conductive adhesive. In an example, the other end of the support member 220 that passes through the hole 71B may be coupled to the lower portion or the lower surface of the coupling region 71A by means of a solder or a conductive adhesive.

In an example, the body 81 may have at least one hole 71C formed in a region around the coupling region 71A. In an example, the body 81 may have a plurality of holes 71C formed therein so as to surround the coupling region 71A. In an example, the plurality of holes 71C may be spaced apart from the hole 71B.

In addition, the body 81 may include a support portion 71D, which is located between the plurality of holes 71C and supports the coupling region 71A. The support portion 71D may alternatively be referred to as a "connection portion" or a "bridge." The support portion 71D may include a plurality of support portions, which are spaced apart from each other. The support portion 71D may be connected to the coupling region 71A.

When soldering is performed, the at least one hole 71C may serve to enable a solder to be primarily formed only in the coupling region 71A by interface tension (e.g. surface tension) of the edge of the coupling region 71A.

In addition, the coupling region 71A needs to be heated in order to perform soldering. The at least one hole 71C may suppress or inhibit transfer of heat from the coupling region 71A to another region of the body 81, thereby inhibiting a solder from being formed in the other region of the body 81 when soldering is performed. As a result, the at least one hole 71C may improve the solderability of a solder.

The reinforcing member 37 may include an extension portion 82, which extends from the body 81. The extension portion 82 may be bent and extend from the body 81 in the downward direction. In an example, the extension portion 82 may extend toward a hole 59 in the base 210. The extension portion 82 may alternatively be referred to as a "bent portion."

In an example, the reinforcing member 37 may include four terminals 37A to 37D corresponding to the four wires 220-1 to 220-4. Each of the terminals 37A to 37D may be disposed on a corresponding one of the corners of the holder 270, and may be coupled to a corresponding one of the wires 220-1 to 220-4. The description given with reference to FIG. 10A may also be applied to the structure of each of the terminals 37A to 37D. In an example, the reinforcing member 37 may be made of a metal material. In an example, the reinforcing member 37 may be made of a conductive material. In another embodiment, the reinforcing member 37 may be omitted, and the support member 220 may be directly coupled to the holder 270.

Referring to FIG. 14, a damper 49 may be disposed between the reinforcing member 37 and the base 210. The damper 49 may be in contact with, coupled to, or attached to the reinforcing member 37 and the base 210. In an example, the base 210 may have a hole (or a recess) 59 formed at a position corresponding to or facing the reinforcing member 37. In an example, the hole (or the recess) 59 may be formed in the corner of the base 210.

In an example, the damper 59 may be disposed in the hole 59 in the base 210. Alternatively, at least part of the extension portion 82 of the reinforcing member 37 may be disposed in the hole 59 in the base 210, and the damper 59 may be in contact with, coupled to, or attached to the extension portion 82. The damper 59 may serve to absorb or alleviate vibration of the OIS moving unit, thereby inhibiting or suppressing oscillation of the OIS moving unit during OIS operation.

In another embodiment, the extension portion 82 may be omitted from the reinforcing member 37, and the camera device 10 may not include the damper 49 in FIG. 14.

The support board 310 may support the OIS moving unit with respect to the fixed unit such that the OIS moving unit is capable of moving in a direction perpendicular to the optical axis or such that the OIS moving unit is capable of tilting or rotating within a predetermined range about the optical axis.

The holder 270 may be disposed under the AF driving unit. In an example, the holder 270 may be embodied as a non-conductive member. In an example, the holder 270 may be embodied as an injection-molded product, which can be easily formed through an injection-molding process. In addition, the holder 270 may be formed of an insulating material. For example, the holder 270 may be formed of a resin or plastic material.

Referring to FIGS. 10A, 10B, and 12, the holder 270 may include an upper surface, a lower surface formed opposite the upper surface, and a side surface (e.g. an outer side surface) interconnecting the upper surface and the lower surface. In an example, the lower surface of the holder 270 may be located opposite or face the second board unit 800.

The holder 270 may support the first board unit 255, and may be coupled to the first board unit 255. In an example, the first board unit 255 may be disposed under the holder 270. In an example, the lower portion, the lower surface, or the lower end of the holder 270 may be coupled to the upper portion, the upper surface, or the upper end of the first board unit 255. In an example, the holder 270 may be coupled to the first board unit 255 by means of an adhesive.

The holder 270 may accommodate or support the second coil 230. The holder 270 may support the second coil 230 such that the second coil 230 is spaced apart from the first board unit 255. In an example, at least a portion of the holder 270 may be disposed between the second coil 230 and the first board unit 255.

The holder 270 may have a bore 70 formed therein so as to correspond to one region on the first board unit 255. In an example, the bore 70 in the holder 270 may be a through-hole formed through the holder 270 in the optical-axis direction. In an example, the bore 70 in the holder 270 may correspond to, face, or overlap the image sensor 810 in the optical-axis direction.

When viewed from above, the shape of the bore 70 in the holder 270 may be a polygonal shape, such as a quadrangular shape, a circular shape, or an elliptical shape, but the disclosure is not limited thereto. The bore 70 in the holder 270 may be formed in any of various shapes.

In an example, the bore 70 in the holder 270 may have a shape or a size suitable for exposing the image sensor 810, a portion of the upper surface of the first circuit board 250, a portion of the upper surface of the second circuit board 260, and various elements. In an example, the area of the bore 70 in the holder 270 may be larger than the area of the image sensor 810, and may be larger than the area of the bore 250A in the first circuit board 250.

The holder 270 may have holes 41A, 41B, and 41C formed therein so as to correspond to the second position sensor 240. In an example, the holder 270 may have holes 41A, 41B, and 41C formed therein at positions corresponding, respectively, to first to third sensors 240A, 240B, and 240C of the second position sensor 240.

In an example, the holes 41A, 41B, and 41C may be disposed adjacent to the corners of the holder 270. The holder 270 may have a dummy hole 41D formed therein at a position that is adjacent to the corner of the holder 270 that does not correspond to the second position sensor 240. The dummy hole 41D may be formed in order to establish weight equilibrium of the OIS moving unit during OIS operation. The dummy hole 41D may be a through-hole. In another embodiment, the dummy hole 41D may not be formed. The holes 41A, 41B, and 41C may be through-holes formed through the holder 270 in the optical-axis direction. In another embodiment, the holes 41A, 41B, and 41C may be omitted from the holder 270.

The holder 270 may be provided on the upper surface thereof with at least one coupling protrusion 51 for coupling to the second coil 230. The coupling protrusion 51 may protrude from the upper surface of the holder 270 in the upward direction or toward the AF driving unit. In an example, the coupling protrusion 51 may be formed adjacent to each of the holes 41A to 41D in the holder 270.

In an example, two coupling protrusions 51A and 51B may be disposed or arranged so as to correspond to each of the holes 41A, 41B, 41C, and 41D in the holder 270. In an example, each of the holes 41A, 41B, 41C, and 41D in the holder 270 may be located between the two coupling protrusions 51A and 51B.

The holder 270 may include at least one protruding portion 27A and 27B. The protruding portions 27A and 27B may protrude from the upper surface of the holder 270. In an example, the protruding portions 27A and 27B may protrude from the outer side surface of the holder 270 in the optical-axis direction or the upward direction.

In an example, the holder 270 may include two protruding portions 27A and 27B, which face or overlap each other in the second horizontal direction (e.g. the x-axis direction).

In an example, the holder 270 may include four side portions (or side plates), and the protruding portions 27A and 27B may be formed on two side portions among the four side portions. In an example, the protruding portions 27A and 27B may be disposed or located at the centers of the side portions (or the side plates) of the holder 270.

The holder 270 may have a groove 341a formed therein. The groove 341a may be an adhesive-receiving groove. The groove 341a may be formed in the outer side surface of each of the protruding portions 27A and 27B of the holder 270. The groove 341a may be formed in the upper surface of each of the protruding portions 27A and 27B of the holder 270. The groove 341a may be formed from the upper surface of each of the protruding portions 27A and 27B of the holder 270 to the lower surface thereof. An adhesive, by which the support board 310 is adhered to the holder 270, may be disposed in the groove 341a. The groove 341a may include a plurality of grooves. In an example, the groove 341a may extend in the optical-axis direction. In another embodiment, the groove in the holder 270 may extend in a direction perpendicular to the optical axis.

The first board unit 255 may include a first circuit board 250 and a second circuit board 260, which are conductively connected to each other. The second circuit board 260 may alternatively be referred to as a "sensor board."

The first board unit 255 may be disposed on the lower surface of the holder 270. In an example, the first board unit 255 may be coupled to the lower surface of the holder 270. In an example, the first circuit board 250 may be disposed on and/or coupled to the lower surface of the holder 270. In an example, a first surface 50A of the first circuit board 250 (refer to FIG. 10A) may be coupled or attached to the lower surface of the holder 270 by means of an adhesive member.

In this case, the first surface 50A of the first circuit board 250 may be a surface that faces or is located opposite the AF driving unit and on which the second position sensor 240 is disposed. In addition, a second surface 50B of the first circuit board 250 (refer to FIG. 10B) may be a surface formed opposite the first surface 50A of the first circuit board 250. In addition, the first surface 50A may alternatively be referred to as a "second surface," and the second surface 50B may alternatively be referred to as a "first surface."

The first circuit board 250 may alternatively be referred to as a "sensor board," a "main board," a "main circuit board," a "sensor circuit board," or a "moving circuit board." In all of the embodiments, the first circuit board 250 may alternatively be referred to as a "second board" or a "second circuit board," and the second circuit board 260 may alternatively be referred to as a "first board" or a "first circuit board."

The second position sensors 240 (240A, 240B, and 240C) may be disposed on the first circuit board 250 in order to detect movement of the OIS moving unit in a direction perpendicular to the optical-axis direction and/or rotation, tilting, or rolling of the OIS moving unit about the optical axis. In addition, a controller 830 and/or a circuit element (e.g. a capacitor) may be disposed on the first circuit board 250.

The first circuit board 250 may include first terminals E1 to E8 in order to be conductively connected to the second coil 230. Here, the first terminals E1 to E8 may alternatively be referred to as "first pads" or "first bonding parts." The first terminals E1 to E8 of the first circuit board 250 may be disposed or arranged on the first surface 50A of the first circuit board 250. For example, the first circuit board 250 may be a printed circuit board or a flexible printed circuit board (FPCB).

The first circuit board 250 may have a bore 250A formed therein so as to correspond to or face the lens module 400 and the bore in the bobbin 110. In an example, the bore 250A in the first circuit board 250 may be a through-hole or a cavity formed through the first circuit board 250 in the optical-axis direction, and may be formed in the center of the first circuit board 250.

When viewed from above, the shape of the first circuit board 250, for example the outer circumferential shape thereof, may be a shape coinciding with or corresponding to the shape of the holder 270, for example, a quadrangular shape. In addition, when viewed from above, the shape of the bore 250A in the first circuit board 250 may be a polygonal shape such as a quadrangular shape, a circular shape, or an elliptical shape. In an example, the bore 250A in the first circuit board 250 may open or expose the image sensor 810 and/or a bore 260A in the second circuit board 260.

In addition, the first circuit board 250 may include at least one terminal 251 in order to be conductively connected to the second circuit board 260. Here, the terminal 251 of the first circuit board 250 may alternatively be referred to as a "pad," a "pad part," or a "bonding part." The terminal 251 of the first circuit board 250 may be disposed or arranged on the lower surface of the first circuit board 250.

In an example, the terminal 251 may be provided in plural, and the plurality of terminals 251 may be disposed or arranged in a region between the bore 250A in the first circuit board 250 and any one side of the first circuit board 250 in a direction parallel to the side of the first circuit board 250. In an example, the plurality of terminals 251 may be arranged around the bore 250A.

The second circuit board 260 may be disposed under the first circuit board 250.

When viewed from above, the shape of the second circuit board 260 may be a polygonal shape (e.g. a quadrangular shape, a square shape, or a rectangular shape), but the disclosure is not limited thereto. In another embodiment, the shape of the second circuit board 260 may be a circular shape or an elliptical shape.

In an example, when the shape of the second circuit board 260 is a quadrangular shape, the area of the outer circumferential surface of the second circuit board 260 may be larger than the area of the bore 250A in the first circuit board 250. In an example, the lower side of the bore 250A in the first circuit board 250 may be shielded or blocked by the second circuit board 260.

In an example, when viewed from above or below, the outer side surface (or the side) of the second circuit board 260 may be located between the outer side surface (or the side) of the first circuit board 250 and the bore 250A in the first circuit board 250.

In an example, the second circuit board 260 may have a bore 260A formed therein so as to correspond to the bore 250A in the first circuit board 250 and/or the image sensor 810. The bore 260A in the second circuit board 260 may be a hole or a cavity formed through the second circuit board 260 in the optical-axis direction, and may be formed in the center of the second circuit board 260.

In an example, the bore 260A in the second circuit board 260 may open or expose the image sensor 810. In an example, the image sensor 810 may be disposed in the bore 260A in the second circuit board 260.

In another embodiment, the bore 260A may not be formed in the second circuit board 260, and the image sensor 810 may be disposed on the upper surface of the second circuit board 260.

The second circuit board 260 may include at least one terminal 261 conductively connected to the at least one terminal 251 of the first circuit board 250. In an example, the terminal 261 of the second circuit board 260 may be provided in plural.

In an example, the at least one terminal 261 of the second circuit board 260 may be formed on the side surface or the outer side surface of the second circuit board 260 that connects the first surface 60A (refer to FIG. 25B) (e.g. the upper surface) of the second circuit board 260 to a second surface 60B (refer to FIG. 25A) (e.g. the lower surface) thereof. The first surface 60A of the second circuit board 260 may be a surface facing the first circuit board 250, and the second surface 60B of the second circuit board 260 may be a surface formed opposite the first surface 60A of the second circuit board 260.

In an example, the terminal 261 may take the form of a recess depressed into the side surface of the second circuit board 260. Alternatively, in another example, the terminal 261 may take the form of a semicircular or semi-elliptical via formed in the side surface of the second circuit board 260. In another embodiment, the at least one terminal of the second circuit board 260 that is conductively connected to the second terminal 251 of the first circuit board 250 may be formed on the upper surface of the second circuit board 260.

In an example, the terminal 261 of the second circuit board 260 may be coupled to the terminal 251 of the first circuit board 250 by means of a solder 901 (refer to FIG. 11) or a conductive adhesive member. In a dotted line portion enlarged in FIG. 13, a single solder 901, which couples any one terminal of the second circuit board 260 to any one terminal 251 of the first circuit board, is illustrated. However, a solder for coupling another terminal of the second circuit board 260 to a terminal of the first circuit board 250 corresponding thereto may be provided.

Each of the first and second circuit boards 250 and 260 may be, for example, a printed circuit board or an FPCB. Further, at least one of the first and second circuit boards 250 and 260 may be an organic substrate or a ceramic substrate.

The first heat dissipation member 280 may be disposed on or coupled to the first board unit 255. In an example, the first heat dissipation member 280 may be disposed on or coupled to the second circuit board 260. In an example, the first heat dissipation member 280 may be disposed under the second circuit board 260. In an example, the first heat dissipation member 280 may be coupled or secured to the lower surface of the second circuit board 260.

The bore 260A in the second circuit board 260 may open or expose at least a portion of the first heat dissipation member 280.

The image sensor 810 may be disposed on, attached to, or coupled to at least a portion of the first heat dissipation member 280 that is exposed by the bore 260A. In an example, the image sensor 810 may be secured, attached, or coupled to the first heat dissipation member 280 by means of an adhesive.

In an example, at least a region of the upper surface of the first heat dissipation member 280 may be exposed by the bore 260A, and the image sensor 810 may be disposed on, attached to, or coupled to at least a region of the upper surface of the first heat dissipation member 280 that is exposed by the bore 260A.

In another embodiment, the second circuit board 260 may have a recess formed in the lower surface thereof to receive or dispose the first heat dissipation member 280 therein.

In another embodiment, the bore 260A may not be formed in the second circuit board 260, and the first heat dissipation member 280 may be secured, attached, or coupled to the lower surface of the second circuit board 260. In still another embodiment, the first heat dissipation member 280 may be omitted.

In an example, the first heat dissipation member 280 may be embodied as a plate-type member having a predetermined thickness and hardness. In addition, the first heat dissipation member 280 may improve the effect of dissipating the heat generated from the heat source of the first board unit 255 to the outside. In this case, the heat source of the first board unit 255 may be an electronic element (or a circuit element) disposed on the first board unit 255, for example, at least one of the image sensor 810, the controller 830, the second position sensor 240, or the capacitor.

In an example, the first heat dissipation member 280 may include a metal material having high thermal conductivity and high heat dissipation efficiency, for example at least one of SUS, aluminum, nickel, phosphorus, bronze, or copper.

In addition, the first heat dissipation member 280 may serve as a reinforcing member for stably supporting the image sensor 810 and inhibiting the image sensor 810 from being damaged by external impact or contact.

In another embodiment, the first heat dissipation member 280 may be formed of a thermally conductive material having high thermal conductivity, for example, thermally conductive epoxy, thermally conductive plastic (e.g. polyimide), or thermally conductive synthetic resin. In the first heat dissipation member 280, the "heat dissipation member" may alternatively be referred to as a "plate," a "metal plate," a "reinforcing member," or a "stiffener."

The first heat dissipation member 280 may include at least one groove or at least one uneven portion formed in a predetermined pattern in order to improve the heat dissipation effect. In an example, the groove or the uneven portion may be formed in a predetermined pattern in the lower surface of the first heat dissipation member 280.

In an example, a plurality of grooves may be formed in a predetermined pattern such that the grooves are spaced apart from each other by a predetermined interval. In an example, the predetermined pattern may have a stripe shape. In another embodiment, the predetermined pattern may have a net shape or a mesh shape. In still another embodiment, a plurality of dots may be formed in a predetermined pattern such that the dots are spaced apart from each other. The shape of each dot may be, for example, a circular shape, an elliptical shape, or a polygonal shape (e.g. a quadrangular shape).

In another embodiment, a predetermined pattern may be formed in at least one of the upper surface, the lower surface, or the outer side surface of the first heat dissipation member 280. In still another embodiment, the heat dissipation member may include a hole or a through-hole in place of the groove or the uneven portion. Because the first heat dissipation member 280 moves together with the OIS moving unit, the first heat dissipation member 280 may be spaced apart from the fixed unit, for example, the second board unit 800. The first heat dissipation member 280 may have at least one escape recess 281 (refer to FIG. 10A) formed therein in order to avoid spatial interference with the solder 901.

The second coil 230 may be disposed on or coupled to the OIS moving unit. In an example, the second coil 230 may be disposed on the holder 270. The second coil 230 may be disposed on the upper surface of the holder 270. The second coil 230 may be disposed under the magnet 130.

The second coil 230 may be coupled to the holder 270. In an example, the second coil 230 may be coupled or attached to the upper surface of the holder 270. In an example, the second coil 230 may be coupled to the coupling protrusion 51 of the holder 270. The OIS moving unit may be moved by interaction between the second coil 230 and the magnet 130.

In an example, the second coil 230 may correspond to, face, or overlap the magnet 130 disposed on the fixed unit in the direction of the optical axis OA. In another embodiment, the fixed unit may include a separate OIS-dedicated magnet in addition to the magnet of the AF driving unit, and the second coil may correspond to, face, or overlap the OIS-dedicated magnet. In this case, the number of OIS-dedicated magnets may be the same as the number of coil units included in the second coil 230.

In still another embodiment, the OIS-dedicated magnet may be disposed on a fixed portion of the second coil 230, and an OIS-dedicated magnet 71B of the magnet 130 may be disposed on the OIS moving unit. In this case, the second coil 230 may be conductively connected to the support board 310 and/or the second board unit 800 via a conductive member.

In an example, the second coil 230 may include a plurality of coil units 230-1 to 230-4. In an example, the second coil 230 may include four coil units 230-1 to 230-4 disposed on the four corners of the holder 270. In an example, at least a portion of each of the coil units 230-1 to 230-4 may be disposed on a corresponding one of the corners of the holder 270. A portion of each of the coil units 230-1 to 230-4 may be disposed on the side portion adjacent to a corresponding one of the corners of the holder 270.

Each of the coil units 230-1 to 230-4 may take the form of a coil block having a closed curve shape or a ring shape. In an example, each coil unit may have a cavity or a hole formed therein. In an example, each of the coil units may be embodied as a fine pattern (FP) coil, a wound coil, or a coil block. In an example, the protrusion 51 of the holder 270 may be inserted into or coupled to the cavity or the hole in each of the coil units 230-1 to 230-4.

In another embodiment, the second coil 230 may be disposed on the first circuit board 250, or may be coupled to the first circuit board 250.

The second coil 230 may be conductively connected to the first circuit board 250. In an example, the first coil unit 230-1 may be conductively connected to the two terminals E1 and E2 of the first circuit board 250, the second coil unit 230-2 may be conductively connected to two other terminals E3 and E4 of the first circuit board 250, the third coil unit 230-3 may be conductively connected to two other terminals E5 and E6 of the first circuit board 250, and the fourth coil unit 230-4 may be conductively connected to two other terminals E7 and E8 of the first circuit board 250.

Power or a driving signal may be supplied to the first to fourth coil units 230-1 to 230-4 through the first circuit board 250. The power or the driving signal supplied to the second coil 230 may be a DC signal, an AC signal, or a signal containing both DC and AC components, and may be of a current type or a voltage type.

The OIS moving unit may be moved in the first horizontal direction or the second horizontal direction, or may be rolled about the optical axis by interaction between the first to fourth magnet units 130-1 to 130-4 and the first to fourth coil units 230-1 to 230-4.

In an example, current may be independently applied to at least three coil units among the four coil units 230-1 to 230-4. In another embodiment, current may be independently applied to at least two coil units among the four coil units 230-1 to 230-4.

In an example, a separate independent driving signal, e.g. driving current, may be supplied to each of the four coil units 230-1 to 230-4.

The controller 830 or 780 may supply at least one driving signal to at least one of the first to fourth coil units 230-1 to 230-4, and may control the at least one driving signal such that the OIS moving unit is moved in the x-axis direction and/or the y-axis direction or is rotated within a predetermined angular range about the optical axis. The controller to be described hereinbelow may be at least one of the controller 830 of the camera device 10 or the controller 780 of an optical instrument 200A.

When the second coil 230 is driven in a three-channel drive mode, three independent driving signals may be supplied to the second coil 230. In an example, among the four coil units, two coil units (e.g. 230-2 and 230-4, or 230-1 and 230-3), which face each other in an oblique direction, may be connected to each other in series. One driving signal may be supplied to the two coil units connected to each other in series, and an independent driving signal may be supplied to each of the remaining two coil units among the four coil units.

Alternatively, when the second coil 230 is driven in a four-channel drive mode, an independent driving signal may be supplied to each of the four coil units 230-1 to 230-4, which are separated from each other.

Figure 18A:
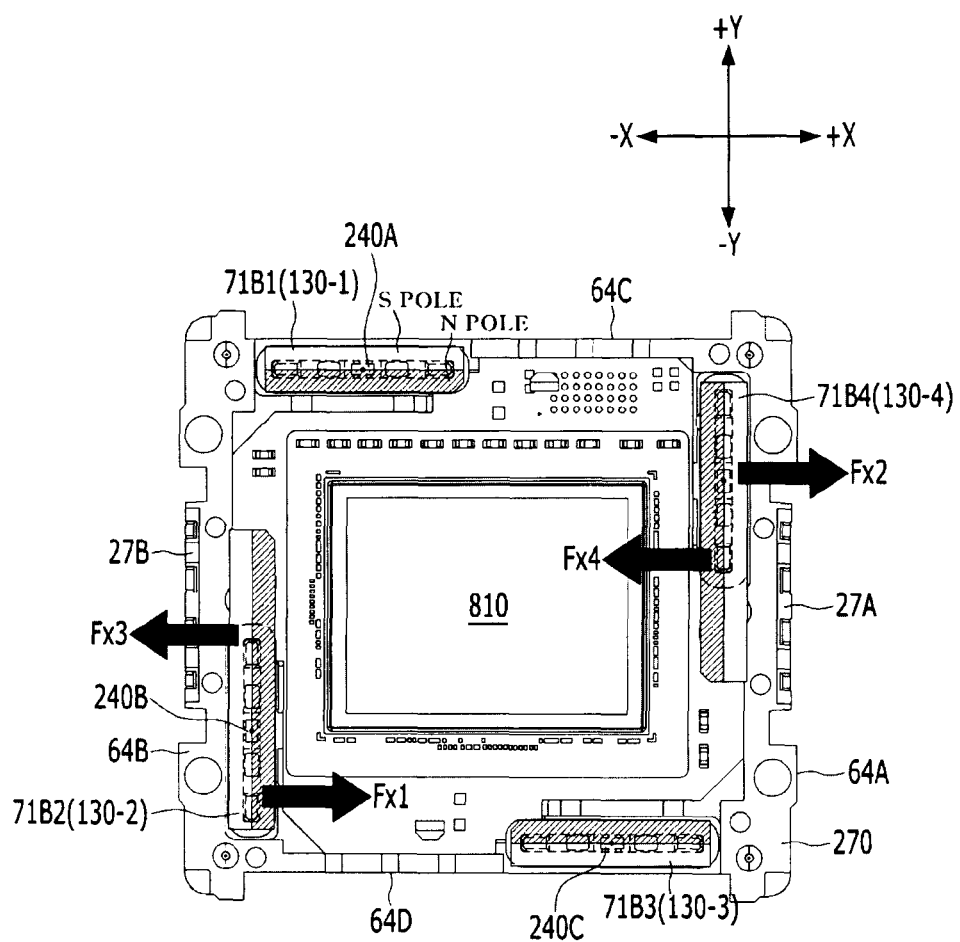
FIG. 18A is a view for explaining movement of the OIS moving unit in the x-axis direction.
Figure 18B:
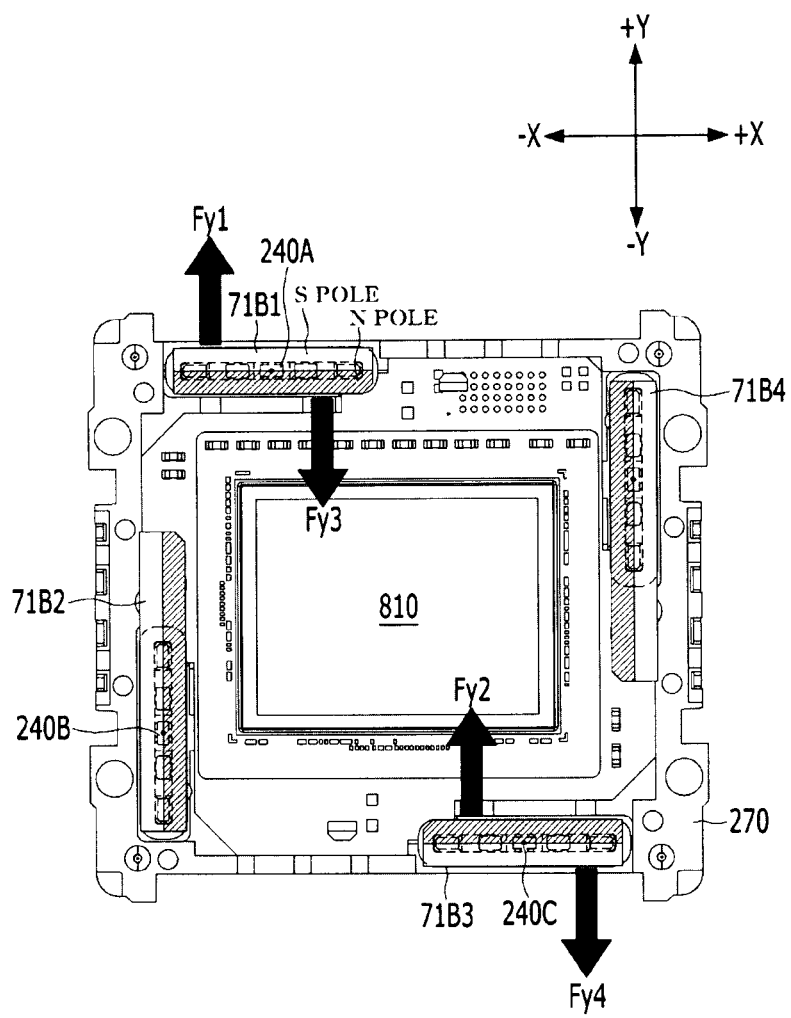
FIG. 18B is a view for explaining movement of the OIS moving unit in the y-axis direction.

FIG. 18A is a view for explaining movement of the OIS moving unit in the x-axis direction, and FIG. 18B is a view for explaining movement of the OIS moving unit in the y-axis direction.

The N pole and the S pole of each of the first and third magnet units 71B1 and 71B3, which face each other in a first oblique direction, may be disposed so as to face each other in the first horizontal direction (e.g. the y-axis direction). In addition, the N pole and the S pole of each of the second and fourth magnet units 71B2 and 71B4, which face each other in a second oblique direction, which is perpendicular to the first oblique direction, may be disposed so as to face each other in the second horizontal direction (e.g. the x-axis direction).

That is, the direction in which the N pole and the S pole of the first magnet unit 71B1 face each other may be the same as or parallel to the direction in which the N pole and the S pole of the third magnet unit 71B3 face each other. In addition, the direction in which the N pole and the S pole of the second magnet unit 71B2 face each other may be the same as or parallel to the direction in which the N pole and the S pole of the fourth magnet unit 71B4 face each other.

In the embodiment in which the second magnet 71B is a 2-pole magnet, based on the boundary line (or the interface) between the N pole and the S pole of each of the first to fourth magnet units 71B1 to 71B4, the N pole may be located at a further inward position, and the S pole may be located at a further outward position. In another embodiment, based on the boundary line between the N pole and the S pole of each of the first to fourth magnet units 71B1 to 71B4, the S pole may be located at a further inward position, and the N pole may be located at a further outward position. The boundary line (or the interface) may be a portion that separates the N pole and the S pole from each other, and has substantially no magnetism and thus almost no polarity.

Referring to FIG. 18A, the OIS moving unit may be moved or shifted in the x-axis direction by first electromagnetic force Fx1 (or Fx3), which is generated by interaction between the second coil unit 230-2 and the second magnet unit 71B2, and second electromagnetic force Fx2 (or Fx4), which is generated by interaction between the fourth coil unit 230-4 and the fourth magnet unit 71B4. In an example, the direction of the first electromagnetic force Fx1 (or Fx3) and the direction of the second electromagnetic force Fx2 (or Fx4) may be the same as each other.

Referring to FIG. 18B, the OIS moving unit may be moved or shifted in the y-axis direction by third electromagnetic force Fy1 (or Fy3), which is generated by interaction between the first coil unit 230-1 and the first magnet unit 71B1, and fourth electromagnetic force Fy2 (or Fy4), which is generated by interaction between the third coil unit 230-3 and the third magnet unit 71B3. In an example, the direction of the third electromagnetic force Fy1 (or Fy3) and the direction of the fourth electromagnetic force Fy2 (or Fy4) may be the same as each other.

Figure 18C:
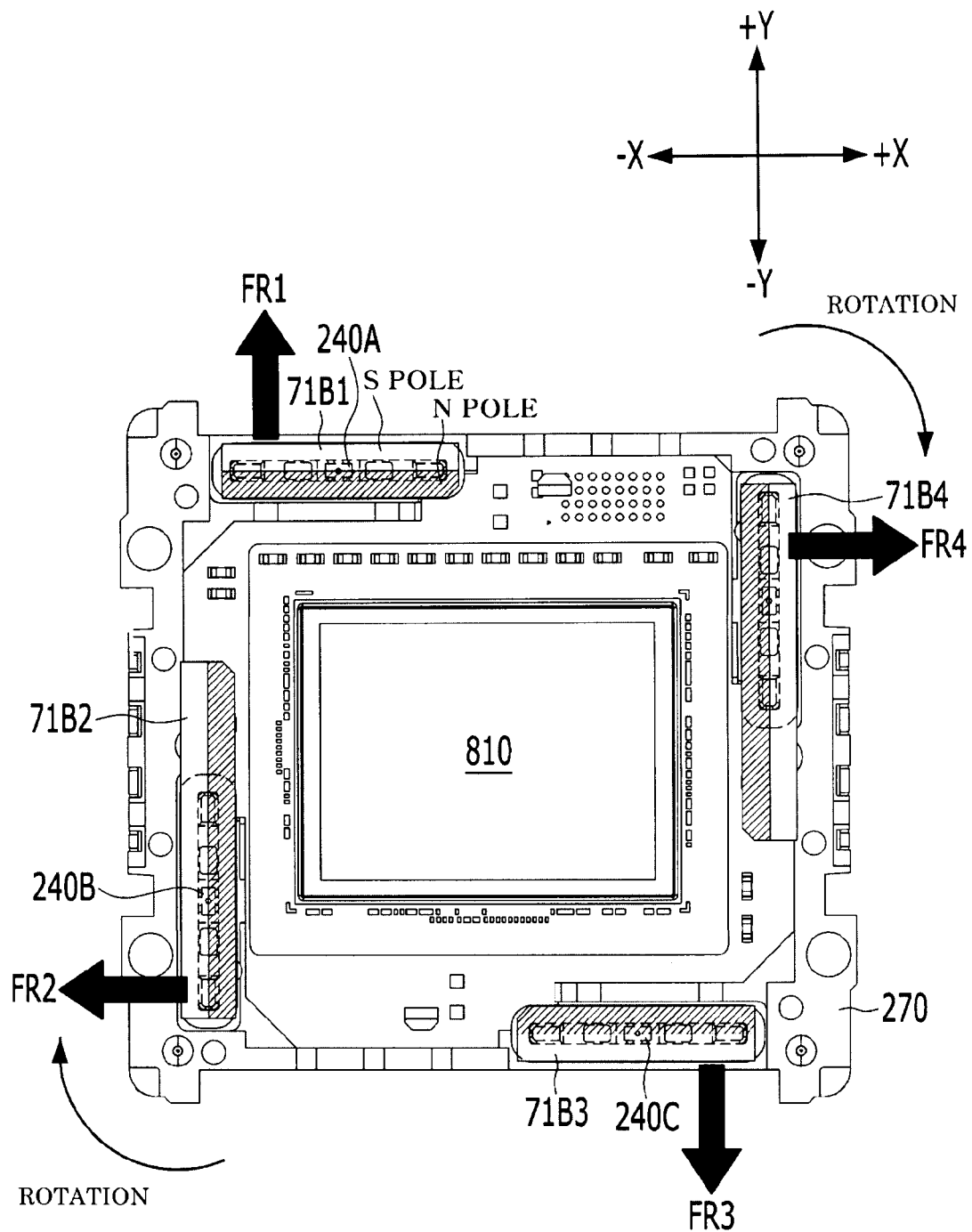
FIG. 18C is a view for explaining rotation of the OIS moving unit in the clockwise direction in a four-channel drive mode.
Figure 18D:
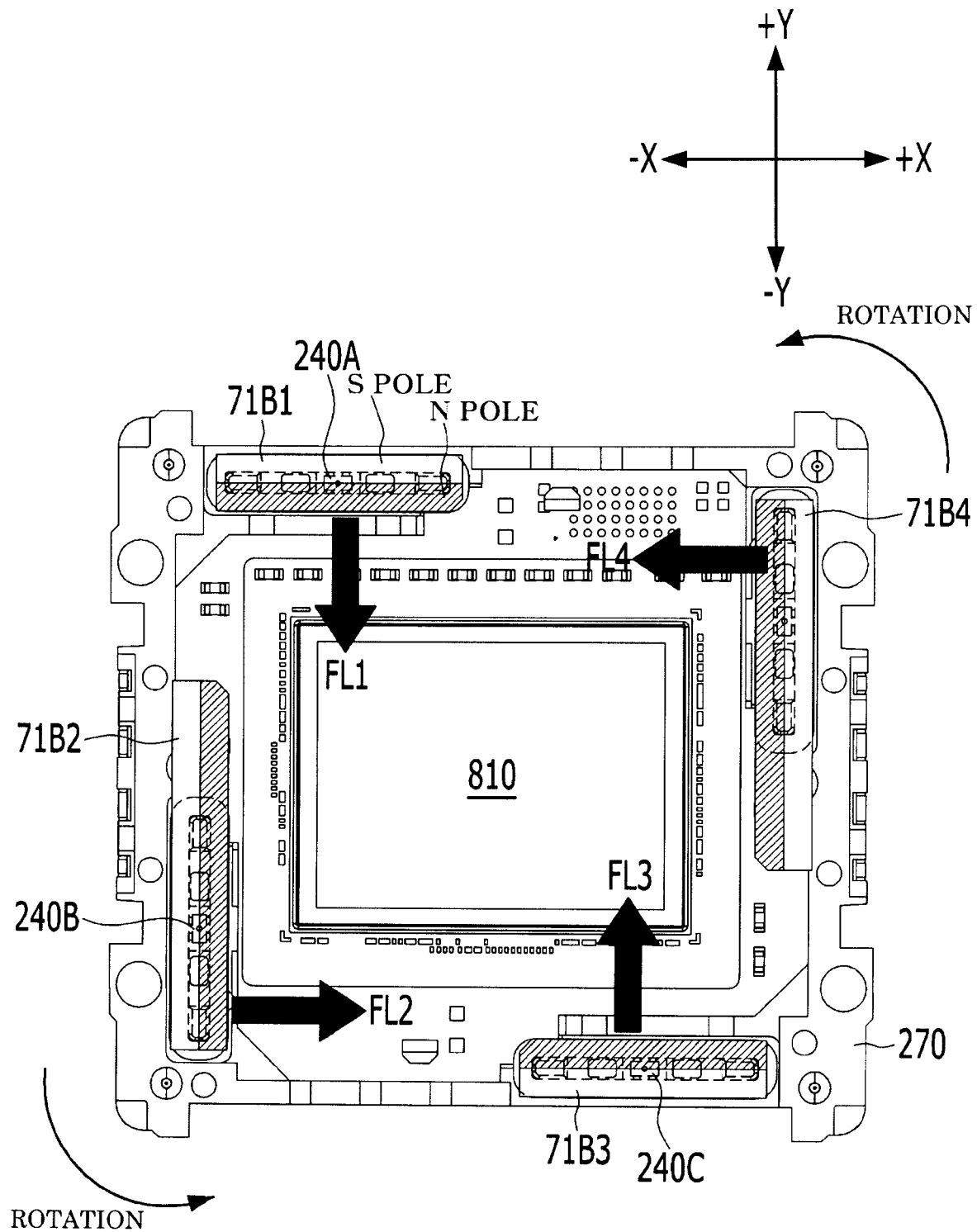
FIG. 18D is a view for explaining rotation of the OIS moving unit in the counterclockwise direction in the four-channel drive mode.

FIG. 18C is a view for explaining rotation of the OIS moving unit in the clockwise direction in the four-channel drive mode, and FIG. 18D is a view for explaining rotation of the OIS moving unit in the counterclockwise direction in the four-channel drive mode.

Referring to FIG. 18C, the OIS moving unit may be tilted in the clockwise direction relative to the optical axis, or may be rotated or rolled in the clockwise direction about the optical axis by first electromagnetic force FR1, which is generated by interaction between the first coil unit 230-1 and the first magnet unit 71B1, second electromagnetic force FR2, which is generated by interaction between the second coil unit 230-2 and the second magnet unit 71B2, third electromagnetic force FR3, which is generated by interaction between the third coil unit 230-3 and the third magnet unit 71B3, and fourth electromagnetic force FR4, which is generated by interaction between the fourth coil unit 230-4 and the fourth magnet unit 71B4.

In addition, referring to FIG. 18D, the OIS moving unit may be tilted in the counterclockwise direction relative to the optical axis, or may be rotated or rolled in the counterclockwise direction about the optical axis by first electromagnetic force FL1, which is generated by interaction between the first coil unit 230-1 and the first magnet unit 71B1, second electromagnetic force FL2, which is generated by interaction between the second coil unit 230-2 and the second magnet unit 71B2, third electromagnetic force FL3, which is generated by interaction between the third coil unit 230-3 and the third magnet unit 71B3, and fourth electromagnetic force FL4, which is generated by interaction between the fourth coil unit 230-4 and the fourth magnet unit 71B4.

In an example, the direction of the first electromagnetic force FR1 (or FL1) and the direction of the third electromagnetic force FR3 (or FL3) may be opposite each other. In addition, in an example, the direction of the second electromagnetic force FR2 (or FL2) and the direction of the fourth electromagnetic force FR4 (or FL4) may be opposite each other. In addition, in an example, the direction of the first electromagnetic force FR1 (or FL1) and the direction of the second electromagnetic force FR2 (or FL2) may be perpendicular to each other.

In the case of the three-channel drive mode, a driving signal may not be supplied to two coil units (e.g. 130-1 and 130-3, or 130-2 and 130-4) connected to each other in series, and thus, no electromagnetic force may be generated by the two coil units connected to each other in series. In an example, in the case of the three-channel drive mode, FR2 and FR4 may be omitted, and FR1 and FR3 may be present in FIG. 18C. Alternatively, in the case of the three-channel drive mode, FR2 and FR4 may be present, and FR1 and FR3 may be omitted in FIG. 18C. In addition, in the case of the three-channel drive mode, FL2 and FL4 may be omitted, and FL1 and FL3 may be present in FIG. 18D. Alternatively, in the case of the three-channel drive mode, FL2 and FL4 may be present, and FL1 and FL3 may be omitted in FIG. 18D.

Compared to the three-channel drive mode, according to the four-channel drive mode shown in FIGS. 18C and 18D, the electromagnetic force for rotating the OIS moving unit may be increased, and accordingly, the amount of drive current required to drive the first to fourth coil units 230-1 to 230-4 may be reduced. As a result, the amount of power that is consumed may be reduced.

In the embodiment shown in FIG. 2, OIS operation for hand-tremor compensation is performed using the second magnet 71B and the second coil 230. However, in another embodiment, OIS operation for hand-tremor compensation may be performed using a member made of shape memory alloy. In an example, the member made of shape memory alloy may be coupled to the fixed unit and the OIS moving unit, and may be conductively connected to the first board unit 255. The controller 830 or 780 may supply a driving signal to the member made of shape memory alloy, and may move the OIS moving unit in a direction perpendicular to the optical axis, or may rotate, tilt, or roll the OIS moving unit about the optical axis using the member made of shape memory alloy.

In still another embodiment, OIS operation may be performed using the second magnet 71B and the second coil 230, and the camera device 10 may include a ball member (not shown), which is disposed between the base 210 and the holder 270 in order to support the OIS moving unit. In this case, the ball member may support the OIS moving unit so that the OIS moving unit moves in a direction perpendicular to the optical axis or rotates, tilts, or rolls about the optical axis using frictional force and/or rolling force between the base 210 and the holder 270. In an example, the ball member may be disposed in the hole 59 in the base 210, and may be in contact with each of the base 210 and the holder 270. In another embodiment, the ball member may be provided, and the reinforcing member 37 and the support member 220 may be omitted.

The second position sensor 240 may be disposed on, coupled to, or mounted on the first surface (e.g. the upper surface) of the first circuit board 250. The second position sensor 240 may detect movement or displacement of the OIS moving unit in a direction perpendicular to the optical-axis direction, for example, shift or movement of the OIS moving unit in a direction perpendicular to the optical-axis direction. In addition, the second position sensor 240 may detect tilting of the OIS moving unit relative to the optical axis or rotation or rolling of the OIS moving unit about the optical axis within a predetermined range. The first position sensor 170 may alternatively be referred to as an "AF position sensor," and the second position sensor 240 may alternatively be referred to as an "OIS position sensor."

The second position sensor 240 may face or overlap the magnet 130 in the optical-axis direction. In an example, the second position sensor 240 may face or overlap the second magnet 71B in the optical-axis direction. In an example, the second position sensor 240 may include three or more sensors corresponding to or overlapping three or more magnet units, among the four magnet units 71B1 to 71B4 of the second magnet 71B, in the optical-axis direction in order to detect movement of the OIS moving unit.

In an example, the second position sensor 240 may be disposed below the second coil 230.

In an example, the second position sensor 240 may not overlap the second coil 230 in a direction perpendicular to the optical axis. In an example, the sensing element of the second position sensor 240 may not overlap the second coil 230 in a direction perpendicular to the optical axis. The sensing element may be a portion that detects a magnetic field.

In an example, the center of the second position sensor 240 may not overlap the second coil 230 in a direction perpendicular to the optical axis. In an example, the center of the second position sensor 240 may be a spatial center in the x-axis direction and the y-axis direction in an xy-coordinate plane perpendicular to the optical axis. Alternatively, the center of the second position sensor 240 may be a spatial center in the x-axis, y-axis, and z-axis directions.

In another embodiment, at least a portion of the second position sensor 240 may overlap the second coil 230 in a direction perpendicular to the optical axis.

In an example, the second position sensor 240 may overlap the holes 41A to 41C in the holder 270 in the optical-axis direction. In addition, in an example, the second position sensor 240 may overlap the cavity in the second coil 230 in the optical-axis direction. In addition, in an example, at least some of the holes 41A to 41C in the holder 270 may overlap the cavity in the second coil 230 in the optical-axis direction.

In an example, at least a portion of the second position sensor 240, for example the center of the second position sensor 240, may not overlap the second coil 230 in the optical-axis direction.

In an example, the second position sensor 240 may include a first sensor 240A, a second sensor 240B, and a third sensor 240C, which are spaced apart from one another.

Each of the first to third sensors 240A, 240B, and 240C may be, for example, a Hall sensor. In another embodiment, each of the first to third sensors 240A, 240B, and 240C may be a driver IC, which includes a Hall sensor and a driver. The description of the first position sensor 170 may also be applied to the first to third sensors 240A, 240B, and 240C. Each of the first to third sensors 240A, 240B, and 240C may be, for example, a displacement detection sensor, the output voltage of which varies depending on the positional relationship with a magnet unit corresponding thereto.

Each of the first sensor 240A, the second sensor 240B, and the third sensor 240C may be conductively connected to the first circuit board 250.

The second position sensor 240 may be disposed below the cavity in the second coil 230. In another embodiment, when viewed in the optical-axis direction or viewed from above, the second position sensor 240 may be disposed outside the second coil 230.

The second position sensor 240 may not overlap the second coil 230 in a direction perpendicular to the optical-axis direction. In an example, the second position sensor 240 may overlap the holder 270 in a direction perpendicular to the optical-axis direction.

In an example, the first sensor 240A may be disposed below the cavity in the first coil unit 230-1. The first sensor 240A may be disposed in a hole 41A corresponding thereto among the holes 41A to 41C in the holder 270. The second sensor 240B may be disposed below the cavity in the second coil unit 230-2. The second sensor 240B may be disposed in a hole 41B corresponding thereto among the holes 41A to 41C in the holder 270. The third sensor 240C may be disposed below the cavity in the third coil unit 230-3. The third sensor 240C may be disposed in a hole 41C corresponding thereto among the holes 41A to 41C in the holder 270.

In an example, each of the first to third sensors 240A, 240B, and 240C may not overlap a corresponding one of the coil units 230-1 to 230-3 in a direction perpendicular to the optical axis. The first to third sensors 240A, 240B, and 240C may overlap the holder 270 in a direction perpendicular to the optical axis.

Since the first to third sensors 240A, 240B, and 240C are disposed so as not to overlap the OIS coil 230 in a direction perpendicular to the optical axis, the influence of the magnetic field of the OIS coil 230 on the output of the OIS position sensor 240 may be reduced, and accordingly, it is possible to accurately perform OIS feedback operation and to ensure the reliability of OIS operation.

The second position sensor 240 may face, correspond to, or overlap the magnet 130 in the optical-axis direction. In an example, when the OIS moving unit is located at the initial position thereof, at least a portion of the first sensor 240A may overlap the first magnet unit 71B1 of the second magnet 71B in the optical-axis direction. The first sensor 240A may output a first output signal (e.g. first output voltage) corresponding to the result of detection of the magnetic field of the first magnet unit 71B1.

In an example, when the OIS moving unit is located at the initial position thereof, at least a portion of the second sensor 240B may overlap the second magnet unit 71B2 of the second magnet 71B in the optical-axis direction. The second sensor 240B may output a second output signal (e.g. second output voltage) corresponding to the result of detection of the magnetic field of the second magnet unit 71B2.

In addition, in an example, when the OIS moving unit is located at the initial position thereof, at least a portion of the third sensor 240C may overlap the third magnet unit 71B3 of the second magnet 71B in the optical-axis direction. The third sensor 240C may output a third output signal (e.g. third output voltage) corresponding to the result of detection of the magnetic field of the third magnet unit 71B3.

The initial position of the OIS moving unit may be the original position of the OIS moving unit in the state in which no power or driving signal is applied to the second coil 230 from the controller 830 or 780 or the position at which the OIS moving unit is located as the result of the support board being elastically deformed due only to the weight of the OIS moving unit. In addition, the initial position of the OIS moving unit may be the position at which the OIS moving unit is located when gravity acts in the direction from the first board unit 255 toward the second board unit 800 or when gravity acts in the opposite direction.

In order to improve the linearity of the relationship between the displacement of the OIS moving unit and the output from the second position sensor 250, each of the sensor units 240A, 240B, and 240C may overlap a corresponding one of the magnet units 71B1, 71B2, and 71B3 within the stroke range of the OIS moving unit in the optical-axis direction.

In an example, the controller 830 or 780 may control rolling of the OIS moving unit using at least one of the first output voltage from the first sensor 240A, the second output voltage from the second sensor 240B, or the third output voltage from the third sensor 240C. In an example, the controller 830 or 780 may control rolling of the OIS moving unit using the first output voltage and the third output voltage.

In an example, the controller 830 or 780 may control or adjust movement or displacement of the OIS moving unit in the first horizontal direction (e.g. the y-axis direction) or the second horizontal direction (e.g. the x-axis direction) using at least one of the first to third output voltages. In an example, the controller 830 or 780 may control or adjust movement or displacement of the OIS moving unit in the first horizontal direction (e.g. the y-axis direction) using the first output voltage from the first sensor 240A, and may control or adjust movement or displacement of the OIS moving unit in the second horizontal direction using the second output voltage from the second sensor 240B.

In an example, each of the first to third sensors 240A, 240B, and 240C may be a Hall sensor. In another embodiment, each of the first to third sensors may be a driver IC including a Hall sensor. In still another embodiment, each of the first and second sensors 240A and 240B may be a Hall sensor, and the third sensor 240C may be a tunnel magnetoresistance (TMR) sensor. In this case, the tunnel magnetoresistance (TMR) sensor may be a TMR magnetic angle sensor.

In still another embodiment, each of the first to third sensors 240A, 240B, and 240C may be a tunnel magnetoresistance (TMR) sensor. In this case, the TMR sensor may be a TMR linear magnetic field sensor having a linear output corresponding to the displacement (or the stroke) of the OIS moving unit.

The base 210 may be disposed below the first board unit 255. The base 210 may be spaced apart from the first board unit 255. The base 210 may have a polygonal shape, for example, a quadrangular shape, which coincides with or corresponds to the shape of the cover member 300 or the first board unit 255.

In an example, the base 210 may have a bore 210A formed therein so as to correspond to or face the first board unit 255. The bore 210A in the base 210 may be a through-hole formed through the base 210 in the optical-axis direction. In another embodiment, the base may not have a bore therein.

In an example, the base 210 may be coupled to the side plate 302 of the cover member 300. The base 210 may be provided on the side portion or the outer side surface thereof with a stair 211 (refer to FIG. 14), to which an adhesive is applied in order to be adhered to the side plate 302 of the cover member 300. In this case, the stair 211 may guide the side plate 302 of the cover member 300, which is coupled to the upper side thereof. The stair 211 of the base 210 and the lower end of the side plate 302 of the cover member 300 may be adhered and fixed to each other by means of an adhesive or the like.

The base 210 may include at least one protruding portion 216A and 216B, which protrudes from the upper surface thereof. In an example, the protruding portion 216A and 216B may protrude upwards from the outer side surface of the base 210. In an example, the base 210 may include two protruding portions 216A and 216B, which face or overlap each other in the first horizontal direction (e.g. the y-axis direction).

In an example, the base 210 may include four side portions (or side plates), and the protruding portions 216A and 216B may be formed on two side portions among the four side portions. In an example, each of the protruding portions 216A and 216B may be disposed or located at the center of a corresponding one of the side portions (or the side plates) of the base 210.

The base 210 may have a groove 341b formed therein. The groove 341b may be an adhesive-receiving groove. The groove 341b may be formed in the outer side surface of each of the protruding portions 216A and 216B of the base 210. The groove 341b may be formed in the upper surface of each of the protruding portions 216A and 216B of the base 210. The groove 341b may be formed from the upper surface of each of the protruding portions 216A and 216B of the base 210 to the lower surface thereof. An adhesive, by which the support board 310 is adhered to the base 210, may be disposed in the groove 341b. The groove 341b may include a plurality of grooves. In an example, the groove 341b may extend in the optical-axis direction. In another embodiment, the groove formed in each of the protruding portions 216A and 216B of the base 210 may extend in a direction perpendicular to the optical axis.

The second board unit 800 may be disposed on the base 210, or may be coupled to the base 210. In an example, the second board unit 800 may be disposed under the base 210. In an example, the second board unit 800 may be disposed so as to be spaced apart from the OIS moving unit, for example the first board unit 255 and the first heat dissipation member 280, in the optical-axis direction.

In an example, the second board unit 800 may be disposed on the lower surface of the base 210. The second board unit 800 may be coupled to the base 210. In an example, the second board unit 800 may be coupled to the lower surface of the base 210.

The second board unit 800 may serve to supply a signal from the outside to the image sensor unit 350 or to output a signal transmitted from the image sensor unit 350 to the outside.

The second board unit 800 may include a first region (or a first board) 801, which corresponds to, faces, or overlaps the AF driving unit 100 or the image sensor 810 in the optical-axis direction, a second region (or a second board) 802, which is disposed on the connector 804, and a third region (or a third board) 803, which interconnects the first region 801 and the second region 802. The connector 804 may be provided with ports in order to be conductively connected to the second region 802 of the second board unit 800 and to be conductively connected to an external device (e.g. the optical instrument 200A). The bore 210A in the base 210 may be closed or blocked by the first region 801 of the second board unit 800.

The first region 801 of the second board unit 800 may correspond to, face, or overlap at least one of the cover member 300 or the base 210 in the optical-axis direction. In an example, the first region 801 may overlap the upper plate 301 and the side plate 302 of the cover member 300 in the optical-axis direction.

Each of the first region 801 and the second region 802 of the second board unit 800 may include a rigid substrate. The third region 803 may include a flexible substrate. In addition, each of the first region 801 and the second region 802 may further include a flexible substrate.

In another embodiment, at least one of the first to third regions 801 to 803 of the second board unit 800 may include at least one of a rigid substrate or a flexible substrate.

The second board unit 800 may be disposed behind the first board unit 255. In an example, the first board unit 255 may be disposed between the AF driving unit 100 and the second board unit 800. In another embodiment, the second board unit may be disposed between the AF driving unit and the first board unit.

When viewed from above, the first region 801 of the second board unit 800 may have a polygonal shape (e.g. a quadrangular shape, a square shape, or a rectangular shape), but the disclosure is not limited thereto. In another embodiment, the first region 801 of the second board unit 800 may have a circular shape.

Figure 20A:
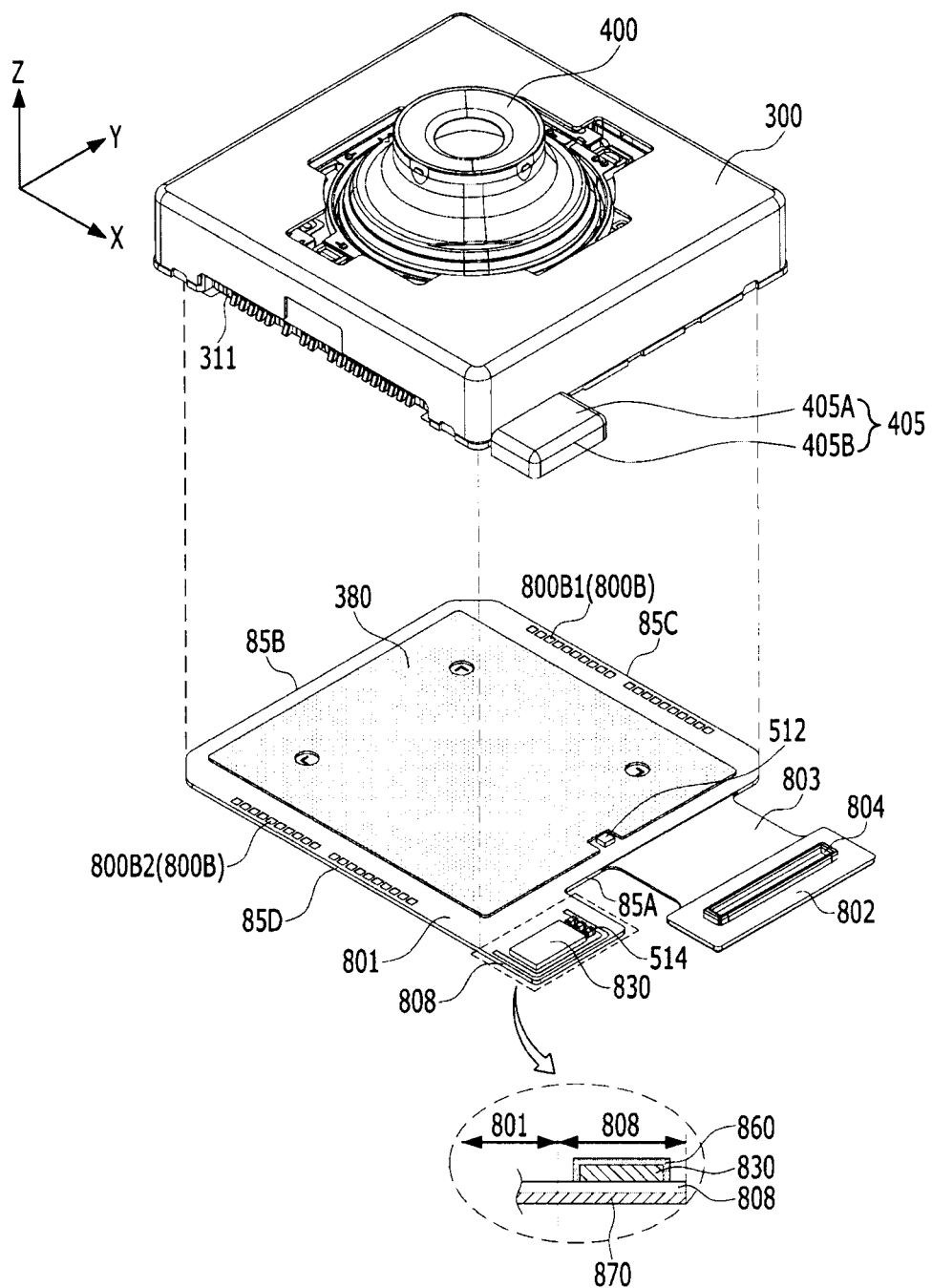
FIG. 20A is a view showing an embodiment of disposition of first to third regions of the second board unit, an extension region, an AF moving unit, an OIS moving unit, and a controller.

FIG. 20A is a view showing an embodiment of disposition of the first to third regions 801 to 803 of the second board unit 800, the extension region 808, the AF moving unit, the OIS moving unit, and the controller 830.

Referring to FIG. 20A, the first region 801 may include four side portions (or side surfaces) 85A to 85D. In an example, the first region 801 may include first and second side portions 85A and 85B, which face each other or are located opposite each other in the second horizontal direction (e.g. the x-axis direction), and third and fourth side portions 85C and 85D, which face each other or are located opposite each other in the first horizontal direction (e.g. the y-axis direction).

The second region 802 may be disposed adjacent to the first side portion 85A of the first region 801, and the third region 803 may be connected to the first side portion 85A of the first region 801. In an example, the third region 803 may extend from the first region 801 and may be connected to the side of the second region 802 that faces the first side portion 85A. In an example, the third region 803 may be spaced apart from the extension region 808.

The second board unit 800 may include a plurality of terminals 800B corresponding to the terminals 311 of the support board 310. The plurality of terminals 800B may be formed in the first region 801 of the second board unit 800. In an example, the second board unit 800 may include first terminals 800B1, which are disposed or arranged so as to be spaced apart from each other in the second horizontal direction (e.g. the x-axis direction) along the side of the third side portion 85C of the first region 801, and second terminals 800B2, which are disposed or arranged so as to be spaced apart from each other in the second horizontal direction along the side of the fourth side portion 85D of the first region 801.

In an example, the plurality of terminals 800B may be formed on the first surface (e.g. the upper surface) of the second board unit 800 (e.g. the first region 801), which faces the first board unit 255.

In an example, the controller 830 may be disposed in the extension region extending from any one of the third and fourth side portions 85C and 85D of the first region 801 of the second board unit 800. In another embodiment, the controller may be disposed in the extension region extending from the side portion of the first region 801 of the second board unit 800, on which the plurality of terminals is formed.

A coupling hole (not shown) may be formed in the first region 801, and a coupling protrusion (not shown) may be formed on the base 210 in order to be coupled to the coupling hole in the first region 801.

The camera device 10 may further include a second heat dissipation member 380, which is disposed on, coupled to, or secured to the second board unit 800. In an example, the second heat dissipation member 380 may be disposed on, coupled to, or secured to the upper surface of the first region 801 of the second board unit 800. In another embodiment, the second heat dissipation member 380 may be omitted.

The camera device 10 may further include a third heat dissipation member (not shown), which is disposed on, coupled to, or secured to the second surface (e.g. the lower surface) of the second board unit 800.

In an example, the second heat dissipation member 380 may be embodied as a plate-type member having a predetermined thickness and hardness. In addition, the second heat dissipation member 380 may face or overlap the first heat dissipation member 280 in the optical-axis direction.

Referring to FIG. 20A, the controller 830 may be disposed on or coupled to the upper surface of the extension region 808. In another embodiment, the controller may be disposed on or coupled to the lower surface of the extension region 808.

Referring to FIG. 20A, the controller 830 may be disposed in the extension region 808 of the second board unit 800, which is located outside the cover member 300. In another embodiment, the controller may be disposed in the first region of the second board unit 800, which is located outside the base 210.

In still another embodiment, the controller may be disposed or mounted on the second circuit board 260, which is a sensor board. In another embodiment, the controller may be disposed or mounted on the upper surface of the second circuit board 260. Since the heat dissipation member 280 is disposed on or coupled to the lower surface of the signal circuit board 260, when the controller is disposed on the second circuit board 260, the heat generated from the controller may be easily dissipated by the heat dissipation member 280. Accordingly, heat dissipation efficiency may be improved.

Figure 20B:
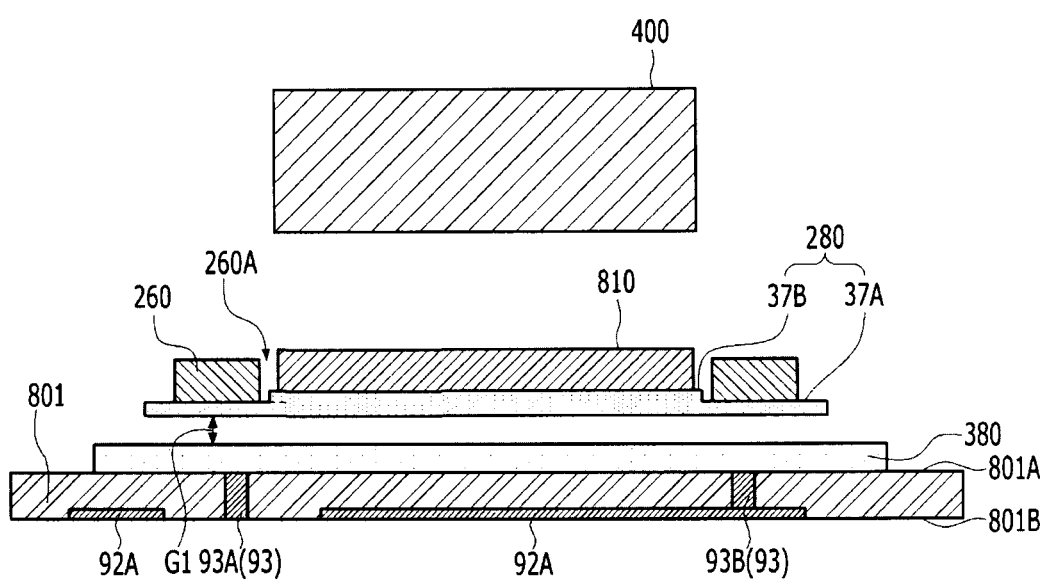
FIG. 20B is a schematic cross-sectional view of the lens module, the first board unit, the image sensor, the first heat dissipation member, the second board unit, and the second heat dissipation member in FIG. 10A.

FIG. 20B is a schematic cross-sectional view of the lens module 400, the first board unit 255, the image sensor 810, the first heat dissipation member 280, the second board unit 800, and the second heat dissipation member 380 in FIG. 10A.

Referring to FIG. 20B, the image sensor 810 may be disposed in the bore (or the hole) 260A in the second circuit board 260, and may be coupled to the first heat dissipation member 280.

In an example, the first heat dissipation member 280 may include a body 37A, which is disposed under the second circuit board 260, and a protruding portion (or a protruding region) 37B, which protrudes from the body 37A and is disposed in the bore 260A in the second circuit board 260.

The image sensor 810 may be disposed on, coupled to, or secured to the protruding portion 37B. In an example, the image sensor 810 may be disposed on, coupled to, or attached to the upper surface of the protruding portion 37B. In an example, the upper surface of the protruding portion 37B may be located at a lower position than the upper surface of the second circuit board 260. In another embodiment, the upper surface of the protruding portion 37B may be located at the same height as the upper surface of the second circuit board 260.

The second heat dissipation member 380 may be disposed on the first surface 801A (or the upper surface) of the first region 801 of the second board unit 800, which faces the first heat dissipation member 280 in the optical-axis direction.

The spacing distance (or the gap) G1 between the first board unit 255 and the second board unit 800 in the optical-axis direction may be 0.05 mm to 0.7 mm. In an example, the spacing distance G1 may be a distance from the lower surface of the first heat dissipation member 280 to the upper surface of the second heat dissipation member 380.

In another embodiment, the spacing distance G1 may be 0.15 mm to 0.5 mm. In still another embodiment, the spacing distance G1 may be 0.15 mm to 0.3 mm. In still another embodiment, the spacing distance G1 may be 0.2 mm to 0.3 mm.

The second board unit 800 may include a first conductive layer 93, which is exposed to the first surface 801A and is in contact with the second heat dissipation member 380, for example, the lower surface of the second heat dissipation member 380. In an example, the first conductive layer 93 may be thermally bonded to the lower surface of the second heat dissipation member 380, or may be coupled to the lower surface of the second heat dissipation member 380 by means of a conductive adhesive, for example, a solder. In addition, in an example, the first conductive layer 93 may be conductively connected to the second heat dissipation member 380.

The second board unit 800 may include a second conductive layer 92A, which is connected to the first conductive layer 93 and is exposed from the second surface 801B (or the lower surface) of the second board unit 800, which is a surface opposite the first surface 801A of the second board unit 800. In an example, the second conductive layer 92A may be conductively connected to the ground of the second board unit 800.

The first conductive layer 93 may take the form of a via, which is formed through at least a portion of the second board unit 800. In addition, the first conductive layer 93 may have a first via 93A formed through the second board unit 800 so as to be open or exposed to the second surface 801B of the second board unit 800. In addition, one end of the first conductive layer 93 may be in contact with the lower surface of the second heat dissipation member 380, and the other end thereof may have a second via 93B formed therein so as to be in contact with, coupled to, or connected to the second conductive layer 92A.

Referring to FIG. 20B, the second conductive layer 92A may be disposed in, coupled to, or attached to a recess formed in the second surface 801B of the second board unit 800. In another embodiment, the second conductive layer may be disposed on, coupled to, or attached to the second surface 801B of the second board unit 800, which is a flat surface in which no recess is formed.

Each of the first conductive layer 93 and the second conductive layer 92A may serve as a heat dissipation pattern or a heat dissipation pad for dissipating heat from the second board unit 800. That is, because the first conductive layer 93 and the second conductive layer 92A are provided only for the purpose of heat dissipation, the first conductive layer 93 and the second conductive layer 92A are not conductively connected to wires of the second board unit 800 other than the ground of the second board unit. In this case, the other wires may be wires conductively connected to the controller 830 or 780, an electronic element (or a circuit element) such as the image sensor 810, or the support board 310.

The second conductive layer 92A may be conductively connected to the cover member 300 (e.g. the side plate 302) via a solder, a conductive adhesive, or a sheet of conductive tape. Alternatively, in another embodiment, the second conductive layer 92A, which is connected to the ground of the second board unit 800, may be conductively connected to the cover member 300 via a bracket. The bracket may be a structure in which the camera device is accommodated or received in order to protect the camera device. In an example, the bracket may be formed of a conductive material. Since the ground of the second board unit 800, the second heat dissipation member 380, and the cover member 300 are conductively connected to one another, it is possible to protect the camera device 10 from static electricity and to improve heat dissipation efficiency.

In another embodiment, at least one of the first conductive layer or the second conductive layer of the second board unit 800 may also be applied to the second circuit board 260. In an example, the second circuit board 260 according to another embodiment may include at least one third conductive layer, which is in contact with the first heat dissipation member 280, and at least a portion of the third conductive layer may be exposed from the second circuit board 260.

Since the second heat dissipation member 380 is disposed on the first surface of the second board unit 800, the spacing distance from the first heat dissipation member 280 may be reduced, and accordingly, heat dissipation efficiency may be improved.

The heat dissipated from the first heat dissipation member 280 may be transferred to the second heat dissipation member 380 through convection or radiation, and the transferred heat may be dissipated outside through the second heat dissipation member 380. Accordingly, heat dissipation effect may be improved. Since the upper surface of the second heat dissipation member 380 and the lower surface of the first heat dissipation member 280 are disposed so as to face or overlap each other in the optical-axis direction, heat may be smoothly transferred from the first heat dissipation member 280 to the second heat dissipation member 380.

In an example, the first heat dissipation member 280 and the second heat dissipation member 380 may be formed of the same material. In another embodiment, the first heat dissipation member 280 and the second heat dissipation member 380 may be formed of different materials. In an example, the second heat dissipation member 380 may have the same thermal conductivity as the first heat dissipation member 280 or thermal conductivity similar thereto.

In addition, the second heat dissipation member 380 may serve as a reinforcing member for stably supporting the second board unit 800 and inhibiting the second board unit 800 from being damaged by external impact or contact.

In another embodiment, the second heat dissipation member 380 may be formed of a thermally conductive material having high thermal conductivity, for example, thermally conductive epoxy, thermally conductive plastic, or thermally conductive synthetic resin.

The second heat dissipation member 380 may include at least one groove or at least one uneven portion in order to improve the heat dissipation effect. In an example, the groove or the uneven portion may be formed in a predetermined pattern in at least one of the upper surface or the lower surface of the second heat dissipation member 380.

In another embodiment, the second heat dissipation member may include a hole or a through-hole in place of the groove. In another embodiment, the second heat dissipation member may include a plurality of through-holes. The description of the predetermined pattern of the first heat dissipation member 280 may also be applied to the second heat dissipation member 380.

The support board 310 may support the moving unit so that the OIS moving unit moves relative to the fixed unit in a direction perpendicular to the optical-axis direction, and may conductively connect the first board unit 255 to the second board unit 800. The support board 310 may alternatively be referred to as a "support member," a "connection board," or a "connection part." Alternatively, the support board 310 may be referred to as an "interposer." Alternatively, the interposer may include the first circuit board 250 and the support board 310, which are integrally formed with each other.

The support board 310 may include a flexible substrate, or may be embodied as a flexible substrate. In an example, the support board 310 may include a flexible printed circuit board (FPCB). At least a portion of the support board 310 may be flexible. The first circuit board 250 and the support board 310 may be connected to each other.

Referring to FIG. 16, in an example, the support board 310 may include a connection portion 320, which is connected to the first circuit board 250. In an example, the first circuit board 250 and the support board 310 may be integrally formed with each other. In an example, the first circuit board 250 and the support board 310 may form a single support board.

Alternatively, the first circuit board 250 and the support board 310 may form a single circuit board.

In another embodiment, the first circuit board 250 and the support board 310 may be provided separately from each other, rather than being integrated, and may be connected to each other via the connection portion 320. In an example, the first circuit board 250 and the support board 310 may be conductively connected to each other. In another embodiment, the connection portion 320 may be integrally formed with at least one of the support board 310 or the first circuit board 250.

In still another embodiment, the connection portion 320 may connect the second circuit board 260 to the support board 310.

In another embodiment, the first circuit board 250 and the second circuit board 260 may be integrally formed with each other to form a single circuit board. In still another embodiment, the first circuit board 250, the second circuit board 260, the connection portion 320, and the support board 310 may be integrally formed with one another to form a single circuit board.

In an example, each of the first circuit board 250 and the second circuit board 260 may be embodied as a rigid substrate, and each of the connection portion 320 and the support board 310 may be embodied as a flexible substrate.

In addition, the support board 310 may be conductively connected to the first circuit board 250. The support board 310 may be conductively connected to the second board unit 800.

The support board 310 may support the OIS moving unit with respect to the fixed unit. In addition, the support board 310 may guide movement of the OIS moving unit. The support board 310 may guide the OIS moving unit to move in a direction perpendicular to the optical-axis direction. The support board 310 may guide the OIS moving unit to rotate, tilt, or roll about the optical axis. The support board 310 may restrict movement of the OIS moving unit in the optical-axis direction.

A portion of the support board 310 may be coupled, attached, or secured to the base 210, which is the fixed unit, and another portion of the support board 310 may be coupled, attached, or secured to the holder 270, which is the OIS moving unit. In an example, portions of the bodies 86 and 87 of the support board 310 may be coupled to the protruding portions 216A and 216B of the base 210 and the protruding portions 27A and 27B of the holder 270. The terminal units 7A to 7D of the support board 310 may be coupled to the terminals 800B of the second board unit 800, and may be conductively connected thereto.

The support board 310 may include a circuit member 310A and an elastic unit 310B coupled to the circuit member 310A. The elastic unit 310B serves to elastically support the OIS moving unit. The elastic unit 310B may be embodied as an elastic body, for example a spring. The elastic unit 310B may include metal, or may be made of an elastic material. The circuit member may conductively connect the first circuit board 250 to the second board unit 800. The circuit member may be embodied as a flexible substrate, or may include at least one of a flexible substrate or a rigid substrate. The circuit member may be, for example, an FPCB.

The support board 310 may be connected to the first board unit 255 (e.g. the first circuit board 250), and may include at least one connection portion 320A and 320B, which is conductively connected to the first board unit 255 (e.g. the first circuit board 250). In addition, the support board 310 may be connected to the second board unit 800, and may include at least one terminal unit 7A to 7D, which is conductively connected to the second board unit 800. The at least one terminal unit 7A to 7D may include a plurality of terminals 311.

In an example, the support board 310 may include a first support board 310-1 and a second support board 310-2, which are spaced apart from each other. The first support board 310-1 and the second support board 310-2 may be formed to be bilaterally symmetrical with each other. In another embodiment, the first support board 310-1 and the second support board 310-2 may be integrated into a single board. Instill another embodiment, the support board 310 may include three or more support boards.

The first support board 310-1 and the second support board 310-2 may be disposed on respective sides of the first circuit board 250. In an example, the first support board 310-1 may include a first body 86 and at least one terminal unit 7A and 7B extending from the first body 86. The at least one terminal unit 7A and 7B of the first support board 310-1 may include a plurality of terminals 311.

The second support board 310-2 may include a second body 87 and at least one terminal unit 7C and 7D extending from the second body 87. The at least one terminal unit 7C and 7D of the second support board 310-2 may include a plurality of terminals 311.

The first circuit board 250 may include a first side portion 33A and a second side portion 33B, which are located opposite each other, and may further include a third side portion 33C and a fourth side portion 33D, which are located between the first side portion 33A and the second side portion 33B and are located opposite each other.

In an example, the first connection portion 320A may connect the first body 86 to the first side portion 33A of the first circuit board 250, and the second connection portion 320B may connect the second body 87 to the second side portion 33B of the first circuit board 250.

The first body 86 may include a first portion 6A, which corresponds to or faces the first side portion 33A of the first circuit board 250, a second portion 6B, which corresponds to a portion (or one side) of the third side portion 33C of the first circuit board 250, and a third portion 6C, which corresponds to a portion (or one side) of the fourth side portion 33D of the first circuit board 250. In addition, the first body 86 may include a first bent portion 6D, which connects one end of the first portion 6A to the second portion 6B and is bent from the end of the first portion 6A, and a second bent portion 6E, which connects the other end of the first portion 6A to the third portion 6C and is bent from the other end of the first portion 6A.

In an example, the first support board 310-1 may include a first terminal unit 7A and a second terminal unit 7B. In an example, the first terminal unit 7A may extend or protrude from the second portion 6B of the first body 86 toward the second board unit 800, and the second terminal unit 7B may extend or protrude from the third portion 6C of the first body 86 toward the second board unit 800. The second terminal unit 7B may be located opposite the first terminal unit 7A, with the first board unit 255 (e.g. the first circuit board 250) interposed therebetween.

In an example, the first connection portion 320A may connect the first portion 6A of the first body 86 to the first side portion 33A of the first circuit board 250. The first connection portion 320A may include a bent portion.

The second body 87 may include a first portion 9A, which corresponds to or faces the second side portion 33B of the first circuit board 250, a second portion 9B, which corresponds to or faces another portion (or an opposite side) of the third side portion 33C of the first circuit board 250, and a third portion 9C, which corresponds to or faces another portion (or an opposite side) of the fourth side portion 33D of the first circuit board 250. In addition, the second body 87 may include a first bent portion 9D, which connects one end of the first portion 9A to the second portion 9B and is bent from the end of the first portion 9A, and a second bent portion 9E, which connects the other end of the first portion 9A to the third portion 9C and is bent from the other end of the first portion 9A.

In an example, the second support board 310-2 may include a third terminal unit 7C and a fourth terminal unit 7D. The third terminal unit 7C may extend or protrude from the second portion 9B of the second body 87 toward the second board unit 800, and the fourth terminal unit 7D may extend or protrude from the third portion 9C of the second body 87 toward the second board unit 800. The fourth terminal unit 7D may be located opposite the third terminal unit 7C, with the first board unit 255 (e.g. the first circuit board 250) interposed therebetween.

In an example, the second connection portion 320B may connect the first portion 9A of the second body 87 to the second side portion 33B of the first circuit board 250. The second connection portion 320B may include a bent portion.

The terminal units (e.g. 7A and 7C) of the support board 310 may be provided with terminals P1 to P4 in order to be conductively connected to the terminals B1 to B4 of the terminal unit 95 of the circuit board 190 of the AF driving unit 100. The terminals B1 to B4 of the terminal unit 95 of the circuit board 190 and the terminals P1 to P4 of the terminal units 7A and 7C of the support board 310 may be conductively connected to each other by means of a solder or a conductive adhesive. That is, the circuit board 190 of the AF driving unit 100 may be conductively connected to the second board unit 800 via the support board 310.

In an example, the terminals P1 to P4 may be formed or disposed on the terminal units 7A and 7C, which are connected to portions of the bodies 86 and 87 coupled to the protruding portion (e.g. 216A) of the base 210 of the support board 310. In an example, the terminals P1 to P4 may be disposed or formed in the central regions of the terminal units 7A and 7C. In an example, the terminals P1 to P4 may be disposed on the terminals 311 formed at the terminal units 7A and 7C. In an example, the terminals P1 to P4 may be disposed between the terminals 311 formed at the terminal units 7A and 7C and the upper sides (or the upper surfaces) of the bodies 86 and 87.

Referring to FIG. 16, the circuit member 310A of the support board 310 may include a first insulating layer 29A, a second insulating layer 29B, and a conductive layer 29C formed between the first insulating layer 29A and the second insulating layer 29B. The conductive layer 29C may be a wiring layer for transmitting an electrical signal. In an example, the second layer 29B may be located outside the first layer 29A.

Each of the first and second insulating layers 29A and 29B may be formed of an insulating material, such as polyimide, and the conductive layer 29C may be formed of a conductive material, such as copper, gold, or aluminum, or may be formed of an alloy including copper, gold, or aluminum.

The elastic unit 310B of the support board 310 may be disposed on the second layer 29B. The elastic unit 310B may include at least one of copper, titanium, or nickel, or may be formed of an alloy including at least one of copper, titanium, or nickel in order to serve as a spring. In an example, the elastic unit 310B may be formed of an alloy of copper and titanium or an alloy of copper and nickel.

The elastic unit 310B may be conductively connected to the first board unit 255 or the ground of the second board unit 800. The elastic unit 310B may be used for impedance matching of transmission lines (or wires) of the board units 255, 310, and 800, and may reduce loss of transmission signals through impedance matching to reduce the influence of noise. In an example, the matching impedance may be 40 ohms to 600 ohms. In an example, the matching impedance may be 50 ohms. In an example, an EMI member (e.g. a sheet of EMI tape) or a conductive member (e.g. a sheet of conductive tape) may be used for impedance matching.

The support board 310 may include a metal member or a conductive member formed on the outer side surface thereof. For example, the metal member may be an EMI member (e.g. a sheet of EMI tape) or a conductive member (e.g. a sheet of conductive tape). In an example, the EMI member or the conductive member may be disposed on or attached to at least one of the elastic unit 310B or the circuit member 310A. The support board 310 may further include a protective member or an insulating member for enveloping or covering the elastic unit 310B.

FIG. 17A is a first perspective view of the support board 310 coupled to the holder 270 and to the base 210, and FIG. 17B is a second perspective view of the support board 310 coupled to the holder 270 and to the base 210.

Referring to FIGS. 17A and 17B, the holder 270 may include first to fourth side portions 64A to 64D (refer to FIG. 18A) corresponding to or facing the first to fourth side portions 33A to 33D of the first circuit board 250.

The first and second side portions 64A and 64B of the holder 270 may face each other or may be disposed opposite each other in the second horizontal direction (e.g. the x-axis direction). In addition, the third and fourth side portions 64C and 64D of the holder 270 may face each other or may be disposed opposite each other in the first horizontal direction (e.g. the y-axis direction).

At least a portion of the support board 310 may be attached or coupled to the holder 270. In an example, at least one of the connection portions 320A and 320B of the support board 310 may be coupled to at least one of the first to fourth side portions 64A to 64D of the holder 270 by means of an adhesive. In an example, the first connection portion 320A may be coupled, attached, or secured to the first side portion 64A of the holder 270 by means of an adhesive, and the second connection portion 320B may be coupled, attached, or secured to the second side portion 64B of the holder 270 by means of an adhesive.

The holder 270 may be provided on the first side portion 64A thereof with a first protruding portion 27A, and may be provided on the second side portion 64B thereof with a second protruding portion 27B.

The support board 310 may be coupled, attached, or secured to the protruding portions 27A and 27B of the holder 270. The support board 310 may be coupled, attached, or secured to the outer side surfaces (or the inner side surfaces) of the protruding portions 27A and 27B of the holder 270.

In an example, a portion of the support board 310 may be coupled, attached, or secured to the first protruding portion 27A and the second protruding portion 27B of the holder 270. The bodies 86 and 87 of the support board 310 may be coupled, attached, or secured to the first and second protruding portions 27A and 27B of the holder 270.

In an example, the first support board 310-1 may be coupled, attached, or secured to the first protruding portion 27A, and the second support board 310-2 may be coupled, attached, or secured to the second protruding portion 27B. In an example, the first portion 6A of the first body 86 may be coupled, attached, or secured to the outer side surface (or the inner side surface) of the first protruding portion 27A, and the first portion 9A of the second body 87 may be coupled, attached, or secured to the outer side surface (or the inner side surface) of the second protruding portion 27B.

The base 210 may include first to fourth side portions 65A to 65D (refer to FIG. 14) corresponding to or facing the first to fourth side portions 33A to 33D of the first circuit board 250. In addition, the first to fourth side portions 65A to 65D of the base 210 may correspond to or face the first to fourth side portions 64A to 64D of the holder 270.

The first and second side portions 65A and 65B of the base 210 may face each other or may be disposed opposite each other in the first horizontal direction (e.g. the y-axis direction). In addition, the third and fourth side portions 65C and 65D of the base 210 may face each other or may be disposed opposite each other in the second horizontal direction (e.g. the x-axis direction).

At least a portion of the support board 310 may be coupled, attached, or secured to the base 210. In an example, the bodies 86 and 87 of the support board 310 may be coupled to the base 210 by means of an adhesive. In an example, portions of the bodies 86 and 87 of the support board 310, which are connected to the terminal units 7A to 7D, may be coupled to the base 210.

In an example, at least a portion of the support board 310 may be coupled, attached, or secured to the protruding portions 216A and 216B formed on the base 210. In an example, the support board 310 may be coupled, attached, or secured to the outer side surfaces (or the inner side surfaces) of the protruding portions 216A and 216B of the base 210. The first protruding portion 216A may be formed on the third side portion 65C of the base 210, and the second protruding portion 216B may be formed on the fourth side portion 65D of the base 210.

In an example, the bodies 86 and 87 of the support board 310 may be coupled, attached, or secured to the first and second protruding portions 216A and 216B of the base 210.

In an example, a portion (e.g. the second portion 6B) of the first support board 310-1 may be coupled, attached, or secured to one region of the first protruding portion 216A of the base 210, and another portion (e.g. the third portion 6C) of the first support board 310-1 may be coupled, attached, or secured to one region of the second protruding portion 216B of the base 210.

In an example, a portion (e.g. the second portion 9B) of the second support board 310-2 may be coupled, attached, or secured to another region of the first protruding portion 216A of the base 210, and another portion (e.g. the third portion 9C) of the second support board 310-2 may be coupled, attached, or secured to another region of the second protruding portion 216B of the base 210.

A first coupling region 69A may be formed between the first body 86 of the first support board 310-1 and the first protruding portion 27A of the holder 270, and a second coupling region 69B may be formed between the second body 87 of the second support board 310-2 and the second protruding portion 27B of the holder 270.

In addition, a third coupling region 59A may be formed between one end of each of the first and second support boards 310-1 and 310-2 and the first protruding portion 216A of the base 210. A fourth coupling region 59B may be formed between the other end of each of the first and second support boards 310-1 and 310-2 and the second protruding portion 216B of the base 210.

The OIS moving unit may be elastically supported with respect to the fixed unit by the support board 310 and the first to fourth coupling regions 69A, 69B, 59A, and 59B. The terminals 311 of the support board 310 may be coupled to the terminals 800B of the second board unit 800 by means of a solder 902 (refer to FIGS. 17A and 17B) or a conductive adhesive, and may be conductively connected thereto.

In another embodiment, the support member may be an elastic member including no substrate, for example, a spring, a wire, a shape memory alloy, or a ball member. In an example, in the case in which the support member is a wire, a plurality of wires may be disposed on at least one of the corners or the side portions of the base 210 or the second board unit 800, and may interconnect the first board unit 255 (e.g. the second circuit board 260) and the second board unit 800 (or the base 210). In an example, one end of each of the plurality of wires may be coupled to the first board unit 255

(e.g. the second circuit board 260), and the other end of each of the plurality of wires may be coupled to the second board unit 800 (or the base 210).

The image sensor unit 350 may include at least one of a controller 830, a memory 512, or a capacitor 514.

The controller 830 may be disposed so as to be spaced apart from the first board unit 255. In an example, the controller 830 may be disposed on the second board unit 800.

The memory 512 may be disposed on any one of the first board unit 255 and the second board unit 800. In an example, the memory 512 may be disposed or mounted in the first region 801 of the second board unit 800. In an example, the memory 512 may spatially avoid or be spaced apart from the second heat dissipation member 380. In an example, the second heat dissipation member 380 may have an escape recess or a bore formed therein in order to avoid spatial interference with the memory 512, and the memory 512 may be disposed in the escape recess or the bore in the second heat dissipation member 380. The capacitor 514 may be disposed on at least one of the first board unit 255 or the second board unit 800.

The memory 512 may store a first data value (or a code value) corresponding to the output from the second position sensor 240 according to displacement (or stroke) of the OIS moving unit in a direction perpendicular to the optical axis (e.g. the x-axis direction or the y-axis direction) in order to implement OIS feedback operation. In addition, the memory 512 may store a second data value (or a code value) corresponding to the output from the first position sensor 170 according to displacement (or stroke) of the bobbin 110 in the first direction (e.g. the optical-axis direction or the z-axis direction) in order to implement AF feedback operation.

In an example, each of the first and second data values may be stored in the memory 512 in the form of a look-up table. Alternatively, each of the first and second data values may be stored in the memory 512 in the form of an equation or an algorithm. In addition, the memory 512 may store an equation, an algorithm, or a program for operation of the controller 830. In an example, the memory 512 may be a non-volatile memory, for example, an electrically erasable programmable read-only memory (EEPROM).

The controller 830 may be disposed in one region of the second board unit 800, which is located on the outer side of the cover member 300 or is located outside the cover member 300.

Referring to FIG. 20A, the second board unit 800 may include an extension region 808, which is connected to the first region 801 and extends from the first region 801. The extension region 808 may extend from the first side portion 85A of the first region 801. In an example, the extension region 808 may protrude from the outer side surface of the first side portion 85A of the first region. In an example, the extension region 808 may extend or protrude in the second horizontal direction (e.g. the x-axis direction).

The extension region 808 may be located on the outer side of the cover member 300, or may be located outside the cover member 300.

The extension region 808 may alternatively be referred to as a "fourth region," a "protruding region," an "extension portion," or a "protruding portion." The extension region 808 does not overlap the AF moving unit or the OIS moving unit in the optical-axis direction. In an example, the extension region 808 may extend in the same direction as the third region 803 (e.g. the second horizontal direction).

The controller 830 may be disposed in the extension region 808 of the second board unit 800. In an example, the controller 830 may be disposed or mounted on the upper surface of the extension region 808 of the second board unit 800. In another embodiment, the controller 830 may be disposed or mounted on the lower surface of the extension region 808. In an example, the controller 830 may not overlap the cover member 300 in the optical-axis direction. In addition, in an example, the extension region 808 may not overlap the cover member 300 in the optical-axis direction.

In an example, the area of the upper surface of the extension region 808 may be larger than or equal to the area of the lower surface of the controller 830.

Since the extension region 808 and the third region 803 are connected to the first side portion 85A of the second board unit 800, the area occupied by the camera device 10 in a direction perpendicular to the optical axis may be reduced. Accordingly, the embodiment may minimize increase in the size of the camera device 10 due to the extension region 808.

In another embodiment, the extension region may be connected to any one of the second to fourth side portions 85B, 85C, and 85D of the first region 801 of the second board unit 800, or may protrude from any one of the second to fourth side portions 85B, 85C, and 85D of the first region 801.

The controller 830 may be located on the outer side of the cover member 300, or may be located outside the cover member 300. In an example, the controller 830 may be located outside the space defined by the cover member 300, the base 210, and the first region 801 of the second board unit 800.

In an example, the controller 830 does not overlap the lens module 400, the AF moving unit, the OIS moving unit, or the first region 801 of the second board unit 255 in the optical-axis direction. At least one capacitor 514 may be disposed or mounted on the upper surface of the extension region 808.

In a sensor shift camera device in which an image sensor moves in order to implement hand-tremor compensation, an OIS moving unit, which includes the image sensor and a first board unit, is disposed so as to be spaced apart from a fixed unit, which includes a second board unit. Therefore, the heat generated from the OIS moving unit may not be effectively dissipated outside through the fixed unit. The image sensor, a second coil, and a controller may correspond to heat sources. Here, the controller may be a driver IC, which controls AF operation and/or OIS operation.

As the image sensor and the lens increase in size, the stroke (or the moving distance) of the OIS moving unit for compensating for a hand-tremor compensation angle (e.g. 1 degree) may increase, the amount of current consumed by the second coil for implementing OIS operation may increase, and the communication speed of the controller may increase. Therefore, the amount of heat generated from the heat sources may increase, and the temperature of the camera device may rise.

In the case in which all of the image sensor, the second coil, and the controller, which are the heat sources, are disposed in the OIS moving unit (hereinafter referred to as "CASE 1"), the temperature of the camera device may increase due to the above-described poor heat dissipation structure of the sensor shift camera device.

The increase in the temperature of the camera device may cause demagnetization of AF and OIS driving magnets and/or sensing magnets, leading to errors in AF operation and OIS operation. In addition, the increase in the temperature of the camera device may cause changes in output signals from an AF position sensor and an OIS position sensor. Therefore, the accuracy and reliability of AF operation and OIS operation may be deteriorated.

In addition, the increase in the temperature of the controller may cause increase in the temperature of the image sensor, leading to loss of images of the image sensor and deterioration in the quantitative and qualitative quality of images.

In the case in which a member made of shape memory alloy is used for hand-tremor compensation, the driving temperature of the shape-memory-alloy member is about 100 to 110 degrees Celsius, but the temperature of the controller may rise to 160 to 180 degrees Celsius when the controller is driven. The temperature of the shape-memory-alloy member may exceed the driving temperature range thereof due to the increase in the temperature of the controller. Therefore, it may be difficult to control driving of the shape-memory-alloy member. In addition, when the temperature of the shape-memory-alloy member increases, the resistance of the shape-memory-alloy member may decrease, and thus the amount of current flowing through the shape-memory-alloy member may increase, leading to damage to the shape-memory-alloy member. Further, when the temperature of the shape-memory-alloy member increases, the length of the shape-memory-alloy member may be reduced, and thus the stroke of the OIS moving unit may be reduced.

In the embodiment, the image sensor 810 and the second coil 230 are disposed in the OIS moving unit, which is located inside the cover member 300, and the controller 830 is disposed in the extension region 808 of the second board unit 800, which does not overlap the image sensor 810 in the optical-axis direction. Accordingly, the controller 830, which is the heat source, may be separated or isolated from the image sensor 810, with the cover member 300 and/or the base 210 interposed therebetween, and may be disposed far away from the image sensor 810.

Since the controller 830, which is the heat source, is disposed outside the cover member 300 and the base 210, the heat generated therefrom may be easily dissipated. In addition, since the controller 830, which is the heat source, is isolated or separated from the image sensor 810 by the cover member 300 and the base 210, the influence of the heat generated from the controller 830 on the image sensor 810 may be greatly reduced.

According to simulation results, the temperature of the image sensor in CASE 1 rises to about 100 to 120 degrees Celsius, whereas the temperature of the image sensor 810 of the camera device 10 according to the embodiment is about 65 to 80 degrees Celsius. The embodiment may reduce the temperature of the image sensor 810 by 20 to 55 degrees Celsius compared to CASE 1.

The camera device 10 may include a third heat dissipation member 870, which is disposed in, coupled to, or attached to the extension region 808 in order to improve the heat dissipation effect. The third heat dissipation member 870 may be in contact with the extension region 808. In an example, the third heat dissipation member 870 may be disposed under the extension region 808. In an example, the third heat dissipation member 870 may be disposed on, coupled to, or secured to the lower surface of the extension region 808. The third heat dissipation member 870 may be a plate-type member, and the description of the material of the first heat dissipation member 280 may also be applied to the third heat dissipation member 870. At least a portion of the third heat dissipation member 870 may overlap the controller 830 in the optical-axis direction.

The camera device 10 may include a cover can 405, which is disposed in the extension region 808 and accommodates the controller 830 therein in order to protect the controller 830 from external impact. The cover can 405 may include an upper plate 405A and a side plate 405B connected to the upper plate 405A and extending from the upper plate 405A toward the extension region 808.

The cover can 405 may be disposed in, coupled to, or secured to the upper surface of the extension region 808. In an example, the lower portion, the lower end, or the lower surface of the side plate 405B of the cover can 405 may be coupled, attached, or secured to the upper surface of the extension region 808.

Since the cover can 405 accommodates the controller 830 therein, the cover can 405 may inhibit the heat generated from the controller 830 from being emitted to the outside of the cover can 405 and transferred to the image sensor. The description of the material of the first heat dissipation member 280 or the material of the cover member 300 may also be applied to the cover can 405.

The camera device 10 may further include a heat dissipation layer 860, which is disposed on the controller 830. The heat dissipation layer 860 may cover the surface of the controller 830. In an example, the heat dissipation layer 860 may be disposed so as to envelop the surface of the controller 830. In an example, the heat dissipation layer 860 may be in contact with the upper surface and the side surface of the controller 830, and may envelop the same. The heat dissipation layer 860 may be formed of thermally conductive plastic or thermally conductive resin, for example thermally conductive epoxy. The heat dissipation layer 860 may improve the heat dissipation efficiency of the controller 830.

In another embodiment, the heat dissipation layer may be disposed on at least one of the upper surface or the side surface of the controller 830. In an example, the heat dissipation layer may expose at least a portion of the controller 830.

The controller 830 may be conductively connected to the second position sensor 240. The controller 830 may adjust or control a driving signal that is supplied to the second coil 230 using the output signals received from the sensors 240A, 240B, and 240C of the second position sensor 240 and the first data value stored in the memory 512, and may perform feedback OIS operation.

In addition, the controller 830 may be conductively connected to the first position sensor 170. For example, when the first position sensor 170 is embodied as a Hall sensor alone, the first position sensor 170 may be conductively connected to the controller 830. In this case, the controller 830 may control a driving signal that is supplied to the first coil 120 using the output signal from the first position sensor 170 and the second data value stored in the memory 512, and may perform feedback auto-focusing operation.

The controller 830 may be embodied in the form of a driver IC, but the disclosure is not limited thereto. In an example, the controller 830 may be conductively connected to the terminals 800B of the second board unit 800.

The controller 830 may control the first position sensor, which is embodied as a Hall sensor alone, and/or the second position sensor, which is embodied as a Hall sensor alone. In an example, the controller 830 may supply a driving signal to the first position sensor, which is embodied as a Hall sensor alone, and/or the second position sensor, which is embodied as a Hall sensor alone, and may receive an output signal from the first position sensor and/or an output signal from the second position sensor.

In another embodiment, the first position sensor may be embodied as a Hall sensor alone, and the second position sensor may be embodied in the form of a driver IC including a Hall sensor. In this case, the controller 830 may be conductively connected to the first position sensor, may supply a driving signal to the first position sensor, and may receive an output signal from the first position sensor.

In an example, the controller 830 may include a driver for driving at least one of the first position sensor or the second position sensor.

The image sensor unit 350 may further include a motion sensor (not shown), which is disposed on any one of the first board unit 255 and the second board unit 800. The motion sensor may be conductively connected to the controller 830. The motion sensor may output rotational angular speed information regarding the movement of the camera device 10. The motion sensor may be embodied as, for example, a two-axis or three-axis gyro sensor or an angular speed sensor. In an example, the motion sensor may output information about the movement amount in the x-axis direction, the movement amount in the y-axis direction, and the rotation amount in response to movement of the camera device 10.

In another embodiment, the motion sensor may be omitted from the camera device 10. In the case in which the motion sensor is omitted from the camera device, the camera device 10 may receive position information from a motion sensor provided in the optical instrument 200A in response to movement of the camera device 10.

The image sensor unit 350 may further include a filter 610, which is disposed between the lens module 400 and the image sensor 810. In addition, the image sensor unit 350 may further include a filter holder 600, in which the filter is disposed, seated, or accommodated. The filter holder 600 may alternatively be referred to as a "sensor base."

The filter 610 may serve to block or allow introduction of light within a specific frequency band, among the light that has passed through the lens barrel 400, into the image sensor 810. The filter 610 may be, for example, an infrared cut filter. In an example, the filter 610 may be disposed parallel to the xy-plane, which is perpendicular to the optical axis OA. The filter 610 may be disposed below the lens module 400.

The filter holder 600 may be disposed below the AF driving unit 100. In an example, the filter holder 600 may be disposed on the first board unit 255. In an example, the filter holder 600 may be disposed on the upper surface of the second circuit board 260 of the first board unit 255.

The filter holder 600 may be coupled to one region of the second circuit board 260 around the image sensor 810 by means of an adhesive, and may be exposed through the bore 250A in the first circuit board 250. In an example, the bore 250A in the first circuit board 250 may expose the filter holder 600 disposed on the second circuit board 260 and the filter 610 disposed on the filter holder 600. The filter holder 600 may have a bore 61A formed in a portion thereof, on which the filter 610 is mounted or disposed, in order to allow the light passing through the filter 610 to be introduced into the image sensor 810. The bore 61A in the filter holder 600 may be a through-hole formed through the filter holder 600 in the optical-axis direction. In an example, the bore 61A in the filter holder 600 may be formed through the center of the filter holder 600, and may be disposed so as to correspond to or face the image sensor 810.

The filter holder 600 may include a seating portion 500, which is depressed in the upper surface thereof to allow the filter 610 to be seated therein. The filter 610 may be disposed, seated, or mounted in the seating portion 500. The seating portion 500 may be formed so as to surround the bore 61A. In another embodiment, the seating portion of the filter holder may take the form of a protruding portion protruding from the upper surface of the filter.

The image sensor unit 350 may further include an adhesive disposed between the filter 610 and the seating portion 500, and the filter 610 may be coupled or attached to the filter holder 600 by means of the adhesive.

In another embodiment, the filter holder may be coupled to the holder 270, or may be coupled to the AF driving unit 100.

Referring to FIG. 3, the cover member 300 may take the form of a box that has an open lower portion and includes an upper plate 301 and a side plate 302. The lower portion of the side plate 302 of the cover member 300 may be coupled to the base 210. The shape of the upper plate 301 of the cover member 300 may be a polygonal shape, for example, a quadrangular shape or an octagonal shape. The cover member 300 may have a bore 303 formed in the upper plate 301 thereof to expose the lens of the lens module 400 coupled to the bobbin 110 to external light.

Referring to FIGS. 1 and 3, the side plate 302 of the cover member 300 may have a recessed portion 304 formed therein to expose the terminal 95 of the circuit board 190 and the terminal 800B of the second board unit corresponding thereto.

In an example, the cover member 300 may be formed of a metal material. For example, the cover member 300 may be formed of steel use stainless (SUS) (e.g. an SUS-4-based material). In addition, the cover member 300 may be formed of a steel plate cold commercial (SPC). For example, the cover member 300 may be formed of SUS containing an iron (Fe) component in an amount of 50 percent (%) or more. In addition, in an example, an oxidation-resistant metal, for example nickel, may be plated on the surface of the cover member 300 in order to inhibit oxidation. In addition, in another embodiment, the cover member 300 may be formed of a magnetic material or a magnetic metal material.

In still another embodiment, the cover member 300 may be formed of an injection-molded material, for example, plastic or a resin material. In addition, the cover member 300 may be made of an insulating material or a material capable of blocking electromagnetic waves.

The cover member 300 and the base 210 may accommodate the AF driving unit 100 and the OIS moving unit, may protect the AF driving unit 100 and the OIS moving unit from external impact, and may inhibit introduction of external foreign substances thereinto.

In an example, when the OIS moving unit is located at the initial position thereof, the outer side surface of the holder 270 may be spaced apart from the inner side surface of the base 210 by a predetermined distance. In addition, in an example, when the OIS moving unit is located at the initial position thereof, the lower surfaces of the holder 270 and the first board unit 255 may be spaced apart from the base 210 by a predetermined distance.

The controller 830 may supply at least one driving signal to at least one of the first to fourth coil units 230-1 to 230-4, and may control the at least one driving signal to move the OIS moving unit in the x-axis direction and/or the y-axis direction or to rotate, tilt, or roll the OIS moving unit within a predetermined angular range about the optical axis.

Figure 21:
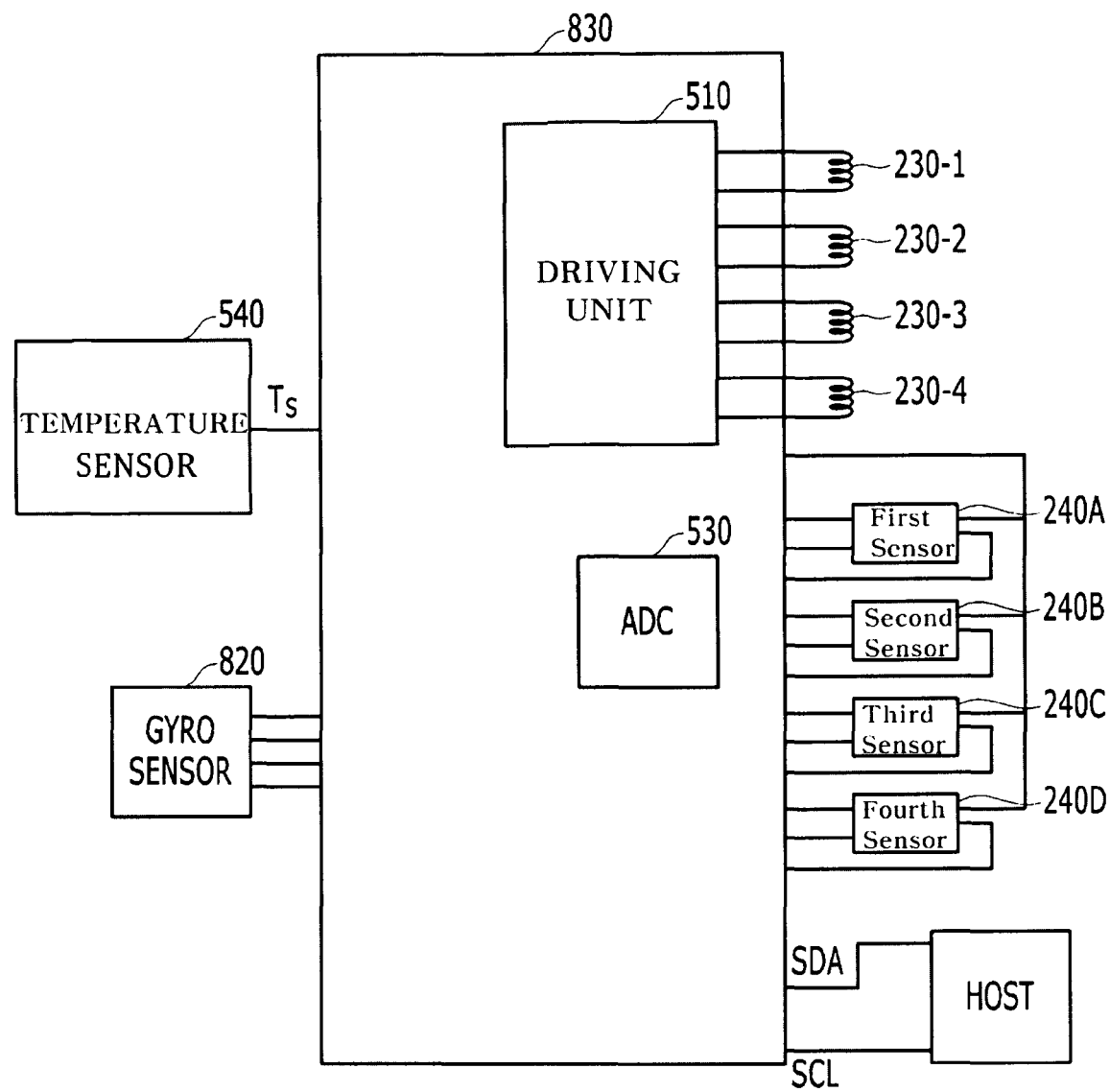
FIG. 21 is a block diagram showing the configuration of the controller and first to third sensors.

FIG. 21 is a block diagram showing the configuration of the controller 830 and the first to third sensors 240A, 240B, and 240C. The controller 830 may perform communication, for example I2C communication, of transmitting and receiving data to and from a host using a clock signal SCL and a data signal SDA. In an example, the host may be the controller 780 of the optical instrument 200A.

The controller 830 may be conductively connected to the second coil 230. The controller 830 may include a driving unit 510 for supplying a driving signal required to drive the first to fourth coil units 230-1 to 230-4. In an example, the driving unit 510 may include an H bridge circuit or an H bridge driver capable of changing the polarity of the driving signal. In this case, the driving signal may be a PWM signal in order to reduce consumption of current, and the driving frequency of the PWM signal may be 20 kHz or more, which is outside of the audible frequency band. In another embodiment, the driving signal may be a DC signal.

Each of the first to third sensors 240A to 240C may include two input terminals and two output terminals. The controller 830 may supply power or a driving signal to two input terminals of each of the first to third sensors 240A to 240C. In an example, any one of the two input terminals of each of the first to third sensors 240A to 240C may be commonly connected. In an example, the two input terminals may be a (+) input terminal and a (−) input terminal (e.g. a ground terminal).

In an example, the controller 830 may receive a first output voltage from the first sensor 240A, a second output voltage from the second sensor 240B, and a third output voltage from the third sensor 240C, and may control movement (or displacement) of the OIS moving unit in the x-axis direction or the y-axis direction using the received first to third output voltages. In addition, the controller 830 may control rotation, tilting, or rolling of the OIS moving unit about the optical axis using the received first to third output voltages.

In addition, the controller 830 may include an analog-to-digital converter 530, which receives output voltage from the two output terminals of each of the first to third sensors 240A to 240C and outputs a data value, a digital value, or a code value corresponding to the result of the analog-to-digital conversion of the received output voltage. The controller 830 may control movement (or displacement) of the OIS moving unit in the x-axis direction or the y-axis direction and rotation, tilting, or rolling of the OIS moving unit about the optical axis using the data values output from the analog-to-digital converter 530.

A temperature sensor 540 may measure the ambient temperature (e.g. the temperature of each of the first to third sensors 240A, 240B, and 240C), and may output a temperature detection signal Ts corresponding to the result of the measurement. The temperature sensor 540 may be, for example, a thermistor.

The resistance value of a resistor included in the temperature sensor 540 may vary depending on changes in the ambient temperature, and accordingly, the value of the temperature detection signal Ts may vary depending on changes in the ambient temperature. An equation or a look-up table relating to the relationship between the ambient temperature and the temperature detection signal Ts may be stored in the memory or the controller 830 or 780 through calibration.

Because the output values from the first to third sensors 240A, 240B, and 240C are also influenced by temperature, it is necessary to compensate for the output values from the first to third sensors 240A, 240B, and 240C according to the ambient temperature in order to accurately and reliably implement OIS feedback operation.

To this end, in an example, the controller 830 or 780 may compensate for the output value (or the data value corresponding to output) from each of the first to third sensors 240A, 240B, and 240C using the ambient temperature measured by the temperature sensor 540 and a temperature compensation algorithm or compensation equation. The temperature compensation algorithm or compensation equation may be stored in the controller 830 or 780 or the memory.

The camera device may further include a fourth sensor 240D, which corresponds to or faces the fourth magnet unit 130-4 in the optical-axis direction. The fourth sensor 240D may be disposed on the first board unit 255 (e.g. the first circuit board 250). In an example, the fourth sensor 240D may be disposed adjacent to any one corner of the first circuit board 250, on which the first to third sensors 240A to 240C are not disposed. The description of the disposition relationship between the first sensor 240A and the first coil unit 230-1 may also be applied to the disposition relationship between the fourth sensor 240D and the fourth coil unit 230-4.

In an example, the fourth sensor 240D may be located so as to face the second sensor 240B in an oblique direction. In an example, the output voltage from the fourth sensor 240D may be used to detect movement of the OIS moving unit in the x-axis direction or the y-axis direction. In another embodiment, the fourth sensor 240D may correspond to the first position sensor 170 of the AF driving unit 100.

The controller 830 may be conductively connected to the second coil 230 and the second position sensor 240 via the second board unit 800, the support board 310, and the first board unit 255.

In another embodiment, the controller 830 may be disposed on the first board unit 255. In another embodiment, the controller 830 may be disposed on the first circuit board 250.

Figure 22:
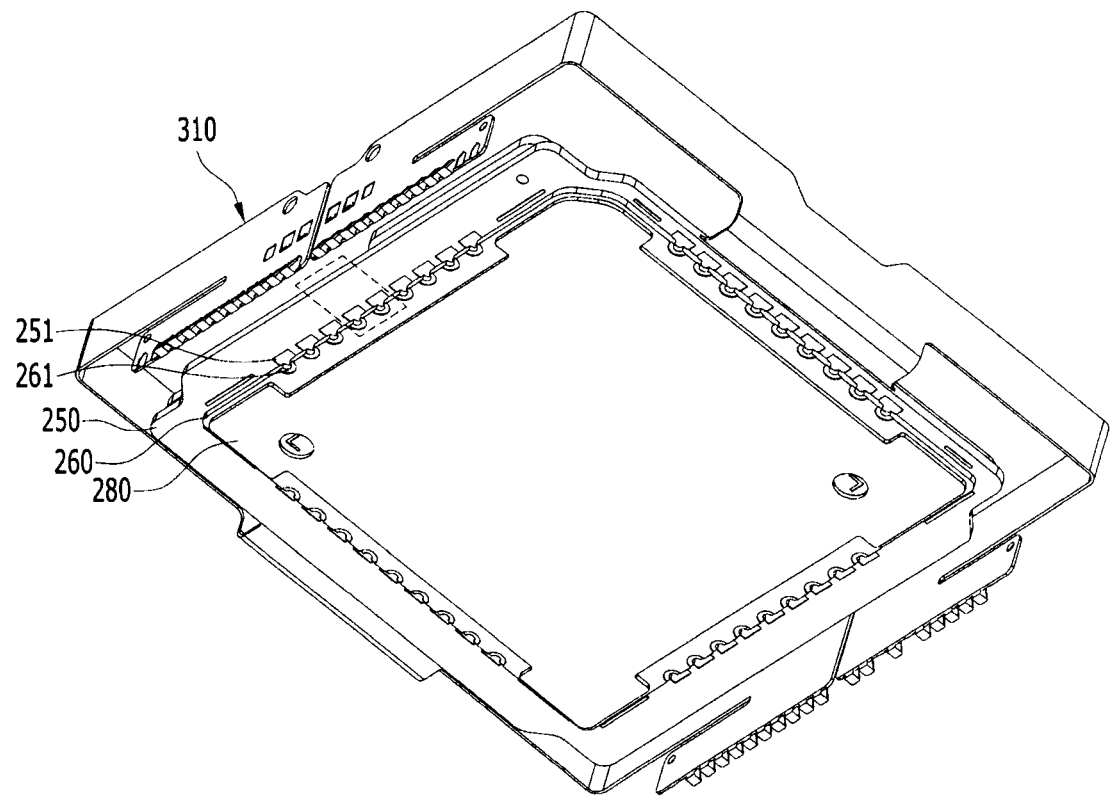
FIG. 22 is a bottom perspective view of the first circuit board and the second circuit board of the first board unit and the support board.
Figure 23:
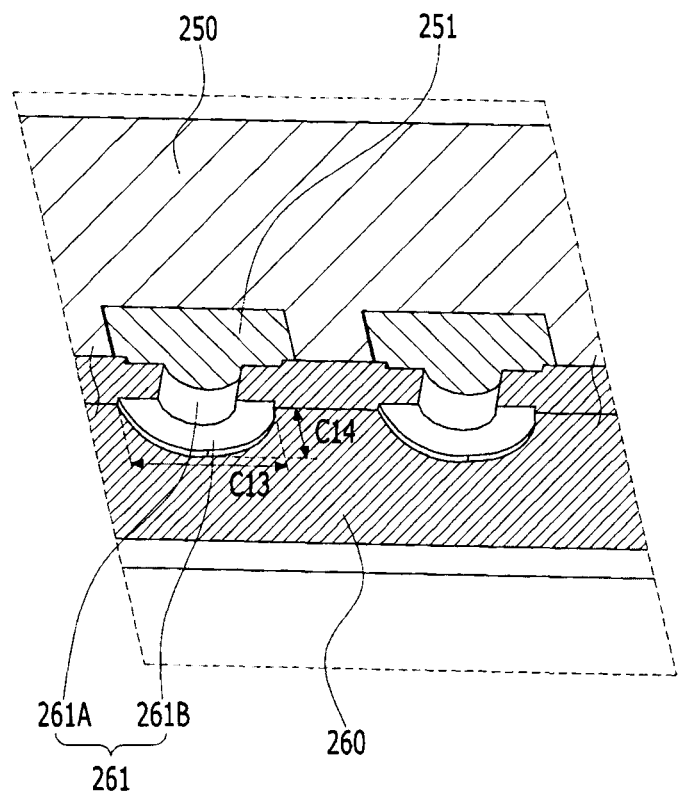
FIG. 23 is an enlarged view of the dotted line portion in FIG. 22.
Figure 24:
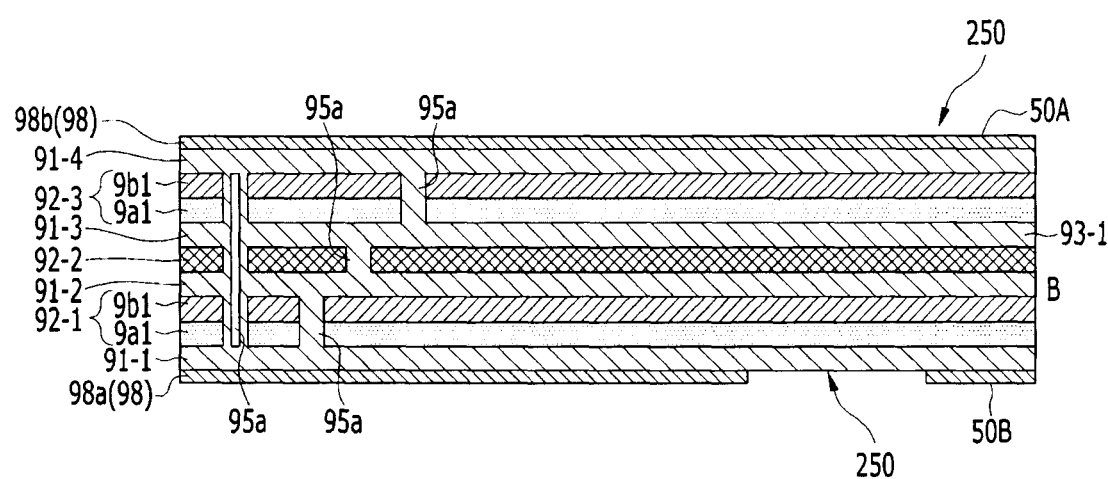
FIG. 24 is a cross-sectional view showing a stacking structure according to an embodiment of the first circuit board.
Figure 25A:
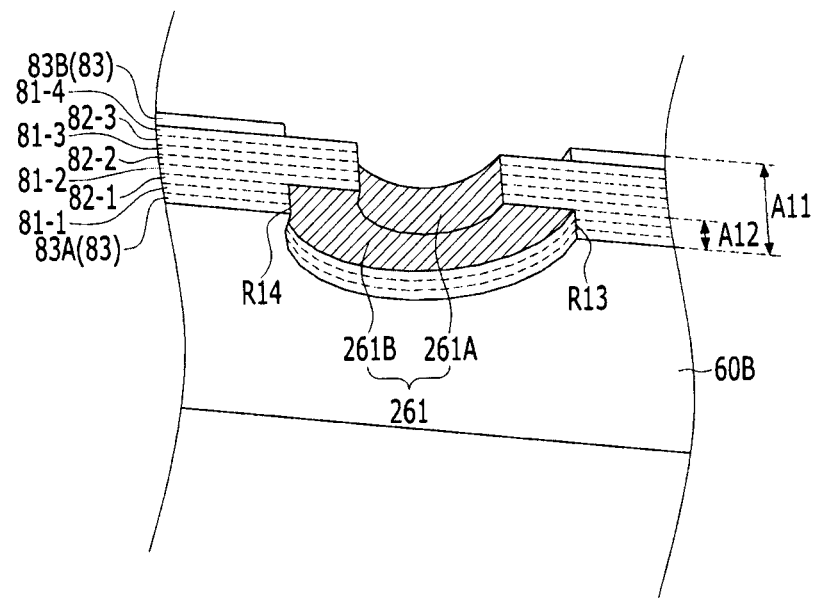
FIG. 25A is an enlarged view of the terminal of the second circuit board when viewed from below.
Figure 25B:
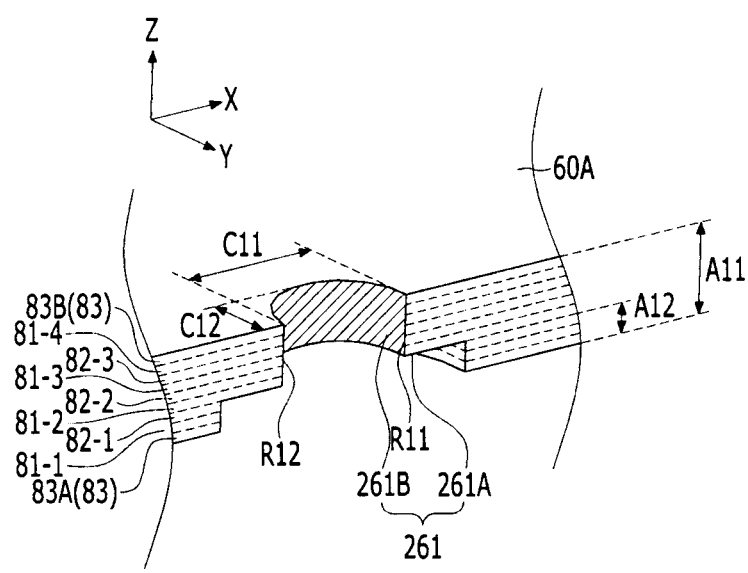
FIG. 25B is an enlarged view of the terminal of the second circuit board in FIG. 25A when viewed from above.
Figure 26A:
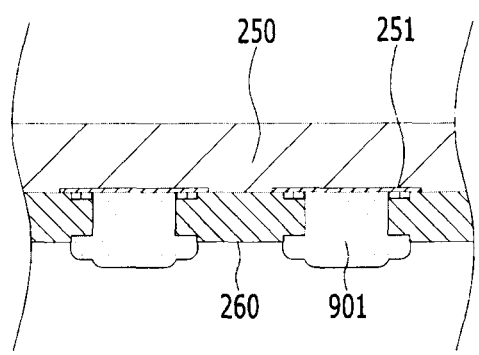
FIG. 26A is a cross-sectional view of the terminal of the first circuit board, the terminal of the second circuit board, and a solder, taken along line AB.
Figure 26B:
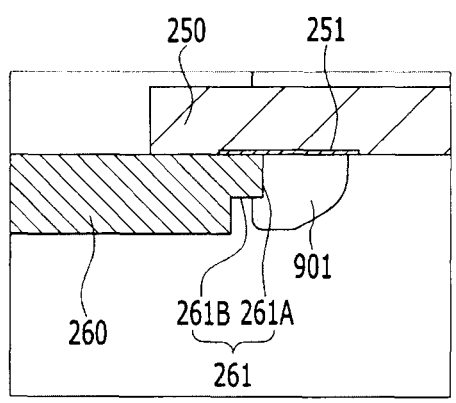
FIG. 26B is a cross-sectional view of the terminal of the first circuit board, the terminal of the second circuit board, and the solder, taken along line CD.
Figure 27A:
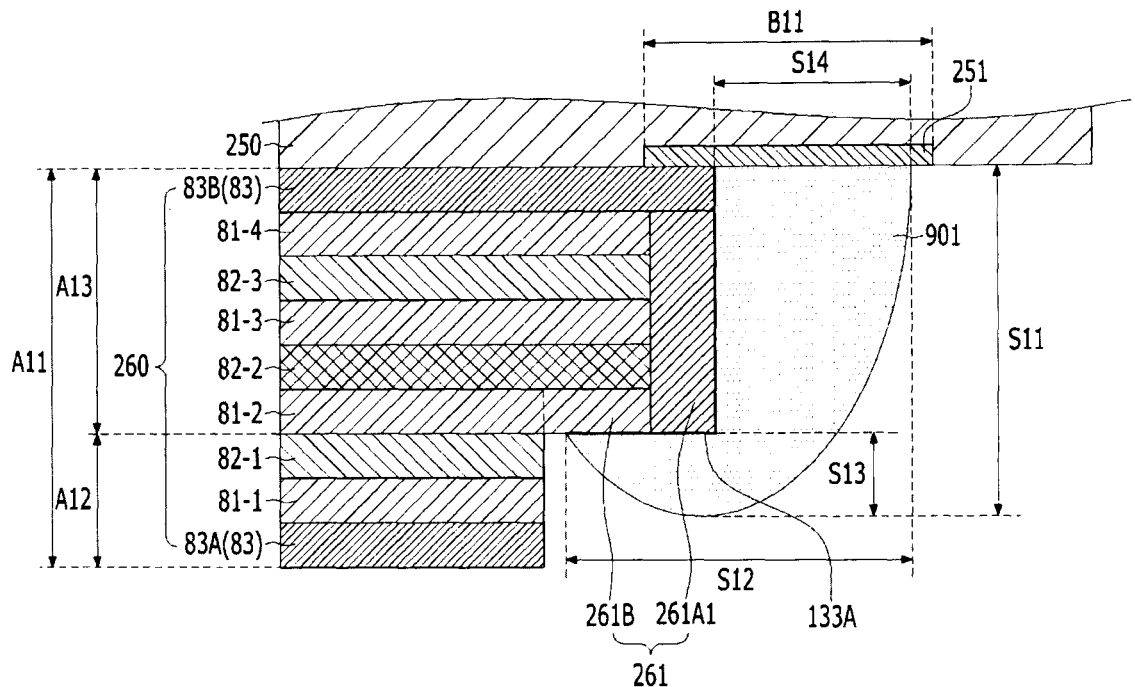
FIG. 27A is a schematic cross-sectional view of the terminal of the second circuit board, the terminal of the first circuit board, and the solder shown in FIGS. 25A and 25B.

FIG. 22 is a bottom perspective view of the first circuit board 250 and the second circuit board 260 of the first board unit 255 and the support board 310, FIG. 23 is an enlarged view of the dotted line portion in FIG. 22, FIG. 24 is a cross-sectional view showing a stacking structure according to an embodiment of the first circuit board 250, FIG. 25A is an enlarged view of the terminal 261 of the second circuit board 260 when viewed from below, FIG. 25B is an enlarged view of the terminal 261 of the second circuit board 260 in FIG. 25A when viewed from above, FIG. 26A is a cross-sectional view of the terminal 251 of the first circuit board 250, the terminal 261 of the second circuit board 260, and the solder 901, taken along line AB, FIG. 26B is a cross-sectional view of the terminal 251 of the first circuit board 250, the terminal 261 of the second circuit board 260, and the solder 901, taken along line CD, and FIG. 27A is a schematic cross-sectional view of the terminal 261 of the second circuit board 260, the terminal of the first circuit board 250, and the solder 901 shown in FIGS. 25A and 25B.

Referring to FIGS. 22 to 27A, the first circuit board 250 may include a rigid substrate.

Referring to FIG. 24, in an example, the first circuit board 250 may include a plurality of conductive layers 91-1 to 91-m (where "m" is a natural number greater than 1 (m>1)). Although FIG. 24 illustrates four conductive layers 91-1 to 91-4, which are sequentially stacked one above another, the disclosure is not limited thereto, and the number of conductive layers may be two or more. Each of the conductive layers may be a copper foil, a wiring, or a conductive pattern layer for transmitting an electrical signal. For example, the conductive layers 91-1 to 91-4 may be formed of a conductive metal, such as copper, aluminum, gold, or silver, or may be formed of an alloy containing at least one of copper, aluminum, gold, or silver. In an example, each of the conductive layers 91-1 to 91-4 may be formed to include at least one of a pattern layer, a wiring, or a terminal (or a pad).

In addition, in an example, the first circuit board 250 may include insulating layers 92-1 to 92-3, which are disposed between the plurality of conductive layers 91-1 to 91-4. The insulating layers 92-1 to 92-3 are provided for the purpose of electrical insulation between the conductive layers 91-1 to 91-4, thereby inhibiting an electrical short between the conductive layers 91-1 to 91-4.

Although FIG. 24 illustrates three insulating layers disposed between the conductive layers, the disclosure is not limited thereto, and the number of insulating layers may be determined according to the number of conductive layers. The number of insulating layers may be one or more. The insulating layer may alternatively be referred to as an "insulating membrane" or an "insulating film."

The first circuit board 250 may include at least one of a rigid insulating layer, which is made of a rigid material, or a flexible insulating layer, which is made of a flexible material. In this case, the flexible insulating layer may be flexibly bendable, and the rigid insulating layer may have greater strength or hardness than the flexible insulating layer.

In an example, the flexible insulating layer may include a flexible resin, for example polyimide. In an example, the rigid insulating layer may include a rigid resin, for example prepreg. In an example, the rigid insulating layer may include at least one of prepreg or coverlay. In an example, the coverlay may include a resin. In an example, the coverlay may include a resin and an adhesive. The resin may be, for example, polyimide. In an example, the coverlay may be of a film or sheet type.

In an example, at least one of the plurality of insulating layers 92-1 to 92-3 of the first circuit board 250 may be a rigid insulating layer, and at least one of the plurality of insulating layers 92-1 to 92-3 may be a flexible insulating layer.

In an example, the first circuit board 250 may include a first insulating layer 92-1 disposed between the first conductive layer 91-1 and the second conductive layer 91-2, a second insulating layer 92-2 disposed between the second conductive layer 91-2 and the third conductive layer 91-3, and a third insulating layer 92-3 disposed between the third conductive layer 91-3 and the fourth conductive layer 91-4.

In an example, each of the first insulating layer 92-1 and the third insulating layer 92-3 may be a rigid insulating layer. In an example, each of the first insulating layer 92-1 and the third insulating layer 92-3 may include prepreg 9a1. Alternatively, in another example, each of the first insulating layer 92-1 and the third insulating layer 92-3 may include prepreg 9a1 and coverlay 9b1.

In addition, the second insulating layer 92-2 may be a flexible insulating layer. In an example, the second insulating layer 92-2 may include polyimide.

The first circuit board 250 may include cover layers 98, which are disposed on the outermost conductive layers (e.g. 91-1 and 91-4) in order to protect the conductive layers 91-1 to 91-4 from external impact. In an example, the cover layers 98 may include a first cover layer 98a, which is disposed under the first conductive layer 91-1, which is the lowermost conductive layer, and a second cover layer 98b, which is disposed on the fourth conductive layer 91-4, which is the uppermost conductive layer.

Each of the cover layers 98 may be an insulating material, such as solder resist (SR). Each of the cover layers 98 may be, for example, photo solder resist (PSR) or dry-film-type solder resist (DFSR).

The terminal 251 may be formed on the second surface 50B of the first circuit board 250. In an example, the conductive layer 91-1 of the first circuit board 250 may include a portion or a region that is open or exposed from the cover layer 98. In this case, the portion that is open or exposed from the cover layer 98 may be formed as the terminal 251. In an example, the conductive layer 91-1 may include the terminal 251.

Figure 27B:
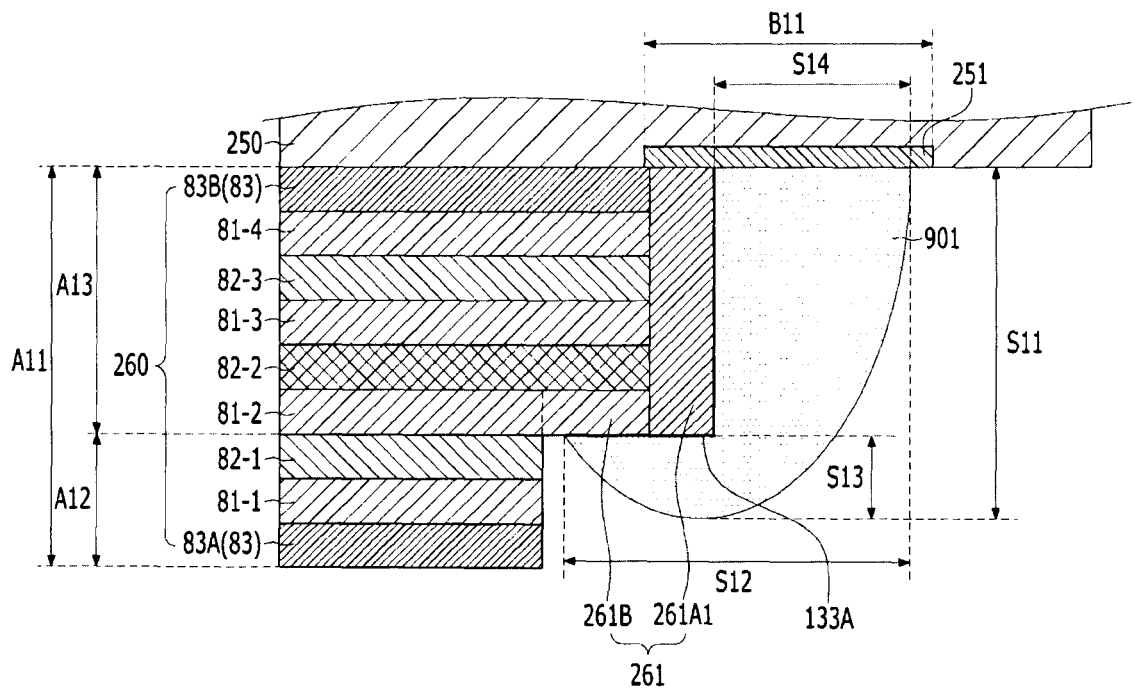
FIG. 27B shows a modified example of the configuration shown in FIG. 27A.

Referring to FIGS. 25A to 27B, the second circuit board 260 may include a rigid substrate. In an example, the second circuit board 260 may include a plurality of conductive layers 81-1 to 81-$m$ (where "m" is a natural number greater than 1 (m>1)). Although FIGS. 27A and 27B illustrate four conductive layers 81-1 to 81-4, which are sequentially stacked one above another, the disclosure is not limited thereto, and the number of conductive layers may be two or more. Each of the conductive layers may be a copper foil, a wiring, or a conductive pattern layer for transmitting an electrical signal.

For example, the conductive layers 81-1 to 81-4 may be formed of a conductive metal, such as copper, aluminum, gold, or silver, or may be formed of an alloy containing at least one of copper, aluminum, gold, or silver. In an example, each of the conductive layers 81-1 to 81-4 may be formed to include at least one of a pattern layer, a wiring, or a terminal (or a pad).

In addition, the second circuit board 260 may include a plurality of insulating layers 83 and 82-1 to 82-3.

In an example, the second circuit board 260 may include insulating layers 82-1 to 82-3, which are disposed between the plurality of conductive layers 81-1 to 81-4. The insulating layers 82-1 to 82-3 are provided for the purpose of electrical insulation between the conductive layers 81-1 to 81-4, thereby inhibiting an electrical short between the conductive layers 81-1 to 81-4.

Although FIGS. 27A and 27B illustrate three insulating layers disposed between the conductive layers 81-1 to 81-4, the disclosure is not limited thereto, and the number of insulating layers may be determined according to the number of conductive layers. The number of insulating layers may be one or more. The insulating layer may alternatively be referred to as an "insulating membrane" or an "insulating film."

In an example, the second circuit board 260 may include at least one of a rigid insulating layer, which is made of a rigid material, or a flexible insulating layer, which is made of a flexible material. The description of the rigid insulating layer and the flexible insulating layer of the first circuit board may also be applied to the second circuit board 260.

In an example, at least one of the plurality of insulating layers 82-1 to 82-3 of the second circuit board 260 may be a rigid insulating layer, and at least one of the plurality of insulating layers 82-1 to 82-3 may be a flexible insulating layer.

In an example, the second circuit board 260 may include a first insulating layer 82-1 disposed between the first conductive layer 81-1 and the second conductive layer 81-2, a second insulating layer 82-2 disposed between the second conductive layer 81-2 and the third conductive layer 81-3, and a third insulating layer 82-3 disposed between the third conductive layer 81-3 and the fourth conductive layer 81-4.

In an example, each of the first insulating layer 82-1 and the third insulating layer 82-3 may be a rigid insulating layer. In an example, each of the first insulating layer 82-1 and the third insulating layer 82-3 may include prepreg.

Alternatively, in another example, each of the first insulating layer 82-1 and the third insulating layer may include prepreg 9al and coverlay.

In addition, the second insulating layer 82-2 may be a flexible insulating layer. In an example, the second insulating layer 82-2 may include polyimide.

The second circuit board 260 may include insulating layers 83, which are disposed on the outermost conductive layers (e.g. 81-1 and 81-4) in order to protect the conductive layers 81-1 to 81-4 from external impact. In this case, each of the insulating layers 83 may be referred to as a "cover layer," and reference numeral 83 denotes the cover layer.

In an example, the cover layers 83 may include a first cover layer 83A, which is disposed under the first conductive layer 81-1, which is the lowermost conductive layer, and a second cover layer 83B, which is disposed on the fourth conductive layer 81-4, which is the uppermost conductive layer.

Each of the cover layers 83 may be an insulating material, such as solder resist (SR). Each of the cover layers 83 may be, for example, photo solder resist (PSR) or dry-film-type solder resist (DFSR).

Referring to FIGS. 25A and 25B, the side surface of the second circuit board 260 between the upper surface and the lower surface thereof may be insulated by the insulating layer, for example the cover layer 83. In FIGS. 25A and 25B, the conductive layers 81-1 to 81-4 and the insulating layers 82-1 to 82-3 are indicated by dotted lines so that the conductive layers 81-1 to 81-4 and the insulating layers 82-1 to 82-3 are easily distinguished from each other. In an example, the insulating layers (e.g. the cover layers) 83 may be disposed or formed on the outer surfaces of the outermost layers among the conductive layers 81-1 to 81-4 and the insulating layers 82-1 to 82-3.

In an example, the lowermost layer of the second circuit board 260 may be the first insulating layer, for example the first cover layer 83A, and the first conductive layer 81-1 may be disposed on the first insulating layer (e.g. the first cover layer 83A).

Referring to FIG. 27A, the second circuit board 260 may include a first region 133A (or a first portion) coupled to the first circuit board 250 by means of the solder 901. In an example, the first region 133A (or the first portion) of the second circuit board 260 may be a region that is in contact with or attached to the solder 901.

The first region 133A (or the first portion) of the second circuit board 260 may be located higher than the first conductive layer 81-1. In an example, the lower surface of the first region 133A (or the first portion) of the second circuit board 260 may be located higher than the first conductive layer 81-1.

In addition, in an example, the first region 133A (or the first portion) of the second circuit board 260 may be located higher than the lower surface of the first insulating layer 82-1. In an example, the lowermost surface or the lower end of the solder 901 may be disposed higher than the lowermost surface (or the lower end) of the first insulating layer (e.g. the first cover layer 83A). In an example, the first region 133A of the second circuit board 260 may be a region in which the first conductive layer 81-1 is not disposed.

In an example, an end of the first conductive layer 81-1 may be spaced apart from the solder 901. In addition, in an example, an end of the first insulating layer 82-1 may be spaced apart from the solder 901.

In an example, an end of a portion of the first conductive layer 81-1 may be disposed at a further inward position than ends of the other conductive layers 81-2 to 81-4.

In an example, the first conductive layer 81-1 may be spaced apart from the first region 133A. In addition, in an example, the first conductive layer 81-1 may be spaced apart from the solder 901.

In an example, the first region 133A of the second circuit board 260 may include an edge of the second circuit board 260. In an example, the first region 133A of the second circuit board 260 may correspond to a portion of the edge of the second circuit board 260.

The second circuit board 260 shown in FIG. 27A may include one conductive layer 81-1, which is located lower than the first region 133A and higher than the first insulating layer 83A.

In another embodiment, at least one of the plurality of conductive layers 81-1 to 81-4 may be disposed lower than the second terminal 261, and may be spaced apart from the solder 901.

In an example, the second circuit board 260 may include two or more conductive layers, which are located lower than the first region 133A and higher than the first insulating layer 83A and are stacked in the optical-axis direction, and the two or more conductive layers may be spaced apart from the solder 901.

In an example, the second circuit board 260 may include two or three conductive layers, which are located lower than the first region 133A and higher than the first insulating layer 83A, and the two or three conductive layers may be spaced apart from the solder 901.

The second circuit board 260 may include a terminal 261, and the first region 133A may be the terminal 261 of the second circuit board 260. Alternatively, in another example, the terminal 261 of the second circuit board 260 may include the first region 133A.

In an example, the terminal 261 may be conductively connected to at least one of the plurality of conductive layers 81-1 to 81-4 of the second circuit board 260. In an example, the terminal 261 may include a conductive member (e.g. a plated layer or a metal layer), which is formed on the side surface of the second circuit board 260 so as to be connected to at least one of the plurality of conductive layers 81-1 to 81-4.

The terminal 261 may include a first pad 261B (or a first portion). In an example, the first pad 261B may be perpendicular to the optical-axis direction. In an example, the upper surface (or the lower surface) of the first pad 261B may be perpendicular to the optical-axis direction.

In an example, the first pad 261B may include a portion that does not overlap the terminal 251 of the first circuit board 250 in the optical-axis direction. In addition, in an example, the first pad 261B may include a portion that overlaps the terminal 251 of the first circuit board 250 in the optical-axis direction.

The solder 901 may be disposed on the portion of the first pad 261B of the first terminal 261 of the second circuit board 260 that does not overlap the terminal 251 of the first circuit board 250 in the optical-axis direction. In an example, the solder 901 may be in contact with or coupled to the portion of the first pad 261B that does not overlap the terminal 251 of the first circuit board 250 in the optical-axis direction. Alternatively, the solder 901 may be disposed on the portion of the first pad 261B that overlaps the terminal 251 of the first circuit board 250 in the optical-axis direction.

The first pad 261B may be located higher than the lowermost conductive layer (e.g. 81-1) of the second circuit board 260. In an example, the first pad 261B may be formed on a conductive layer (e.g. 81-2) disposed on the lowermost conductive layer (e.g. 81-1). In an example, the first pad 261B may be formed on a conductive layer (e.g. 81-2) disposed directly on the lowermost conductive layer (e.g. 81-1).

Alternatively, in another example, the first pad 261B may be a portion of a conductive layer (e.g. 81-2) disposed on the lowermost conductive layer (e.g. 81-1). In an example, the first pad 261B may be a layer formed parallel to the lower surface 60B of the second circuit board 260.

In an example, the first pad 261B may be open or exposed from the cover layer (e.g. 83A), the lowermost conductive layer (e.g. 81-1), and the insulating layer 82-1.

A stair may be formed between the lower surface of the first pad 261B and the second surface 60B of the second circuit board 260 in a direction parallel to the optical axis. In an example, the lower surface of the first pad 261B may be located higher than the second surface 60B of the second circuit board 260.

The terminal 261 may include a second pad 261A, which is connected to the first pad 261B. In an example, the second pad 261A may be parallel to the optical-axis direction.

In an example, the first pad 261B may be connected to the lower portion or the lower end of the second pad 261A. In an example, the second pad 261A may be disposed on a third surface (or the side surface) of the second circuit board 260 between the first surface 60A and the second surface 60B thereof.

The second pad 261A may include a portion (e.g. a recess) depressed in the side surface of the second circuit board 260. In an example, the second pad 261A may include a portion that is depressed in the side surface of the second circuit board 260 in a curved surface shape.

Alternatively, in another example, the second pad 261A may be a conductive layer, a plated layer, or a metal layer that is formed on the side surface of the second circuit board 260 in the shape of a semicircular or semi-elliptical via. The reason for this is to increase an area of contact with the solder, thereby improving solderability and ensuring reliable electrical connection.

In an example, the second pad 261A may be located higher than the first conductive layer 81-1 of the second circuit board 260, and may be located lower than the second cover layer 83B.

The second pad 261A may be connected or coupled to one end of at least one of the second to fourth conductive layers 81-2 to 81-4. The second pad 261A may be conductively connected to one end of at least one of the second to fourth conductive layers 81-2 to 81-4.

In an example, the second pad 261A may be a plated layer. The second pad 261A may be made of the same material as the conductive layers 81-1 to 81-4, but the disclosure is not limited thereto. In another embodiment, the second pad 261A may be made of a material different from that of the conductive layers 81-1 to 81-4. For example, the second pad 261A may include a gold-plated layer or a copper-plated layer including gold.

In an example, the second pad 261A may be disposed at a position corresponding to the terminal of the first circuit board 250 in a direction parallel to the optical axis. In addition, in an example, at least a portion of the second pad 261A may overlap at least a portion of the terminal of the first circuit board 250 in a direction parallel to the optical axis.

In an example, the second pad 261A may overlap two or more conductive layers (e.g. 81-2 to 81-4) of the second circuit board 260 in a direction perpendicular to the optical axis. The two or more conductive layers (e.g. 81-2 to 81-4) that overlap the second pad 261A may be conductive layers that are disposed on the lowermost conductive layer (e.g. 81-1).

In an example, the second pad 261A may include a portion that overlaps the terminal 251 of the first circuit board 250 in the optical-axis direction. In addition, in an example, the second pad 261A may include a portion that does not overlap the terminal 251 of the first circuit board 250 in the optical-axis direction.

In an example, the second surface 60B of the second circuit board 260 may include the lower surface of the first cover layer 83A. Alternatively, the second surface 60B may be the lower surface of the first cover layer 83A.

In an example, when the second circuit board 260 is viewed from below, the first pad 261B may include a curve having a shape identical or similar to that of the curve of the via in the second pad 261A. The curvature of the curve of the via in the second pad may be equal to the curvature of the curve of the first pad 261B. In another embodiment, the latter may be larger than the former. In still another embodiment, the latter may be smaller than the former.

In an example, when the second circuit board 260 is viewed from above, the first length C11 (refer to FIG. 25B) of the second pad 261A in the second horizontal direction (e.g. the x-axis direction) may be longer than the second length C12 (refer to FIG. 25B) of the second pad 261A in the first horizontal direction (e.g. the y-axis direction).

For example, "C11" may be 0.35 mm to 0.45 mm. Alternatively, "C11" may be 0.35 mm to 0.4 mm. Alternatively, "C11" may be 0.4 mm to 0.45 mm.

For example, "C12" may be 0.15 mm to 0.25 mm. Alternatively, "C12" may be 0.15 mm to 0.2 mm. Alternatively, "C12" may be 0.2 mm to 0.25 mm.

In an example, the first length C11 may be a distance between a first edge R11, at which one end of the second pad 261A and the side surface of the second circuit board 260 meet, and a second edge R12, at which the other end of the second pad 261A and the side surface of the second circuit board 260 meet.

In addition, in an example, the second length C12 may be a distance from the first edge R11 (or the second edge R12) to the central portion of the second pad 261A. In an example, the central portion of the second pad 261A may be the region of the second pad 261A that is located between the first edge R11 and the second edge R12 and is spaced farthest from the side surface of the second circuit board 250.

Referring to FIGS. 23 and 25A, when the second circuit board 260 is viewed from below, the third length C13 (refer to FIG. 23) of the first pad 261B in the second horizontal direction (e.g. the x-axis direction) may be longer than the fourth length C14 (refer to FIG. 23) of the first pad 261B in the first horizontal direction (e.g. the y-axis direction).

In an example, the third length C13 may be a distance between a third edge R13, at which one end of the first pad 261B and the side surface of the second circuit board 260 meet, and a fourth edge R14, at which the other end of the first pad 261B and the side surface of the second circuit board 260 meet.

In addition, in an example, the fourth length C14 may be a distance from the third edge R13 (or the fourth edge R14) to the central portion of the first pad 261B. In an example, the central portion of the first pad 261B may be the region of the first pad 261B that is located between the third edge R13 and the fourth edge R14 and is spaced farthest from the side surface of the second circuit board 260.

In an example, the third length C13 may be longer than the first length C11. In addition, the fourth length C14 may be longer than the second length C12.

For example, "C13" may be 0.6 mm to 0.7 mm. Alternatively, "C13" may be 0.6 mm to 0.65 mm. Alternatively, "C13" may be 0.65 mm to 0.7 mm.

For example, "C14" may be 0.3 mm to 0.4 mm. Alternatively, "C14" may be 0.3 mm to 0.35 mm. Alternatively, "C14" may be 0.35 mm to 0.4 mm.

In an example, the lower surface of the first pad 261B may be located higher than the upper surface of the lowermost conductive layer 81-1. In an example, the first pad 261B may be located higher than the upper surface of the lowermost conductive layer 81-1.

In addition, in an example, the second pad 261A and the first pad 261B may be located higher than the upper surface of the first insulating layer 81-1.

Referring to FIG. 25B, a second cover layer 83B may be disposed between the second pad 261A and the terminal 251 of the first circuit board 250. In an example, a portion of the second cover layer 83B may be disposed between the second pad 261A and one region of the terminal 251 of the first circuit board 250. In an example, a portion of the second cover layer 83B may be in contact with the second pad 261A and one region of the terminal 251 of the first circuit board 250.

The solder 901 may be disposed on at least one of the first pad 261B or the second pad 261A of the terminal 261 of the second circuit board 260, and may be in contact with, adhered to, or coupled to the at least one of the first pad 261B or the second pad 261A.

In an example, the solder 901 may be in contact with, adhered to, or coupled to the terminal 251 of the first circuit board 250 and the second pad 261A of the terminal 261 of the second circuit board 260. In addition, the solder 901 may be in contact with, adhered to, or coupled to the first pad 261B of the terminal 261 of the second circuit board 260.

Referring to FIGS. 27A and 27B, in an example, the distance from the first surface 60A (the top surface) of the second circuit board 260 to the first pad 261B in the optical-axis direction may be longer than the distance from the second surface 60B (the lower surface) of the second circuit board 260 to the first pad 261B in the optical-axis direction.

In an example, the distance A13 from the first surface 60A (the top surface) of the second circuit board 260 to the lower surface of the first pad 261B in the optical-axis direction may be longer than the distance A12 from the second surface 60B (the lower surface) of the second circuit board 260 to the lower surface of the first pad 261B in the optical-axis direction. In another embodiment, "A12" may be equal to "A13." When "A13" is shorter than "A12," the length of the second pad 261A in the optical-axis direction is too short, which may deteriorate solderability and may cause cracking in the solder.

The thickness A11 of the second circuit board 260 may be 250 micrometers to 400 micrometers. Alternatively, "A11" may be 250 micrometers to 350 micrometers. Alternatively, "A11" may be 250 micrometers to 300 micrometers. In an example, "A11" may be the length of the second circuit board 260 in a direction parallel to the optical axis. Alternatively, in another example, "A11" may be the thickness of the second circuit board 260.

When "A11" is less than 250 micrometers, the thickness of the second circuit board 260 may be too small, and thus a sufficient number of conductive layers may not be stacked in the second circuit board 260, and an area of contact between the solder and the terminal may be too small, leading to deterioration in solderability between the solder and the terminal. When "A11" exceeds 400 micrometers, the thickness of the second circuit board 260 may be too large, and thus the size of the camera device in the vertical direction may increase.

The spacing distance A12 from the lower surface of the second circuit board 260 to the terminal 261 in the optical-axis direction may be 70 micrometers to 120 micrometers. Alternatively, "A12" may be 90 micrometers to 120 micrometers. Alternatively, "A12" may be 90 micrometers to 110 micrometers. In an example, "A12" may be a spacing distance from the lower surface of the first cover layer 83A to the first pad 261B of the terminal 261 in the optical-axis direction.

A value (A11/A12) obtained by dividing the thickness A11 of the second circuit board 260 by the spacing distance A12 from the lower surface of the second circuit board 260 to the terminal 261 may be 2.1 to 5.7. Alternatively, the divided value (A11/A12) may be 2.5 to 5. Alternatively, the divided value (A11/A12) may be 2.5 to 3.

When the divided value (A11/A12) is less than 2.1, "A12" may be too large and "A11" may be too small, and thus the area of the second pad 261A of the terminal 261 may be too small. Therefore, solderability between the solder 901 and the terminal 261 may be deteriorated, the solder 901 may easily crack due to impact, and reliability of electrical connection may be deteriorated.

When the divided value (A11/A12) exceeds 5.7, "A11" may be too large, and thus the spacing distance between the first pad 261B of the terminal 261 of the second circuit board 260 and the terminal 251 of the first circuit board 250 in the optical-axis direction may be too long. Therefore, when soldering is performed, one end of the solder 901 may not be formed on the first pad 261B of the terminal 261 of the second circuit board 260, but may be formed only on the second pad 261A. Accordingly, the solder 901 may easily crack due to impact.

The length B11 of the terminal 251 of the first circuit board 250 in the first horizontal direction (e.g. the y-axis direction) may be 300 micrometers to 700 micrometers. Alternatively, "B11" may be 350 micrometers to 650 micrometers. Alternatively, "B11" may be 400 micrometers to 500 micrometers.

The length B12 of the terminal 251 of the first circuit board 250 in the second horizontal direction (e.g. the x-axis direction) may be 300 micrometers to 700 micrometers. Alternatively, "B12" may be 350 micrometers to 650 micrometers. Alternatively, "B12" may be 400 micrometers to 500 micrometers. In an example, "B11" may be equal to "B12." Alternatively, in another embodiment, "B11" may be longer than "B12." Alternatively, in another embodiment, "B11" may be shorter than "B12."

For example, the thickness S11 of the solder 901 may be 180 micrometers to 400 micrometers. Alternatively, "S11" may be 200 micrometers to 300 micrometers. Alternatively, "S11" may be 225 micrometers to 250 micrometers. In an example, "S11" may be the length of the solder 901 in a direction parallel to the optical axis.

In an example, the thickness S11 of the solder 901 may be smaller than the thickness A11 of the second circuit board 260. When "S11" is less than 180 micrometers, it may not be easy to form the solder 901 on the first pad 261B of the terminal 261. On the other hand, when the thickness S11 of the solder 901 exceeds the thickness A11 of the second circuit board 260, the solder 901 may project from the lower surface of the second circuit board 260, which may cause spatial interference with the first board unit 800 and an electrical short with the first board unit 800.

In an example, the height S13 of the solder 901 projecting from the first pad 261B may be 50 micrometers to 90 micrometers. Alternatively, "S13" may be 70 micrometers to 80 micrometers. Alternatively, "S13" may be 70 micrometers to 75 micrometers.

In an example, the height S13 of the solder 901 projecting from the first pad 261B may be less than the spacing distance A12 from the lower surface 60B of the second circuit board 260 to the first pad 261B in the optical-axis direction. In an example, "S13" may be a height of the solder 901 projecting from the lower surface of the first pad 261B. In addition, in an example, "A12" may be a spacing distance from the lower surface 60B of the second circuit board 260 to the lower surface of the first pad 261B in the optical-axis direction. Alternatively, in another embodiment, "S13" may be equal to "A12."

When "S13" is less than 50 micrometers, the thickness of the solder 901 formed on the first pad 261B is small, and thus it is not possible to exhibit the effect of inhibiting the solder from cracking due to impact. On the other hand, when "S13" exceeds 90 micrometers, the solder 901 may project from the lower surface of the second circuit board 260, which may cause spatial interference with the first board unit 800 and an electrical short with the first board unit 800.

When viewed from below the second circuit board 260, the length S12 of the solder 901 in the first horizontal direction (e.g. the y-axis direction) may be 400 micrometers to 600 micrometers.

In an example, "S12" may be a distance between one end and the other end of the solder 901 aligned with the central region of the second pad 261A. In an example, "S12" may be the length of the solder 901 in the first horizontal direction (e.g. the y-axis direction) in the cross-section of the solder 901 taken along a straight line that passes through the central region of the second pad 261A and is parallel to the first horizontal direction.

The length S14 of the solder 901 projecting from the side surface of the second circuit board 260 in the first horizontal direction (e.g. the y-axis direction) may be 250 micrometers to 350 micrometers. Alternatively, "S14" may be 250 micrometers to 300 micrometers. Alternatively, "S14" may be 300 micrometers to 350 micrometers.

In an example, the height S13 of the solder 901 projecting from the first pad 261B may be 60 percent (%) to 100 percent (%) of the spacing distance A12 from the lower surface of the second circuit board 260 to the terminal 261 (e.g. the second pad 261A) in the optical-axis direction.

In another embodiment, "S13" may be 70 percent (%) to 90 percent (%) of "A12." In still another embodiment, "S13" may be 75 percent (%) to 85 percent (%) of "A12."

When "S13" is less than 60 percent of "A12," the thickness of the solder 901 formed on the first pad 261B is small, and thus it is not possible to exhibit the effect of inhibiting the solder from cracking due to impact.

On the other hand, when "S13" exceeds 100 percent of "A12," the solder 901 may project from the lower surface of the second circuit board 260, which may cause spatial interference with the first board unit 800 and an electrical short with the first board unit 800.

In order to reliably inhibit spatial interference with the first board unit 800 and an electrical short with the first board unit 800, "S13" may be equal to or less than 85 percent (%) of "A12."

FIG. 27B shows a modified example of the configuration shown in FIG. 27A.

Referring to FIG. 27B, the terminal 261 of the second circuit board 260 may be in direct contact with the terminal 251 of the first circuit board 250. In an example, one end of the terminal 261 of the second circuit board 260 may be in direct contact with a portion of the uppermost insulating layer (e.g. the second cover layer 83B) and the terminal 251 of the first circuit board 250. In an example, the second pad 261A1 of the terminal 261 of the second circuit board 260 may extend to the terminal 251 of the first circuit board 250, and may be in contact with the lower surface of the terminal 251 of the first circuit board 250. In an example, a portion of the terminal 261 of the second circuit board 260, for example the second pad 261A1, may be disposed between the uppermost insulating layer (e.g. the second cover layer 83B) and the solder 901.

Figure 28:
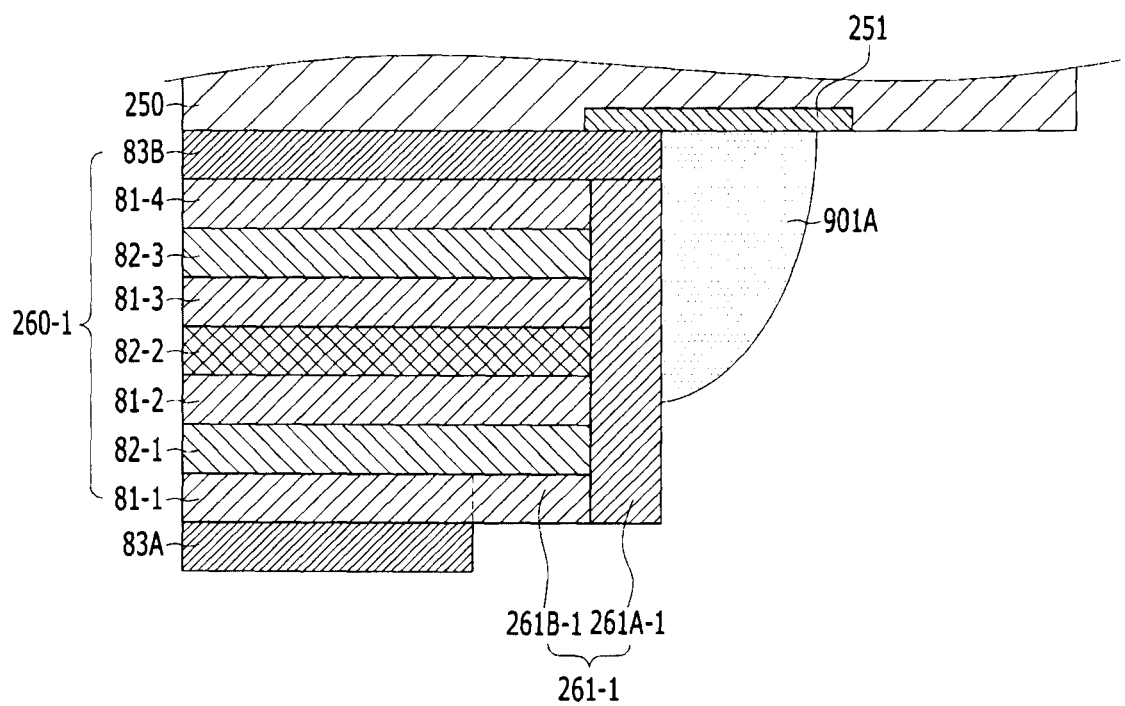
FIG. 28 is a cross-sectional view showing coupling of a solder to a terminal of a second circuit board according to a comparative example.

FIG. 28 is a cross-sectional view showing coupling of a solder 901A to a terminal 261-1 of a second circuit board 260-1 according to a comparative example.

Referring to FIG. 28, the terminal 261-1 of the second circuit board 260-1 includes a first pad 261A-1 and a second pad 261B-1. In the comparative example, the second pad 261B-1 may be formed on the lowermost conductive layer 81-1 of the second circuit board 260-1. In the comparative example, a solder 901A used for soldering between the terminal 261-1 of the second circuit board 260-1 and the terminal 251 of the first circuit board 250 may be formed only on the first pad 261A-1 of the second circuit board 260-1 without being formed on the second pad 261B-1. In the comparative example, because the second pad 261B-1 of the terminal 261 is formed on the lowermost conductive layer of the second circuit board 260-1 that is located farthest from the first circuit board 250, the spacing distance between the second pad 261B-1 and the terminal 251 of the first circuit board 250 is long, and accordingly, the solder 901A is not formed on the second pad 261B-1.

Figure 29:
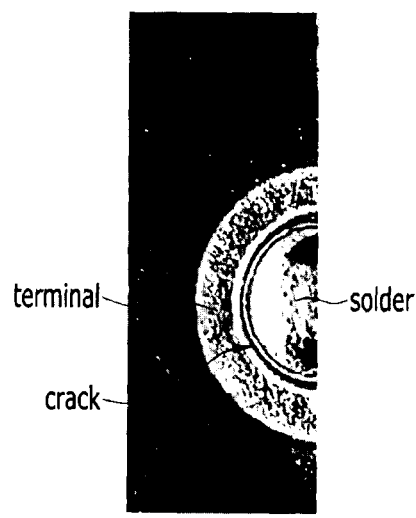
FIG. 29 shows a crack generated in the solder during soldering according to the comparative example.

FIG. 29 shows a crack generated in the solder during soldering according to the comparative example. Referring to FIG. 29, when impact is applied to the solder, the solder coupled to the terminal may not withstand the impact and may crack. The crack generated in the solder may deteriorate reliability of electrical connection between the terminal 251 of the first circuit board and the second circuit board 260-1.

In the embodiment, since the first pad 261B of the terminal 261 of the second circuit board 260 is formed on a conductive layer (e.g. 81-2) disposed on the lowermost conductive layer (e.g. 81-1), the spacing distance between the first pad 261B and the terminal 251 of the first circuit board 250 may be reduced, and accordingly, the solder 901 may also be easily formed on the first pad 261B of the second circuit board 260. Therefore, the solder 901 may be in contact with and coupled to the first pad 261B as well as the second pad 261A of the terminal 261 of the second circuit board 260, and thus an area of contact between the solder 901 and the terminal 261 may increase. Accordingly, solderability may be improved, coupling force between the terminals 251 and 261 may be increased, and the occurrence of cracking in the solder 901 attributable to impact may be inhibited.

Figure 30:
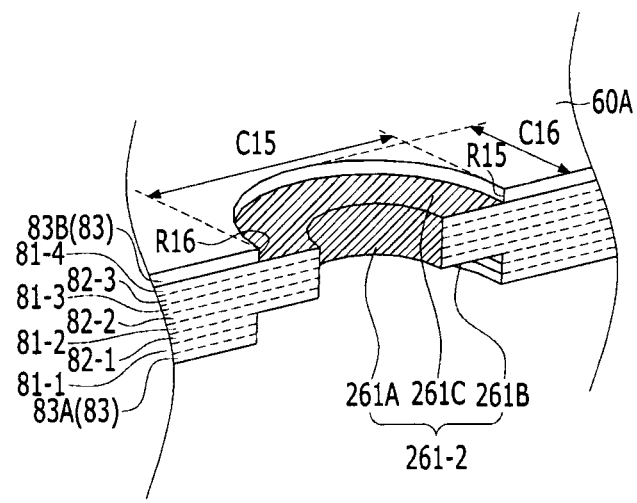
FIG. 30 is an enlarged view of a terminal of a second circuit board according to another embodiment.
Figure 31:
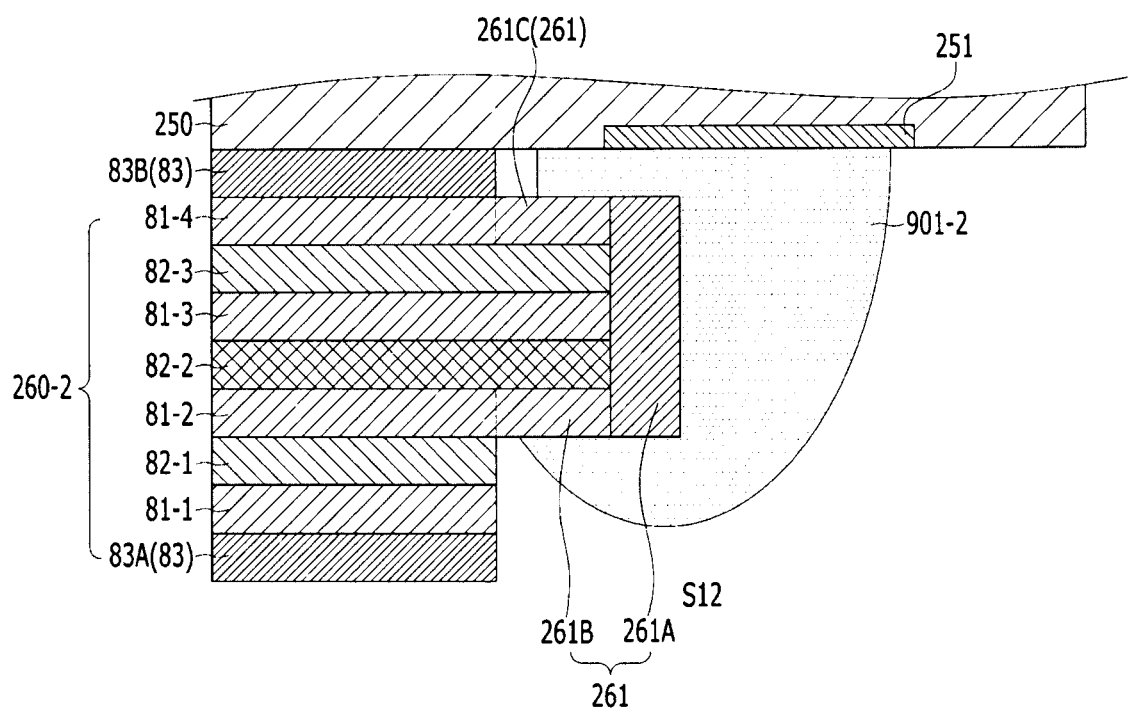
FIG. 31 is a schematic cross-sectional view showing coupling of a solder to the terminal shown in FIG. 30.

FIG. 30 is an enlarged view of a terminal 261-2 of a second circuit board 260 according to another embodiment, and FIG. 31 is a schematic cross-sectional view showing coupling of a solder 901-2 to the terminal 261-2 shown in FIG. 30. In FIGS. 30 and 31, the same reference numerals as those in FIGS. 25A, 25B, 27A, and 27B denote the same components, and a description thereof will be omitted.

The terminal 261-2 in FIG. 30 may be a modified example of that shown in FIGS. 25A and 25B. Referring to FIGS. 30 and 31, the second circuit board 260 may include at least one terminal 261-2. In an example, the second circuit board 260 may include a plurality of terminals 261-2.

The terminal 261-2 may include a second pad 261A, a first pad 261B, and a third pad 261C. The description given with reference to FIGS. 25A, 25B, 27A, and 27B may also be applied to the second pad 261A and the first pad 261B in FIG. 30.

The third pad 261C may be formed on the uppermost conductive layer (e.g. 81-4). In an example, the third pad 261C may be formed on a conductive layer (e.g. 81-4) that is the closest to the terminal 251 of the first circuit board 250, among the plurality of conductive layers 81-1 to 81-4 of the second circuit board 260. Alternatively, the third pad 261C may a portion of the uppermost conductive layer (e.g. 81-4). In an example, the third pad 261C may be a layer parallel to the upper surface 60A (or the lower surface 60B) of the second circuit board 260.

In an example, the third pad 261C may be open or exposed from the cover layer (e.g. 83B). In an example, the third pad 261C may be connected to the upper portion of the second pad 261A, and may be parallel to the first pad 261B.

A stair may be formed between the upper surface of the third pad 261C and the first surface 60A of the second circuit board 260 in a direction parallel to the optical axis. In an example, the upper surface of the third pad 261C may be located lower than the first surface 60A of the second circuit board 260. In an example, the first surface 60A of the second circuit board 260 may include the upper surface of the second cover layer 83B. Alternatively, the second surface 60A may be the upper surface of the second cover layer 83B.

In an example, when the second circuit board 260 is viewed from above, the third pad 261C may include a curve having a shape identical or similar to that of the curve of a via in the second pad 261A. The curvature of the curve of the via in the second pad 261A may be equal to the curvature of the curve of the third pad 261C. In another embodiment, the latter may be larger than the former. In still another embodiment, the latter may be smaller than the former.

In an example, when the second circuit board 260 is viewed from above, the fifth length C15 of the third pad 261C in the second horizontal direction (e.g. the x-axis direction) may be longer than the sixth length C16 of the third pad 261C in the first horizontal direction (e.g. the y-axis direction).

In an example, the fifth length C15 may be a distance between a fifth edge R15, at which one end of the third pad 261C and the side surface of the second circuit board 260 meet, and a sixth edge R16, at which the other end of the third pad 261C and the side surface of the second circuit board 260 meet.

In addition, in an example, the sixth length C16 may be a distance from the fifth edge R15 (or the sixth edge R16) to the central portion of the third pad 261C. In an example, the central portion of the third pad 261C may be the region of the third pad 261C that is located between the fifth edge R15 and the sixth edge R16 and is spaced farthest from the side surface of the second circuit board 250.

In an example, the fifth length C15 may be longer than the first length C11. In addition, the sixth length C16 may be longer than the second length C12.

At least a portion of the third pad 261C may overlap the terminal 251 of the first circuit board 250 in a direction parallel to the optical axis. In an example, the third pad 251C, the solder 901-2, and the terminal 251 of the first circuit board 250 may overlap each other in a direction parallel to the optical axis. In addition, the third pad 261C may include a portion that does not overlap the terminal 251 of the first circuit board 250 in a direction parallel to the optical axis. In an example, the solder 901-2 may be disposed on the portion that does not overlap the terminal 251 of the first circuit board 250 in a direction parallel to the optical axis. In an example, the solder 901-2 may be in contact with or coupled to the portion that does not overlap the terminal 251 of the first circuit board 250 in a direction parallel to the optical axis.

In an example, the solder 901-2 may be disposed between the third pad 261C and the terminal 251 of the first circuit board 250. In an example, at least a portion of the solder 901-2 may be in contact with the third pad 261C.

The third pad 261C may be in contact with or connected to the second pad 261A. In an example, the third pad 261C may be connected to the upper portion or the upper end of the second pad 261A.

The solder 901-2 may be in contact with, adhered to, or coupled to the terminal 251 of the first circuit board 250 and the third pad 261C of the terminal 261 of the second circuit board 260.

In the embodiment shown in FIG. 31, the solder 901-2 may be in contact with and coupled to the second pad 261A, the first pad 261B, and the third pad 261C. Therefore, compared to the embodiments shown in FIGS. 27A and 27B, it is possible to increase contact and coupling areas, thereby further improving solderability, further ensuring reliable electrical connection, and more effectively inhibiting the occurrence of cracking in the solder.

Figure 32:
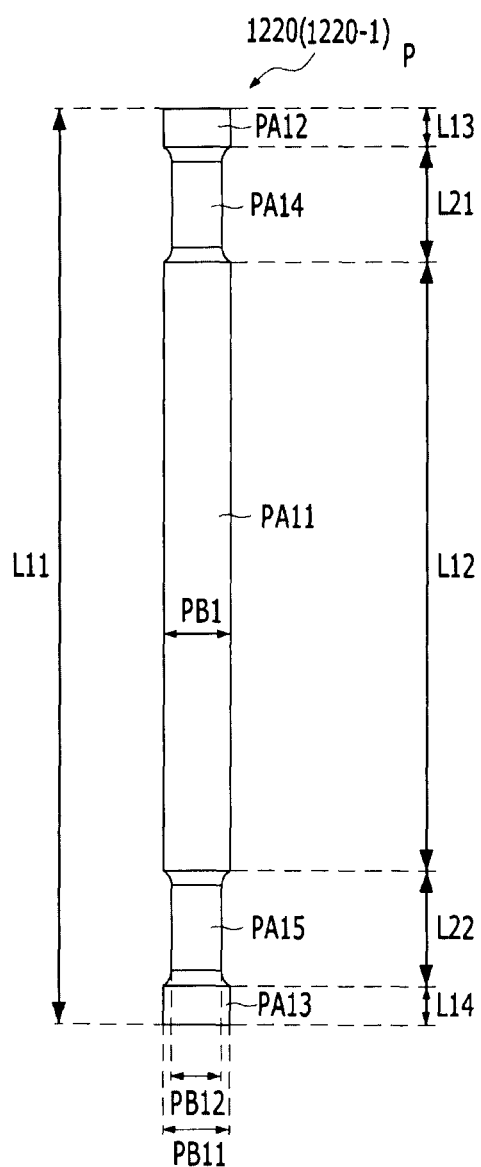
FIG. 32 is a perspective view of another embodiment of the support member shown in FIG. 10A.

FIG. 32 is a perspective view of a support member 1220 according to another embodiment. The support member 1220 is a modified example of the support member 220 shown in FIG. 10A.

FIG. 32 illustrates a first support member 1220-1, and the description of the first support member 1220-1 may also be applied to other support members 220-2 to 220-4. The description of the support member 220 shown in FIG. 10A may also be applied to the support member 1220 shown in FIG. 32 except for the material thereof.

Referring to FIG. 32, the bobbin 110, the housing 140, and/or the base 210 described above may be embodied as an injection-molded product through an injection-molding process. The support member 1220 may include an injection-molded product through an injection-molding process. In an example, the support member 1220 may be an injection-molded product formed through an injection-molding process, and may be elastically deformable. In this case, the injection-molded product may include at least one of resin, rubber, urethane, plastic, or elastomer. Alternatively, the injection-molded product may be formed of resin, rubber, urethane, plastic, or elastomer. For example, the injection-molded product may include thermoplastic elastomer. For example, the support member 1220 may be formed of polyethylene terephthalate (PET).

In an example, the cross-section of the support member 1220 in a direction perpendicular to the optical axis may have a circular shape. In another embodiment, the cross-section of the support member 1220 in a direction perpendicular to the optical axis may have a polygonal shape. Since the support member 1220 includes an injection-molded material, the support member 1220 may also serve as a damper that absorbs impact.

In an example, the support member 1220 may be formed of a non-conductive material or an insulating material.

In an example, the support member 1220 may be embodied as a hinge pin.

The support member 1220 may include a body PA11, a first end portion PA12, which is disposed between one side of the body PA11 and the second coupling portion 520 of the upper elastic member 150 (or the housing 140), and a second end portion PA13, which is disposed between the other side of the body PA11 and the holder 270 (or the reinforcing member 37).

In an example, the body PA11 may have a column shape. In an example, the body PA11 may be formed in the shape of a line having a uniform diameter from one end thereof to the other end thereof. Alternatively, in another embodiment, the body PA11 may be formed in the shape of a column having a convex central portion or a concave central portion.

In an example, the cross-section of the body PA11 in a direction perpendicular to the optical axis may have a circular shape, an elliptical shape, or a polygonal shape (e.g. a quadrangular shape).

In still another embodiment, the body PA11 may include a portion that gradually decreases in diameter from the first end portion PA12 to the second end portion PA13. In still another embodiment, the body PA11 may include a portion that gradually increases in diameter from the first end portion PA12 to the second end portion PA13.

One end (e.g. the first end portion PA12) of the support member 1220 may be coupled to the first upper elastic member 150 coupled to the housing 140, which is the fixed unit.

In an example, the first end portion PA12 may be connected or coupled to the second coupling portion 520 of the first upper elastic member 150-1. In an example, the first end portion PA12 may be inserted into or disposed in the hole 520a in the second coupling portion 520, and may be coupled to the second coupling portion 520 by means of an adhesive. In an example, the first end portion PA12 may pass through the hole 520a.

In another embodiment, the hole 520a may be omitted, the first end portion PA12 may be disposed under the second coupling portion 520, and the first end portion PA12 and the second coupling portion 520 may be coupled to each other by means of an adhesive.

The second end portion PA13 may be coupled to the reinforcing member 37. In an example, the second end portion PA13 may be inserted into or disposed in the hole 71B in the reinforcing member 37, and may be coupled to the reinforcing member 37 by means of an adhesive. Alternatively, in another example, the second end portion PA13 may pass through the hole 71B in the reinforcing member 37.

The shape of each of the first and second end portions PA12 and PA13 may be a cylindrical shape, but the disclosure is not limited thereto. The shape of each of the first and second end portions PA12 and PA13 may be a polyhedral shape (e.g. a hexahedral shape). The cross-sectional shape of each of the first and second end portions PA12 and PA13 in a direction perpendicular to the optical axis may be a circular shape, an elliptical shape, or a polygonal shape (e.g. a quadrangular shape).

The support member 1220 may include a first connection portion PA14, which connects the first end portion PA12 to one side of the body PA11. In addition, the support member 1220 may include a second connection portion PA15, which connects the second end portion PA13 to the other side of the body PA11.

The length L12 of the body PA11 in the optical-axis direction may be longer than the lengths L13 and L14 of the first and second end portions PA12 and PA13 in the optical-axis direction. In addition, the length L12 of the body PA11 in the optical-axis direction may be longer than the lengths L21 and L22 of the first and second connection portions PA14 and PA15 in the optical-axis direction. In another embodiment, the length of the body PA11 in the optical-axis direction may be shorter than or equal to the length of each of the first and second connection portions PA14 and PA15 in the optical-axis direction.

For example, the length L11 of the support member 1220 in the optical-axis direction may be 2.2 mm and 3.2 mm. Alternatively, "L11" may be 2.4 mm to 3.0 mm.

For example, the length L12 of the body PA11 in the optical-axis direction may be 1.46 mm to 2.26 mm. Alternatively, "L12" may be 1.66 mm to 2.06 mm.

For example, the length L13 of the first end portion PA12 in the optical-axis direction may be 0.08 mm to 0.16 mm. Alternatively, "L13" may be 0.1 mm to 0.14 mm.

For example, the length L21 of the first connection portion PA14 in the optical-axis direction may be 0.3 mm to 0.4 mm. Alternatively, "L21" may be 0.32 mm to 0.38 mm.

For example, the diameter PB1 of the body PA11 may be 0.15 mm to 0.25 mm. Alternatively, "PB1" may be 0.18 mm to 0.22 mm.

For example, the diameter PB12 of the first connection portion PA14 may be 0.1 mm to 0.2 mm. Alternatively, "PB12" may be 0.12 mm to 0.18 mm.

For example, the length L12 of the body PA11 in the optical-axis direction may be 50% to 90% of the length L11 of the support member 1220 in the optical-axis direction. Alternatively, the length L12 of the body PA11 in the optical-axis direction may be 65% to 80% of the length L11 of the support member 1220 in the optical-axis direction. Alternatively, the length L12 of the body PA11 in the optical-axis direction may be 68% to 75% of the length L11 of the support member 1220 in the optical-axis direction.

The length L13 of the first end portion PA12 in the optical-axis direction may be equal to the length L14 of the second end portion PA13 in the optical-axis direction. In another embodiment, "L13" may be different from "L14." For example, "L13" may be longer or shorter than "L14."

In an example, the length L21 of the first connection portion PA14 in the optical-axis direction may be equal to the length L22 of the second connection portion PA15 in the optical-axis direction. In another embodiment, the length of the first connection portion PA14 in the optical-axis direction may be different from the length of the second connection portion PA15 in the optical-axis direction. For example, the length of the first connection portion PA14 in the optical-axis direction may be longer or shorter than the length of the second connection portion PA15 in the optical-axis direction.

The diameter PB1 of the body PA11 may be equal to the diameter PB11 of the first end portion PA12 (or the diameter of the second end portion PA13). Alternatively, the diameter PB1 of the body PA11 may be greater than the diameter PB11 of the first end portion PA12 (or the diameter of the second end portion PA13). Alternatively, the diameter PB1 of the body PA11 may be less than the diameter PB11 of the first end portion PA12 (or the diameter of the second end portion PA13).

In an example, the diameter PB11 of the first end portion PA12 may be equal to the diameter PB11 of the second end portion PA13. In another embodiment, the diameter of the first end portion may be greater or less than the diameter of the second end portion.

In this case, the diameters PB1, PB11, and PB12 may be the lengths of the body PA11, the end portions PA12 and PA13, and the connection portions PA14 and PA15 in a direction perpendicular to the optical axis.

The diameter PB12 of the first connection portion PA14 may be less than the diameter PB11 of the first end portion PA12. In addition, the diameter PB12 of the second connection portion PA15 may be less than the diameter PB11 of the second end portion PA13. In addition, the diameter of each of the first and second connection portions may be less than the diameter of the body PA11.

The first connection portion PA14 may be a portion formed to be concave between the first end portion PA12 and the body PA11, and the second connection portion PA15 may be a portion formed to be concave between the second end portion PA13 and the body PA11.

The body PA11 may be referred to as a "first portion," the first end portion PA12 may be referred to as a "second portion," the second end portion PA13 may be referred to as a "third portion," the first connection portion PA14 may be referred to as a "fourth portion" or a "first deformable portion," and the second connection portion PA15 may be referred to as a "fifth portion" or a "second deformable portion."

Each of the first connection portion PA14 and the second connection portion PA15 is formed to have the overall shape of a cylindrical column. However, the first connection portion PA14 and the second connection portion PA15 may have curved portions in various shapes. The number of connection portions may be two or more according to the characteristics of the product. Each of the connection portions may be formed to have a partially bent shape or a clamp-like shape.

In another embodiment, at least one of the first connection portion PA14 or the second connection portion PA15 may be omitted. One side of the body may be connected to the first end portion, and the other side of the body may be connected to the second end portion.

Figure 33:
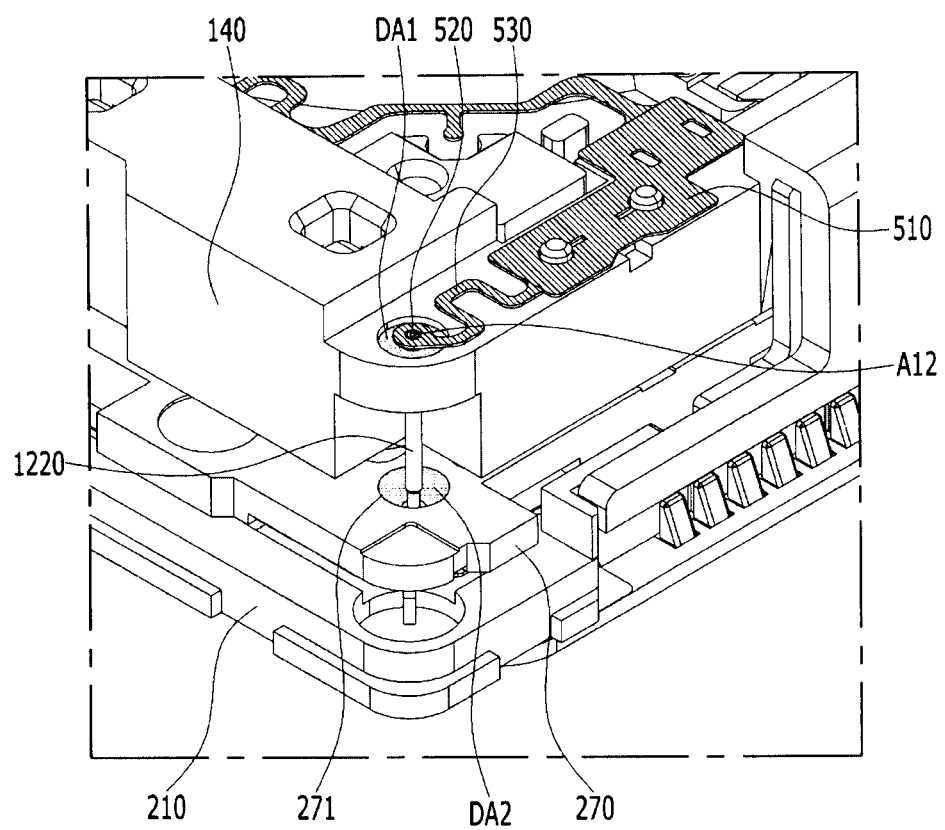
FIG. 33 is a partially enlarged view of a second coupling portion of the upper elastic member, the support member in FIG. 32, the holder, and the base when viewed from above.
Figure 34:
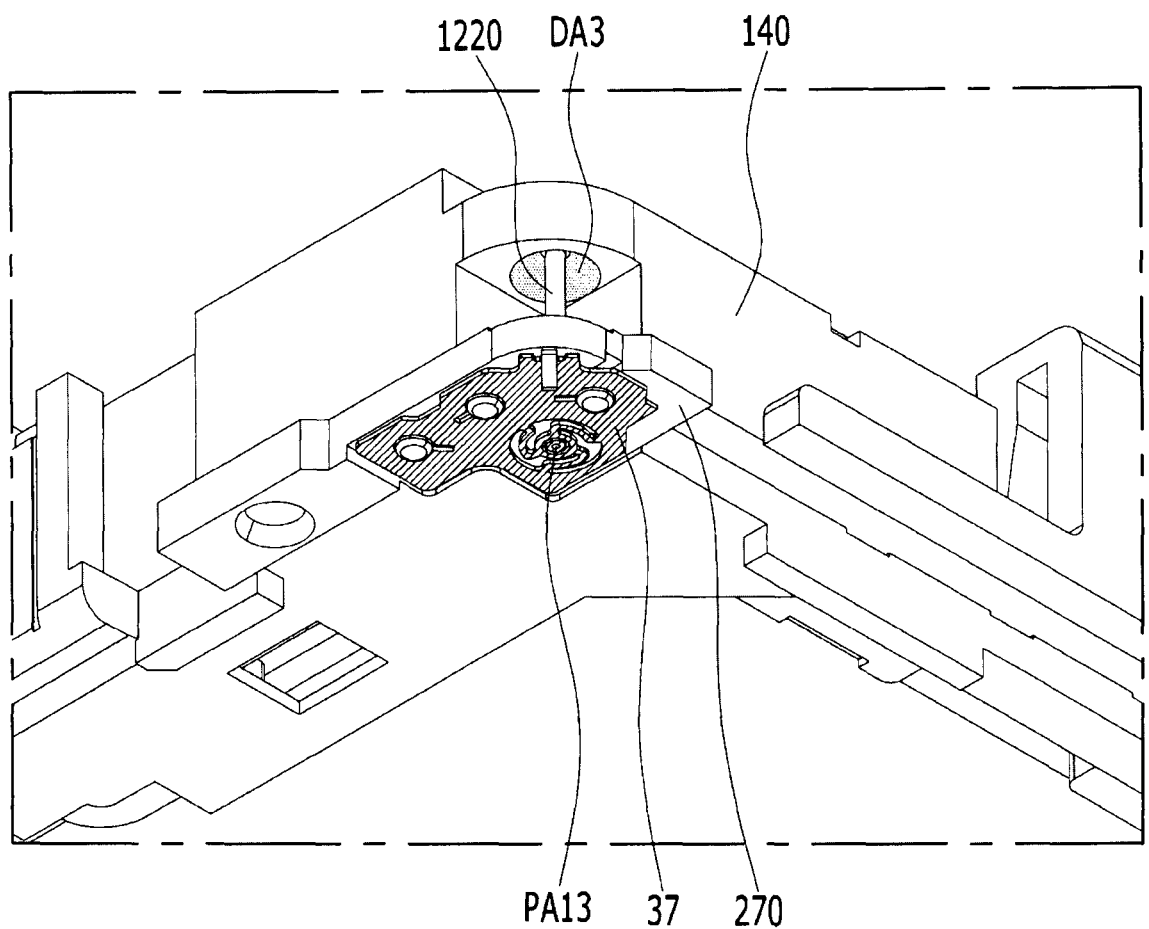
FIG. 34 is a partially enlarged view of the components in FIG. 33 when viewed from below.

FIG. 33 is a partially enlarged view of the second coupling portion 520 of the upper elastic member 150, the support member 1220, the holder 270, and the base when viewed from above, and FIG. 34 is a partially enlarged view of the components in FIG. 33 when viewed from below.

Referring to FIGS. 33 and 34, the second coupling portion 520 may be coupled to the support member 1220 by means of an adhesive. For example, the adhesive may be a resin adhesive, such as epoxy or silicone.

In an example, one end of the support member 1220 may be coupled to the upper elastic member 150 (or the housing 140), and the other end of the support member 1220 may be coupled to the holder 270. In an example, one end of the support member 1220 may be coupled to the first outer frame 152 (e.g. the second coupling portion 520) of the upper elastic member 150 by means of an adhesive. In an example, the other end of the support member 1220 may be disposed on or coupled to the holder 270 by means of an adhesive, or may be coupled to the reinforcing member 37 coupled to the holder 270.

A damper DA3 may be disposed between at least a portion of the support member 1220, which passes through the hole 147 in the housing 140, and the hole 147 in the housing 140. In an example, at least a portion of the damper DA3 may be disposed in the hole 147 in the housing 140, and may be coupled or attached to at least a portion of the support member 220 and to the housing 140.

The damper DA3 may be disposed between the hole 147 in the housing 140 and the support member 1220, and may be in contact with, attached to, or coupled to the support member 1220 and the inner surface of the hole 147. In another embodiment, the damper DA3 may not be disposed in at least one of the hole 147 or a recess 147a in the housing 140, and may be coupled or attached to the housing 140 and the support member 1220.

In addition, in an example, the housing 140 may have a recess 147a depressed in the upper surface thereof, and the recess 147a may be formed around the hole 147. In an example, the hole 147 may be formed inside the recess 147a, and may pass through the bottom surface of the recess 147a.

In an example, at least a portion of the support member 1220 may be disposed in or pass through the recess 147a in the housing 140, and a damper DA1 may be disposed in the recess 147a in the housing 140. In an example, the housing 140 may have a recess 147a formed in the upper surface of each corner portion thereof, and the damper DA1 may be disposed in the recess 147a formed in each of the corner portions of the housing 140. The damper DA1 may be in contact with, attached to, or coupled to the second coupling portion 520 of the upper elastic member 150. In addition, the damper DA1 may be in contact with, attached to, or coupled to at least a portion of the connection portion 530 of the upper elastic member 150. In addition, the damper DA1 may be in contact with, attached to, or coupled to one end of the support member 1220. In an example, the damper DA1 may be in contact with, attached to, or coupled to at least one of the first end portion PA12 or the first connection portion PA14. In an example, the damper DA1 and the damper DA3 may be connected to or in contact with each other. In another embodiment, the damper DA1 and the damper DA3 may be spaced apart from each other.

In an example, the support member 1220 may be disposed parallel to the optical-axis direction. In an example, the support member 1220 may be disposed at a corner of the housing 140 and/or a corner of the holder 270. In an example, the support member 1220 may include four support members. Each of the four support members may be disposed at a corresponding one of the four corners of the housing 140 and/or a corresponding one of the four corners of the holder 270.

At least a portion (e.g. one end) of the support member 1220 may pass through the hole 271 in the holder 270. At least another portion (e.g. the other end) of the support member 1220 may be inserted into or coupled to the hole 71B in the reinforcing member 37. In an example, at least another portion (e.g. the other end) of the support member 1220 may be coupled to the reinforcing member 37 by means of an adhesive.

The other end (e.g. the second end portion PA13) of the support member 1220 may be coupled to at least one of the holder 270 or the reinforcing member 37. In an example, the other end (e.g. the second end portion PA13) of the support member 1220 may be inserted into or disposed in the hole 271 in the holder 270 and the hole 71B in the reinforcing member 37, and may be coupled or attached to the hole 271 in the holder 270 and the hole 71B in the reinforcing member 37 by means of an adhesive.

The camera device 10 may include a damper DA2, which is disposed in the hole 271 in the holder 270. At least a portion of the support member 1220 may be disposed in or pass through the hole 271 in the holder 270. The damper DA2 may be disposed between the hole 271 in the holder 270 and the support member 1220, and may be coupled or attached to a portion of the support member 1220 and the holder 270. In an example, at least one of the hole 147a in the housing 140 or the hole 271 in the holder 270 may be a non-essential component, and the camera device 200 according to the embodiment may include at least one of the hole 147a in the housing 140 or the hole 271 in the holder 270.

In an example, the damper DA2 may be disposed in the hole 271 formed in each of the corners of the holder 270. In an example, the damper DA2 may be in contact with, attached to, or coupled to the other end of the support member 1220. In an example, the damper DA2 may be in contact with, attached to, or coupled to at least one of the second end portion PA13 or the second connection portion PA14.

Although not shown in FIG. 33, in an example, the holder 270 may have a recess depressed in the upper surface thereof, and the recess may be formed around the hole 271. In this case, the recess formed in the holder 270 may have a shape identical or similar to that of the hole 147 in the housing 140. In an example, the hole 271 may be formed inside the recess in the holder 270, and may pass through the bottom surface of the recess in the holder 270. In an example, the damper DA2 may be disposed in the recess formed in the upper surface of the holder 270. In an example, the aforementioned recess may be formed in the upper surface of each corner portion of the holder 270, and the damper DA2 may be disposed in the recess formed in each of the corner portions of the holder 270.

In still another embodiment, the damper DA2 may not be disposed in the hole 271 in the holder 270, and may be coupled or attached to the support member 1220 and the holder 270.

The dampers DA1, DA2, and DA3 may serve to absorb or alleviate vibration of the OIS moving unit, thereby inhibiting or suppressing oscillation of the OIS moving unit during OIS operation. Each of the above-described dampers DA1, DA2, DA3, 48, and 49 may be formed of a damping material, such as silicone or resin. In another embodiment, at least one of the above-described dampers DA1, DA2, DA3, 48, and 49 may be omitted.

Although the embodiment shown in FIGS. 33 and 34 includes all of the first to third dampers DA1, DA2, and DA3, another embodiment may include at least one of the first damper DA1, the second damper DA2, or the third damper DA3.

The support member 1220, which is formed of an injection-molded material, may effectively suppress or inhibit the occurrence of disconnection attributable to external impact compared to a wire-type support member made of a metal material.

In order to realize a high-quality image according to development of functions of mobile phones, the size of an image sensor increases, leading to increase in the size and the weight of a lens module (or a lens).

In the case of a camera module in which a heavy lens module (e.g. a lens module having a weight of 0.4 grams (g) or more), if a metal-wire-type support member is used instead of the support member 1220, the wire does not withstand the weight of the lens module when external impact is applied thereto or during OIS operation, and thus is highly likely to be disconnected. The disconnection of the wire may cause a phenomenon in which a resonance frequency for OIS operation is lowered and a gain is increased, which may cause oscillation of the OIS driving unit and errors in OIS operation.

In order to inhibit oscillation of the OIS driving unit, the embodiment employs the support member 1220 formed of a non-conductive injection-molded material instead of a wire, thereby ensuring higher resistance to external impact.

The support member 1220, which is an injection-molded product, may have greater rigidity (or tensile strength or stress) than the wire. Accordingly, the support member 1220 may be less likely to be disconnected and may have a longer lifespan than the wire. Therefore, although the OIS moving unit includes a heavy lens module, the embodiment may suppress or inhibit disconnection of the support member when external impact is applied thereto or during OIS operation, thereby inhibiting oscillation of the OIS driving unit, which may be caused by disconnection of the support member, and ensuring normal OIS operation.

The elastic modulus of the elastic member, which elastically supports the OIS moving unit with respect to the fixed unit during OIS operation, may be the sum of the elastic modulus of the support board 310 and the elastic modulus of the support member 1220. Here, the elastic modulus may be an elastic modulus in the second direction and the third direction that are perpendicular to the first direction.

The elastic modulus of the support member 1220 may be based on the elastic moduli of the support members 1220-1 to 1220-4. For example, the elastic modulus of the support member 1220 may be the sum of the elastic moduli of the support members 1220-1 to 1220-4.

In an example, the elastic modulus of the support member 1220 may be greater than or equal to the elastic modulus of the support board 310. For example, the sum of the elastic modulus of the support member 1220 and the elastic modulus of the support board 310 may be 20 to 200. Alternatively, the sum of the elastic modulus of the support member 1220 and the elastic modulus of the support board 310 may be 30 to 150. Alternatively, the sum of the elastic modulus of the support member 1220 and the elastic modulus of the support board 310 may be 30 to 100.

In another embodiment, the support member 1220 may be formed of a conductive material. In an example, the support member 1220 may be formed in the shape of a wire made of a conductive material. In an example, in order to inhibit disconnection thereof due to impact, the support member 1220 may have a thickness greater than the diameter of a general wire, for example 50 micrometers to 70 micrometers.

Figure 35:
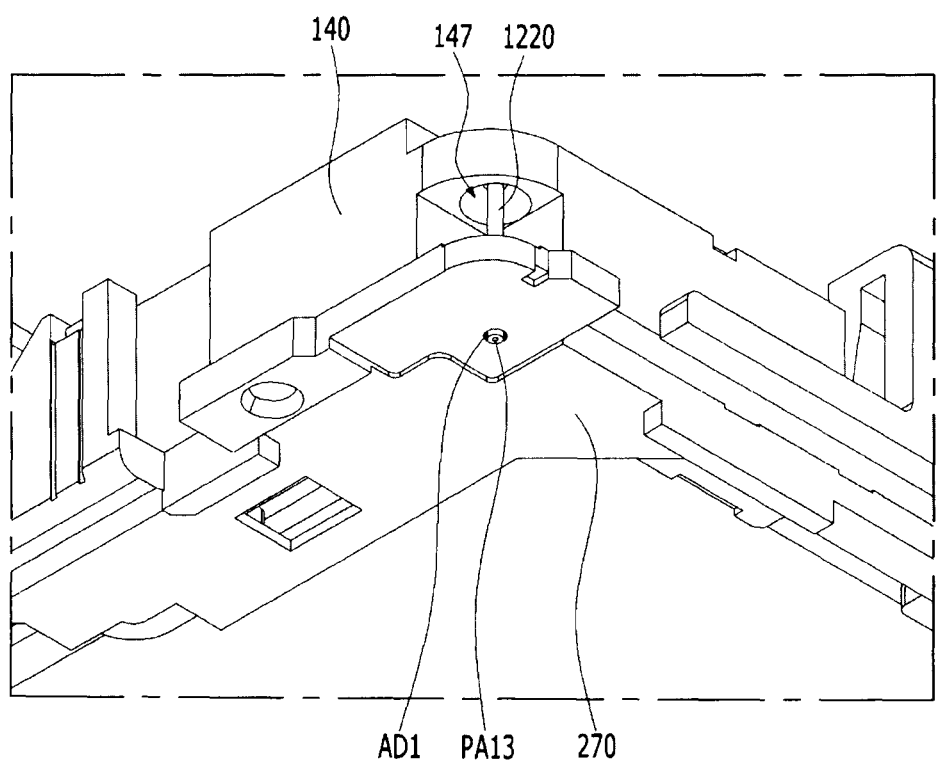
FIG. 35 shows another embodiment of coupling of the support member in FIG. 32 to the OIS moving unit.

FIG. 35 shows another embodiment of coupling of the support member 1220 to the OIS moving unit.

Although the OIS moving unit according to the embodiment shown in FIG. 10A includes the reinforcing member 37, the OIS moving unit according to the embodiment shown in FIG. 35 may not include the reinforcing member 37.

The other end (e.g. the second end portion PA13) of the support member 1220 may be disposed in the hole 271 in the holder 270, and may be coupled to the holder 270, for example the hole 271, by means of an adhesive AD1. In an example, the hole 147 in the housing 140 may have a larger diameter than the hole 271 in the holder 270. In another embodiment, the hole 147 in the housing 140 may have a diameter smaller than or equal to that of the hole 271 in the holder 270.

Figure 36:
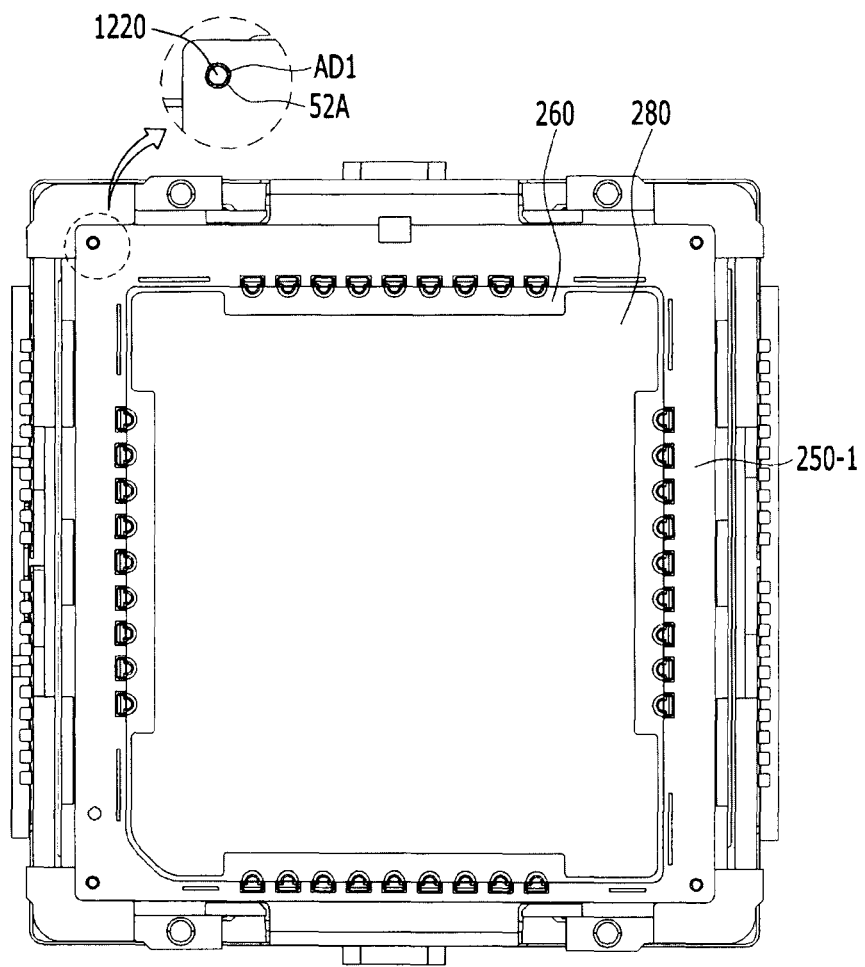
FIG. 36 shows still another embodiment of coupling of the support member in FIG. 32 to the OIS moving unit.

FIG. 36 shows still another embodiment of coupling of the support member 1220 to the OIS moving unit.

In the embodiment shown in FIG. 13, the first board unit 255, e.g. the first circuit board 250, has the escape portion 212 formed therein to avoid spatial interference with the support member 1220. In an example, the escape portion 212 may be formed in a corner of the first board unit 255 (e.g. the first circuit board 250), and may be formed in the shape of a recess depressed in the outer side surface of the first board unit 255 (e.g. the first circuit board 250). In another embodiment, the escape portion 212 may be of a through-hole type.

The first board unit 255 may not overlap the support member 1220 in the optical-axis direction (or the first direction) due to the escape portion 212.

Referring to FIG. 36, the first board unit (e.g. the first circuit board 250-1) may not have the escape portion shown in FIG. 13, and the other end (or the second end portion PA13) of the support member 1220 may be coupled to the first board unit (e.g. the first circuit board 250-1).

In an example, the first board unit (e.g. the first circuit board 250-1) may have a hole 52A formed therein so as to correspond to the support member 1220, and the other end (or the second end portion PA13) of the support member 1220 may be inserted into or disposed in the hole 52A. In an example, the other end (or the second end portion PA13) of the support member 1220 may be coupled to the first board unit (e.g. the first circuit board 250-1) by means of an adhesive. In an example, the other end (or the second end portion PA13) of the support member 1220 may be coupled to the hole 52A in the first board unit (e.g. the first circuit board 250-1) by means of an adhesive.

In an example, the other end (or the second end portion PA13) of the support member 1220 may be coupled to at least one of the upper surface or the lower surface of the first board unit (e.g. the first circuit board 250-1).

The embodiment shown in FIG. 36 may include the reinforcing member 37. Alternatively, the embodiment shown in FIG. 36 may not include the reinforcing member 37. In addition, the holder 270 may be omitted from the camera module according to the embodiment shown in FIG. 36.

Figure 37:
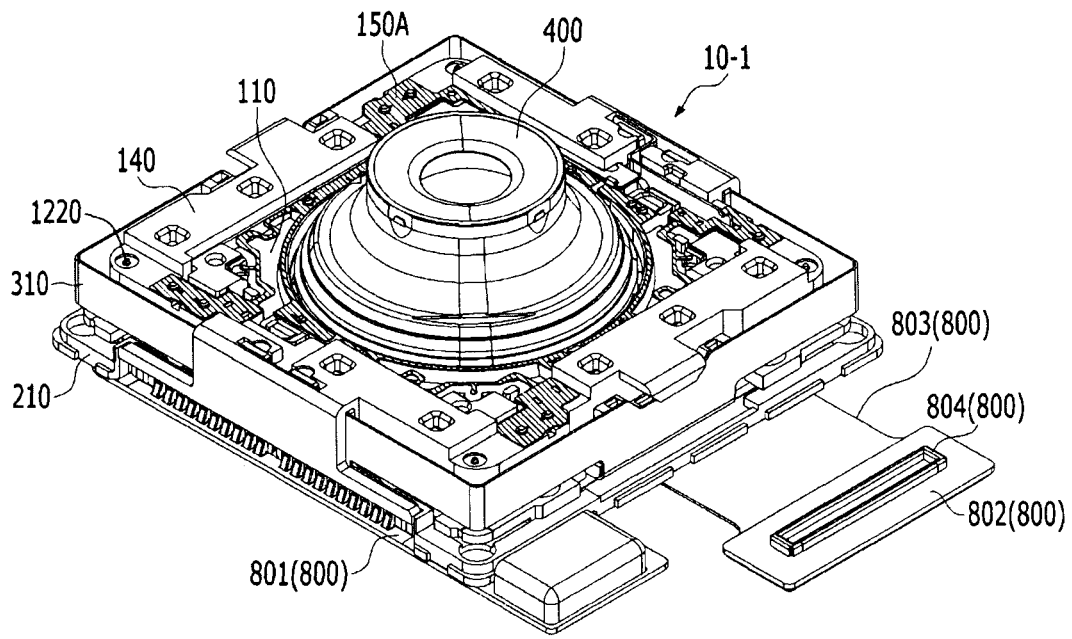
FIG. 37 is a perspective view of a camera module according to still another embodiment.
Figure 38:
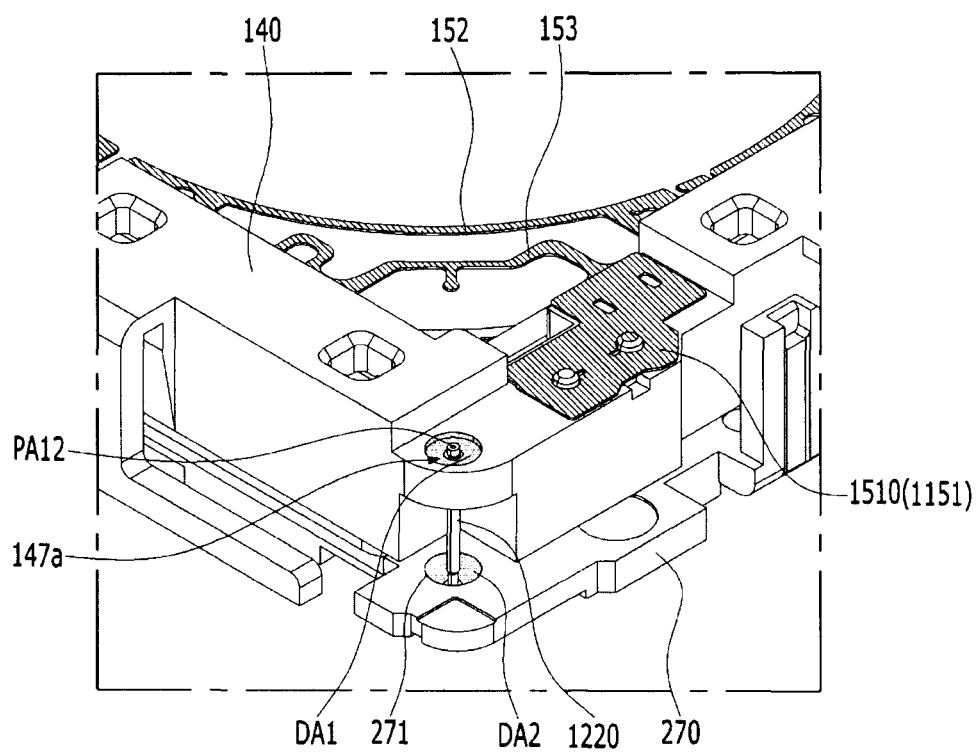
FIG. 38 is an enlarged view of some components of the camera module shown in FIG. 37.

FIG. 37 is a perspective view of a camera module 10-1 according to another embodiment, and FIG. 38 is an enlarged view of some components of the camera module shown in FIG. 37. Although the camera module 10-1 includes the cover member 300 shown in FIG. 1, illustration of the cover member 300 is omitted from FIG. 37.

The upper elastic member 150A according to the embodiment shown in FIGS. 37 and 38 may be a modified example of the upper elastic member 150 shown in FIG. 10A, and the second coupling portion 520 and the connection portion 530 may be omitted therefrom. The upper elastic member 150A may include a first coupling portion 1510 of a first outer frame 1151.

One end of the support member 1220 may be coupled to the housing 140. In an example, the first end portion PA12 of the support member 1220 may be coupled to the housing 140. In this case, one end of the support member 1220 may not be coupled to the upper elastic member 150A, and may be disposed so as to be spaced apart from the upper elastic member 150A.

In an example, one end of the support member 1220 may be inserted into or disposed in the hole 147 in the housing 140, and may be coupled to the hole 147 in the housing 140 by means of an adhesive.

In addition, the camera device according to the embodiment may be included in an optical instrument for the purpose of forming an image of an object present in a space using reflection, refraction, absorption, interference, and diffraction, which are characteristics of light, for the purpose of increasing visibility, for the purpose of recording and reproduction of an image using a lens, or for the purpose of optical measurement or image propagation or transmission. For example, the optical instrument according to the embodiment may be a cellular phone, a mobile phone, a smartphone, a portable smart device, a digital camera, a laptop computer, a digital broadcasting terminal, a personal digital assistant (PDA), a portable multimedia player (PMP), a navigation device, etc., without being limited thereto, and may also be any of devices for capturing images or pictures.

Figure 39A:
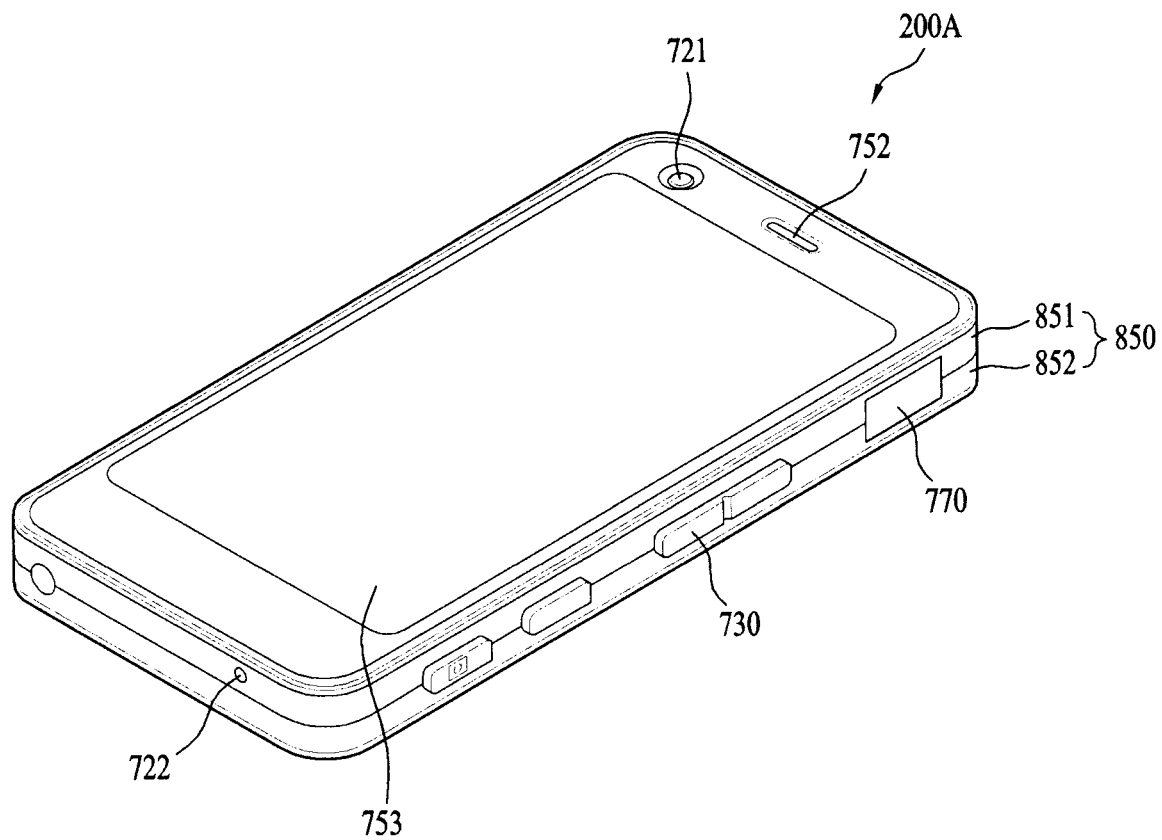
FIG. 39A is a perspective view of an optical instrument according to an embodiment.
Figure 39B:
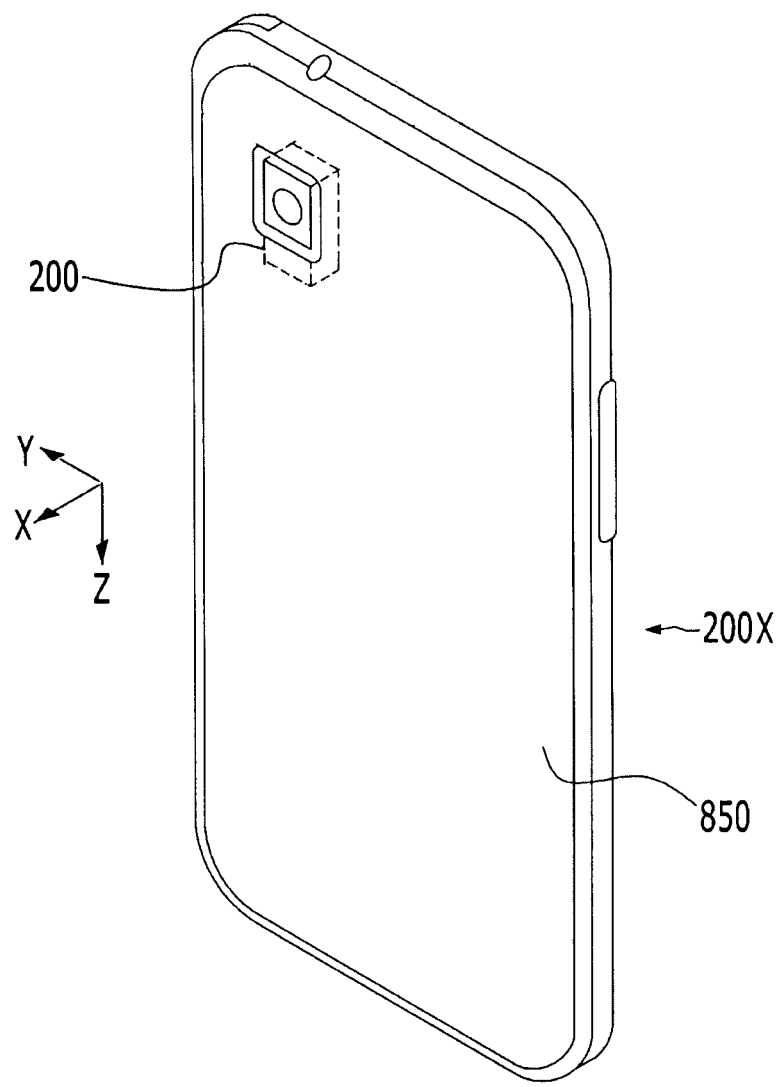
FIG. 39B is a perspective view of an optical instrument according to another embodiment.
Figure 40:
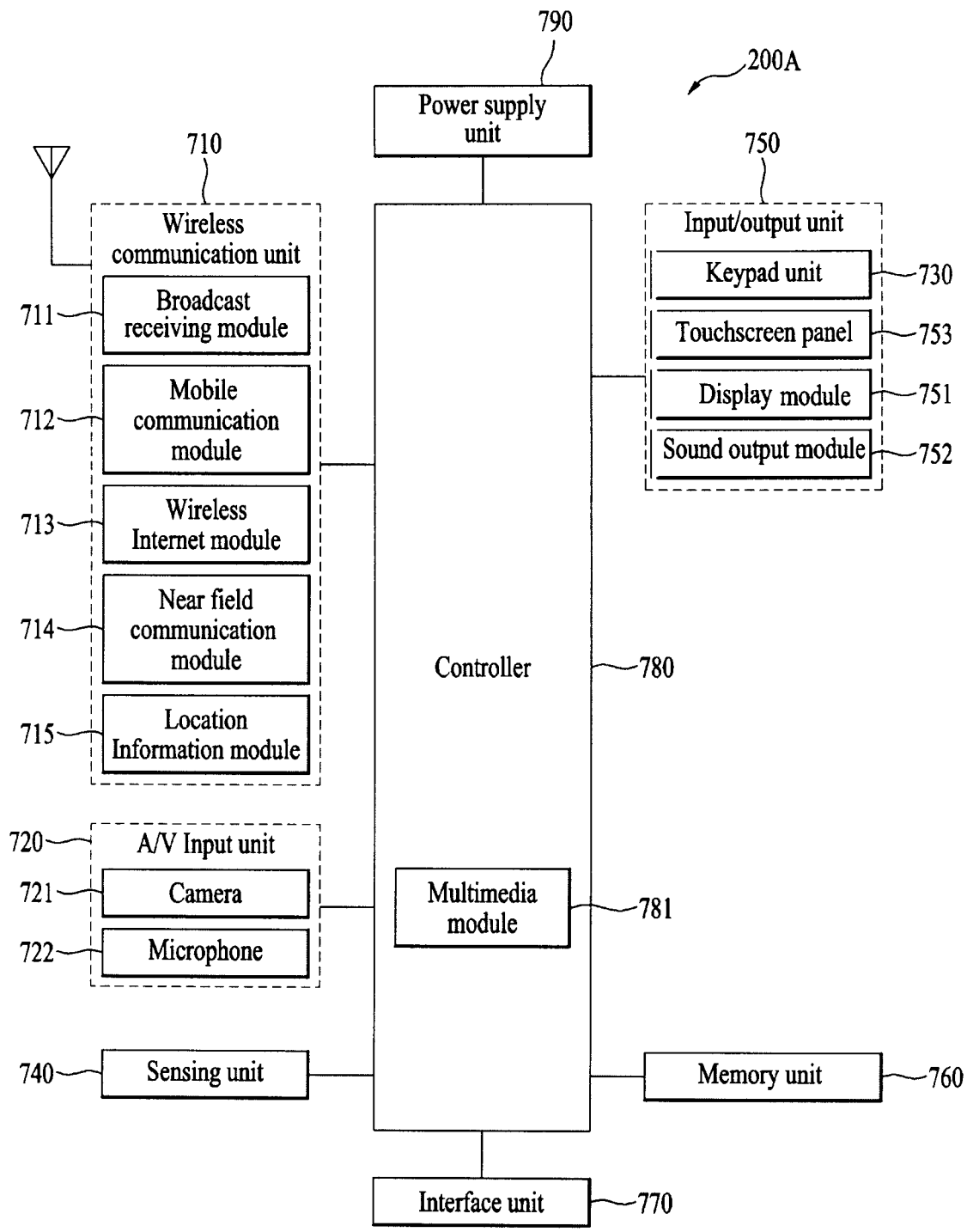
FIG. 40 is a configuration diagram of the optical instruments shown in FIGS. 39A and 39B.

FIG. 39A is a perspective view of an optical instrument 200A according to an embodiment, FIG. 39B is a perspective view of an optical instrument 200X according to another embodiment, and FIG. 40 is a configuration diagram of each of the optical instruments 200A and 200X shown in FIGS. 39A and 39B.

In the embodiment shown in FIG. 39A, the lens module 400 of the camera module 200 may be a front-view camera of the optical instrument 200A, which is disposed so as to face the front surface of the body 850. In the embodiment shown in FIG. 39B, the lens module 400 of the camera module 200 may be a rear-view camera, which is disposed so as to face the rear surface of the body 850 of the optical instrument 200X. In another embodiment, the camera module 200 according to the embodiment may correspond to a front-view camera and a rear-view camera of the optical instrument 200A or 200X.

Referring to FIGS. 39A, 39B, and 40, the optical instrument 200A may include a body 850, a wireless communication unit 710, an A/V input unit 720, a sensor 740, an input/output unit 750, a memory 760, an interface 770, a controller 780, and a power supply 790.

The body 850 shown in FIGS. 39A and 39B may have a bar shape, without being limited thereto, and may be any of various types such as, for example, a slide type, a folder type, a swing type, or a swivel type, in which two or more sub-bodies are coupled so as to be movable relative to each other.

The body 850 may include a case (a casing, a housing, a cover, or the like) defining the external appearance thereof. In an example, the body 850 may be divided into a front case 851 and a rear case 852. A variety of electronic components of the terminal may be mounted in the space defined between the front case 851 and the rear case 852.

The wireless communication unit 710 may include one or more modules, which enable wireless communication between the optical instrument 200A and a wireless communication system or between the optical instrument 200A and a network in which the optical instrument 200A is located. In an example, the wireless communication unit 710 may include a broadcast reception module 711, a mobile communication module 712, a wireless Internet module 713, a nearfield communication module 714, and a position information module 715.

The audio/video (A/V) input unit 720 serves to input audio signals or video signals, and may include a camera 721 and a microphone 722.

The camera 721 may include the camera device according to the embodiment.

The sensor 740 may sense the current state of the optical instrument 200A, such as the open or closed state of the optical instrument 200A, the position of the optical instrument 200A, the presence or absence of a user's touch, the orientation of the optical instrument 200A, or the acceleration/deceleration of the optical instrument 200A, and may generate a sensing signal to control the operation of the optical instrument 200A. For example, when the optical instrument 200A is a slide-type phone, whether the slide-type phone is open or closed may be detected. In addition, the sensor 740 serves to sense whether power is supplied from the power supply 790 or whether the interface 770 is coupled to an external device.

The input/output unit 750 serves to generate visual, audible, or tactile input or output. The input/output unit 750 may generate input data to control the operation of the optical instrument 200A, and may display information processed in the optical instrument 200A.

The input/output unit 750 may include a keypad unit 730, a display module 751, a sound output module 752, and a touchscreen panel 753. The keypad unit 730 may generate input data in response to input to a keypad.

The display module 751 may include a plurality of pixels, the color of which varies in response to electrical signals. In an example, the display module 751 may include at least one of a liquid crystal display, a thin-film transistor liquid crystal display, an organic light-emitting diode, a flexible display, or a 3D display.

The sound output module 752 may output audio data received from the wireless communication unit 710 in a call-signal reception mode, a call mode, a recording mode, a voice recognition mode, or a broadcast reception mode, or may output audio data stored in the memory 760.

The touchscreen panel 753 may convert variation in capacitance, caused by a user's touch on a specific region of a touchscreen, into electrical input signals.

The memory 760 may store programs for the processing and control of the controller 780, and may temporarily store input/output data (e.g. a phone book, messages, audio, still images, pictures, and moving images). For example, the memory 760 may store images captured by the camera 721, for example, pictures or moving images. For example, the memory 760 may store software, an algorithm, or an equation for implementation of hand-tremor compensation described above.

The interface 770 serves as a passage for connection between the optical instrument 200A and an external device. The interface 770 may receive data or power from the external device, and may transmit the same to respective components provided in the optical instrument 200A, or may transmit data inside the optical instrument 200A to the external device. For example, the interface 770 may include a wired/wireless headset port, an external charger port, a wired/wireless data port, a memory card port, a port for connection of a device having an identification module, an audio input/output (I/O) port, a video input/output (I/O) port, and an earphone port.

The controller 780 may control the overall operation of the optical instrument 200A. For example, the controller 780 may perform control and processing related to voice calls, data communication, and video calls.

The controller 780 may include a multimedia module 781 for multimedia playback. The multimedia module 781 may be provided in the controller 180, or may be provided separately from the controller 780.

The controller 780 may perform pattern recognition processing, by which writing or drawing input to the touchscreen is perceived as characters or images.

The power supply 790 may supply power required to operate the respective components upon receiving external power or internal power under the control of the controller 780.

The features, structures, effects, and the like described above in the embodiments are included in at least one embodiment of the present disclosure, but are not necessarily limited to only one embodiment. Furthermore, the features, structures, effects, and the like exemplified in the respective embodiments may be combined with other embodiments or modified by those skilled in the art. Therefore, content related to such combinations and modifications should be construed as falling within the scope of the present disclosure.

INDUSTRIAL APPLICABILITY

Embodiments may be used for a camera device capable of inhibiting deterioration in performance of insulation and protection of a terminal of a terminal unit, improving solderability, and ensuring reliable electrical connection and an optical instrument including the same.

The invention claimed is:

1. A camera device comprising:
a fixed unit; and
a moving unit comprising a first circuit board, a second circuit board disposed under the first circuit board, and an image sensor, the moving unit being-configured to be movable relative to the fixed unit in a direction perpendicular to an optical-axis direction,
wherein the second circuit board comprises a plurality of conductive layers comprising a first conductive layer and a plurality of insulating layers comprising a first insulating layer,
wherein the first insulating layer is a lowermost layer of the second circuit board,
wherein the first conductive layer is disposed on the first insulating layer,
wherein the second circuit board comprises a first region coupled to the first circuit board by a solder, and
wherein the first region has a lower surface located higher than the first conductive layer.

2. The camera device according to claim 1, further-comprising:
a heat dissipation layer disposed on a lower surface of the second circuit board.

3. The camera device according to claim 1, wherein the solder has a lowermost surface disposed higher than a lowermost surface of the first insulating layer.

4. A camera device comprising:
a fixed unit; and
a moving unit comprising a first circuit board, a second circuit board comprising a first region coupled to the first circuit board by a solder, and an image sensor,
wherein the moving unit moves in a direction perpendicular to an optical-axis direction,
wherein the second circuit board comprises a first conductive layer,
wherein the first region has a lower surface disposed higher than the first conductive layer, and
wherein the solder has a lowermost surface disposed higher than a lowermost surface of the second circuit board.

5. The camera device according to claim 4, wherein the first region is a region in which the first conductive layer is not disposed.

6. The camera device according to claim 4, wherein the first conductive layer has an end spaced apart from the solder.

7. The camera device according to claim 4, wherein a portion of the first conductive layer has an end disposed at a position further inward than an end of another conductive layer.

8. The camera device according to claim 4, wherein the first conductive layer is spaced apart from the first region.

9. The camera device according to claim 4, wherein the first region of the second circuit board comprises an edge of the second circuit board.

10. The camera device according to claim 4, wherein the second circuit board comprises a terminal, and
   wherein the first region is the terminal of the second circuit board.

11. A camera device comprising:
   a fixed unit; and
   a moving unit comprising a first circuit board, a second circuit board disposed under the first circuit board, and an image sensor, the moving unit configured to be movable relative to the fixed unit in a direction perpendicular to an optical-axis direction,
   wherein the first circuit board comprises a first terminal,
   wherein the second circuit board comprises a second terminal coupled to the first terminal by a solder,
   wherein the second circuit board comprises a plurality of conductive layers disposed to be spaced apart from each other in the optical-axis direction, and
   wherein at least one of the plurality of conductive layers is disposed lower than the second terminal and is spaced apart from the solder.

12. The camera device according to claim 11, wherein the second terminal comprises a first pad extending perpendicular to the optical-axis direction.

13. The camera device according to claim 12, wherein the second terminal comprises a second pad connected to the first pad and formed on a side surface of the second circuit board.

14. The camera device according to claim 13, wherein the first pad is connected to a lower portion of the second pad.

15. The camera device according to claim 12, wherein the second pad is disposed on a lowermost conductive layer among the plurality of conductive layers.

16. The camera device according to claim 11, wherein only a lowermost conductive layer among the plurality of conductive layers is disposed lower than the second terminal.

17. The camera device according to claim 13, wherein the second pad comprises a portion depressed in a side surface of the second circuit board.

18. The camera device according to claim 13, wherein the solder is disposed on at least one of the first pad or the second pad.

19. The camera device according to claim 11, wherein the second circuit board comprises:
   an insulating layer disposed between the plurality of conductive layers;
   a first cover layer disposed under the plurality of conductive layers; and
   a second cover layer disposed on the plurality of conductive layers.

20. The camera device according to claim 13, wherein the second terminal comprises a third pad connected to the second pad and formed on an uppermost conductive layer among the plurality of conductive layers.

* * * * *